United States Patent
Iwasa et al.

(10) Patent No.: US 11,849,799 B2
(45) Date of Patent: *Dec. 26, 2023

(54) SHOCK ABSORBER, SHOE SOLE AND SHOE

(71) Applicant: ASICS CORPORATION, Kobe (JP)

(72) Inventors: Yutaro Iwasa, Kobe (JP); Masanori Sakamoto, Kobe (JP); Norihiko Taniguchi, Kobe (JP); Koji Shimomura, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,212

(22) Filed: Jun. 23, 2020

(65) Prior Publication Data
US 2021/0195989 A1 Jul. 1, 2021

(30) Foreign Application Priority Data

Dec. 27, 2019 (JP) .................................. 2019-237764
Dec. 27, 2019 (JP) .................................. 2019-237765
(Continued)

(51) Int. Cl.
*A43B 13/02* (2022.01)
*A43B 13/04* (2006.01)
(Continued)

(52) U.S. Cl.
CPC .............. *A43B 13/023* (2013.01); *A43B 7/32* (2013.01); *A43B 13/04* (2013.01); *A43B 13/125* (2013.01);
(Continued)

(58) Field of Classification Search
CPC ... A43B 13/023; A43B 13/125; A43B 13/181; A43B 1/0009; A43B 7/32; A43B 21/28;
(Continued)

(56) References Cited

U.S. PATENT DOCUMENTS 2,432,533 A * 12/1947 Margolin ................. A43B 7/06
36/3 B
3,549,142 A 12/1970 Tilton
(Continued)

FOREIGN PATENT DOCUMENTS

CN 105768352 A 7/2016
CN 106796392 A 5/2017
(Continued)

OTHER PUBLICATIONS

The extended European search report issued by the European Patent Office dated Nov. 26, 2020, which corresponds to European Patent Application No. 20181503.2-1011 and is related to U.S. Appl. No. 16/909,212.
(Continued)

*Primary Examiner* — Khoa D Huynh
*Assistant Examiner* — Haley A Smith
(74) *Attorney, Agent, or Firm* — Studebaker & Brackett PC

(57) ABSTRACT

A shock absorber includes a three-dimensional structure composed of a unit structure repeatedly, regularly and continuously arranged in at least one direction, the unit structure being a three-dimensional shape formed by a wall having an external shape defined by a pair of parallel planes or curved surfaces. In the shock absorber, a differently shaped portion which does not correspond to the wall defining the unit structure is locally provided in a shock absorbing region which is a region in which the three-dimensional structure has the unit structure disposed.

6 Claims, 45 Drawing Sheets

(30) Foreign Application Priority Data

Jun. 1, 2020 (JP) ................................. 2020-095628
Jun. 1, 2020 (JP) ................................. 2020-095629

(51) Int. Cl.
| | |
|---|---|
| A43B 13/14 | (2006.01) |
| A43B 7/32 | (2006.01) |
| A43B 13/12 | (2006.01) |
| A43B 13/18 | (2006.01) |
| A43B 21/26 | (2006.01) |
| B32B 3/12 | (2006.01) |
| F16F 7/12 | (2006.01) |

(52) U.S. Cl.
CPC .......... *A43B 13/141* (2013.01); *A43B 13/181* (2013.01); *A43B 13/187* (2013.01); *A43B 21/26* (2013.01); *B32B 3/12* (2013.01); *F16F 7/121* (2013.01); *B32B 2437/02* (2013.01)

(58) Field of Classification Search
CPC .. A43D 2200/60; B32B 3/12; B32B 2437/02; F16F 7/121
See application file for complete search history.

(56) References Cited

U.S. PATENT DOCUMENTS

| | | | |
|---|---|---|---|
| 4,292,375 | A | 9/1981 | Ko |
| 10,881,167 | B2 * | 1/2021 | Jeng ..................... A43B 13/141 |
| 11,071,348 | B2 * | 7/2021 | Caldwell ............... A43B 3/0036 |
| 2012/0315456 | A1 | 12/2012 | Scarpa et al. |
| 2016/0160077 | A1 | 6/2016 | Rolland et al. |
| 2018/0049514 | A1 | 2/2018 | Guyan et al. |
| 2018/0228401 | A1 | 8/2018 | Schwartz et al. |
| 2018/0264719 | A1 | 9/2018 | Rolland et al. |
| 2018/0317600 | A1 | 11/2018 | Campos et al. |
| 2019/0231018 | A1 * | 8/2019 | Boutin .................... A42B 3/124 |
| 2019/0357621 | A1 | 11/2019 | Nauman et al. |
| 2020/0068988 | A1 | 3/2020 | Hsiao |
| 2020/0093221 | A1 * | 3/2020 | Caldwell ............... A43B 13/188 |
| 2020/0229538 | A1 * | 7/2020 | Yoshinaga ............. B29D 35/00 |
| 2020/0268098 | A1 * | 8/2020 | Jeng ....................... A43B 13/04 |
| 2021/0186152 | A1 * | 6/2021 | Kumar .................. A43B 13/125 |
| 2022/0275845 | A1 | 9/2022 | Kabaria et al. |

FOREIGN PATENT DOCUMENTS

| | | |
|---|---|---|
| CN | 109312802 A | 2/2019 |
| CN | 110505816 A | 11/2019 |
| EP | 3 467 335 A1 | 4/2019 |
| JP | S49-009527 B1 | 3/1974 |
| JP | 2001-208120 A | 8/2001 |
| JP | 2012-100616 A | 5/2012 |
| JP | 2017527637 A | 9/2017 |
| JP | 2019-205686 A | 12/2019 |
| WO | 2015/200201 A1 | 12/2015 |
| WO | 2017/208979 A1 | 12/2017 |

OTHER PUBLICATIONS

The extended European search report issued by the European Patent Office dated Nov. 27, 2020, which corresponds to European Patent Application No. 20181493.6-1011 and is related to U.S. Appl. No. 16/909,212.
An Office Action mailed by China National Intellectual Property Administration dated Dec. 24, 2021, which corresponds to Chinese Patent Application No. 202010571269.0 and is related to U.S. Appl. No. 16/909,212; with English language translation.
An Office Action issued by the United States Patent and Trademark Office dated Dec. 29, 2021, which corresponds to U.S. Appl. No. 16/909,119 and is related to U.S. Appl. No. 16/909,212.
An Office Action mailed by the Japanese Patent Office dated Sep. 28, 2021, which corresponds to Japanese Patent Application No. 2020-095628 and is related to U.S. Appl. No. 16/909,212; with English language translation.
An Office Action mailed by the Japanese Patent Office dated Sep. 28, 2021, which corresponds to Japanese Patent Application No. 2020-095629 and is related to U.S. Appl. No. 16/909,212; with English language translation.
An Office Action issued by the United States Patent and Trademark Office dated Feb. 24, 2023, which corresponds to U.S. Appl. No. 16/909,119 and is related to U.S. Appl. No. 16/909,212.
An Office Action; "Notice of Reasons for Refusal," mailed by the Japanese Patent Office dated Sep. 12, 2023, which corresponds to Japanese Patent Application No. 2019-237765 and is related to U.S. Appl. No. 16/909,212; with English language translation.
An Office Action; "Notice of Reasons for Refusal,"mailed by the Japanese Patent Office dated Sep. 19, 2023, which corresponds to Japanese Patent Application No. 2019-237764 and is related to U.S. Appl. No. 16/909,212; with English language translation.

* cited by examiner

FIG. 13

| | 1ST CONFIGURATION EXAMPLE | 2ND CONFIGURATION EXAMPLE | 3RD CONFIGURATION EXAMPLE | 4TH CONFIGURATION EXAMPLE | 5TH CONFIGURATION EXAMPLE |
|---|---|---|---|---|---|
| CROSS SECTION | 17a | 30a, 17a | 30b, 17a | 30c, 17a | 30d, 17a |
| THICKNESS OF DIFFERENTLY SHAPED PORTION | NONE | SMALL | MEDIUM | LARGE | VARIED |
| COMPRESSIVE STIFFNESS | EXTREMELY SMALL | SMALL | MEDIUM | LARGE | LARGE |
| WEIGHT | EXTREMELY SMALL | SMALL | MEDIUM | LARGE | MEDIUM |

FIG. 14

| | 1ST CONFIGURATION EXAMPLE | 6TH CONFIGURATION EXAMPLE | 7TH CONFIGURATION EXAMPLE | 8TH CONFIGURATION EXAMPLE | 9TH CONFIGURATION EXAMPLE |
|---|---|---|---|---|---|
| CROSS SECTION | 17a | 30e, 17a | 30f, 17a | 30g, 17a | 30h, 17a |
| SHAPE OF DIFFERENTLY SHAPED PORTION | NONE | CORRUGATED | CURVED & CONVEX PLATE | CURVED & CONCAVE PLATE | FLAT PLATE |
| COMPRESSIVE STIFFNESS | EXTREMELY SMALL | SMALL | MEDIUM | LARGE | EXTREMELY LARGE |
| WEIGHT | EXTREMELY SMALL | LARGE | MEDIUM | MEDIUM | SMALL |

FIG.46A1  FIG.46A2  FIG.46A3  FIG.46A4
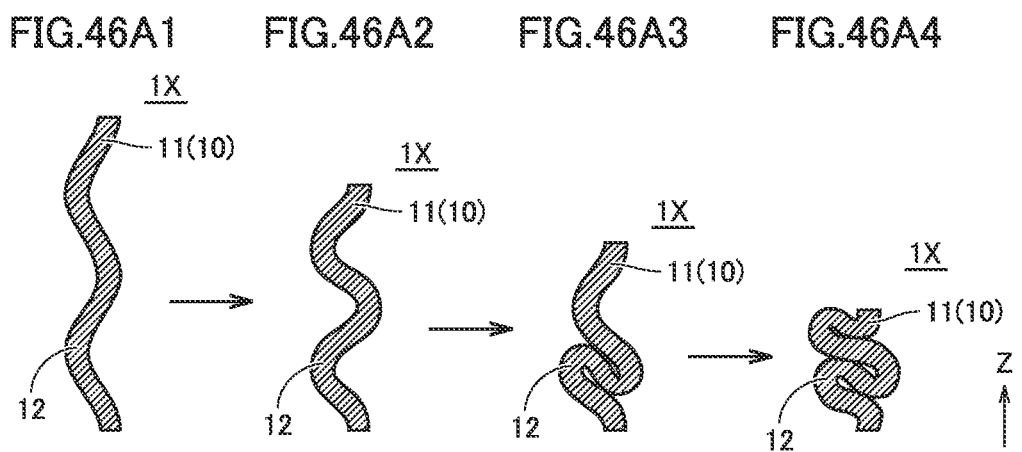
FIG.46B1  FIG.46B2  FIG.46B3  FIG.46B4
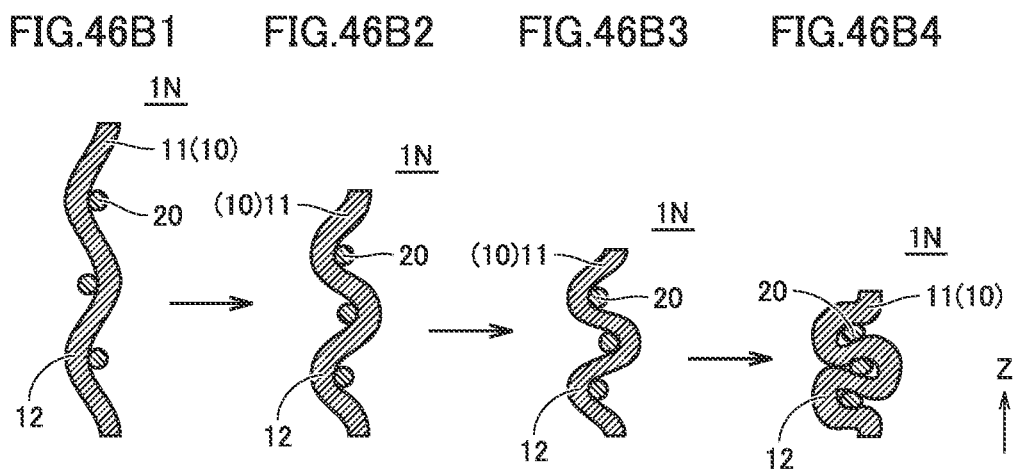

SHOCK ABSORBER, SHOE SOLE AND SHOE

CROSS REFERENCE TO RELATED APPLICATIONS

This nonprovisional application is based on Japanese Patent Application Nos. 2019-237764 and 2019-237765 filed on Dec. 27, 2019 and Nos. 2020-095628 and 2020-095629 filed on Jun. 1, 2020 with the Japan Patent Office, the entire contents of which are hereby incorporated by reference.

BACKGROUND OF THE INVENTION

Field of the Invention

The present invention relates to a shock absorber for absorbing shock, a shoe sole comprising the shock absorber, and a shoe comprising the shoe sole.

Description of the Background Art

Conventionally, various types of shock absorbers for absorbing shock have been known, and these various types of shock absorbers have been used depending on the application. For example, a shoe may have a shoe sole provided with a shock absorber in order to absorb shock caused upon landing. The shock absorber provided to the shoe sole is typically composed of a member made of resin or rubber.

In recent years, there have also been developed shoes having a shoe sole provided with a part having a lattice structure, a web structure or the like so that not only a material but also a structure provides an enhanced shock absorbing function. A shoe comprising a shoe sole provided with a part having a lattice structure is disclosed for example in U.S. Patent Publication No. 2018/0049514.

Japanese National Patent Publication No. 2017-527637 describes that a three-dimensional object which is manufactured in a three-dimensional additive manufacturing method can be manufactured by adding thickness to a geometrical surface structure, such as a polyhedron having a cavity therein or a triply periodic minimal surface, and discloses that composing the three-dimensional object of an elastic material allows the object to be applied for example to a shoe sole.

SUMMARY OF THE INVENTION

Herein, the shock absorber having a structure in which a thickness is added to a geometrical surface structure has a structural feature, that is, it achieves large compressive stiffness more easily than a shock absorber including a part having a lattice structure or a web structure.

However, when it is attempted to obtain large compressive stiffness in a shock absorber having such a structure, there is a problem, that is, an increased wall thickness results in an increased volume ratio and the shock absorber's weight is significantly increased. In particular, when it is desired to locally increase the compressive stiffness of only a portion of the shock absorber, and that portion's wall thickness is increased, that portion's weight is significantly increased, and the shock absorber inevitably has an increased overall weight, which is a significant obstacle to weight reduction.

In addition, a shock absorber having a structure in which a thickness is added to a triply periodic minimal surface has a problem, that is, due to the structure, stress concentration is locally caused when an external force is received. The local stress concentration causes a decrease in durability.

Accordingly, it is a first object of the present invention to provide a shock absorber which is lightweight and has an excellent shock absorbing function, and can be used in various applications, a shoe sole comprising the shock absorber, and a shoe comprising the shoe sole.

A second object of the present invention is to provide a shock absorber which has an excellent shock absorbing function and is also excellent in durability, and can be used in various applications, a shoe sole comprising the shock absorber, and a shoe comprising the shoe sole.

A shock absorber according to a first aspect of the present invention includes a three-dimensional structure composed of a unit structure repeatedly, regularly and continuously arranged in at least one direction, the unit structure being a three-dimensional shape formed by a wall having an external shape defined by a pair of parallel planes or curved surfaces. In the shock absorber according to the first aspect of the present invention, a differently shaped portion which does not correspond to the wall defining the unit structure is locally provided in a shock absorbing region which is a region in which the three-dimensional structure has the unit structure disposed.

A shoe sole according to the first aspect of the present invention comprises the shock absorber according to the first aspect of the present invention described above.

A shoe according to the first aspect of the present invention includes the shoe sole according to the first aspect of the present invention described above, and an upper provided above the shoe sole.

A shock absorber according to a second aspect of the present invention includes a three-dimensional structure composed of a unit structure repeatedly, regularly and continuously arranged in at least one direction, the unit structure being a three-dimensional shape formed by a wall having an external shape defined by a pair of parallel curved surfaces. The three-dimensional structure is composed of a triply periodic minimal surface with a thickness added thereto, and has a meandering portion which is a portion presenting a cross-sectional shape extending in a meandering manner when the three-dimensional structure is cut along at least a specific plane. The shock absorber according to the second aspect of the present invention includes a reinforcement portion to reinforce a turning point of the meandering portion.

A shoe sole according to the second aspect of the present invention comprises the shock absorber according to the second aspect of the present invention described above.

A shoe according to the second aspect of the present invention includes the shoe sole according to the second aspect of the present invention described above, and an upper provided above the shoe sole.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing first to fifth configuration examples of an end portion of the shock absorber shown in FIG. 11.

FIG. 14 is a diagram showing first and sixth to ninth configuration examples of the end portion of the shock absorber shown in FIG. 11.

FIG. 46A1 to FIG. 46A4 and FIG. 46B1 to FIG. 46B4 are schematic cross sections for illustrating a difference between how the shock absorbers according to comparative examples 1 and 2 deform and how the shock absorber according to the example deforms.

DESCRIPTION OF THE PREFERRED EMBODIMENTS

Hereinafter, embodiments of the present invention will be described in detail with reference to the accompanying drawings. In the following embodiments, identical or common portions are identically denoted in the figures, and will not be described repeatedly.

First Embodiment

Figure 1:
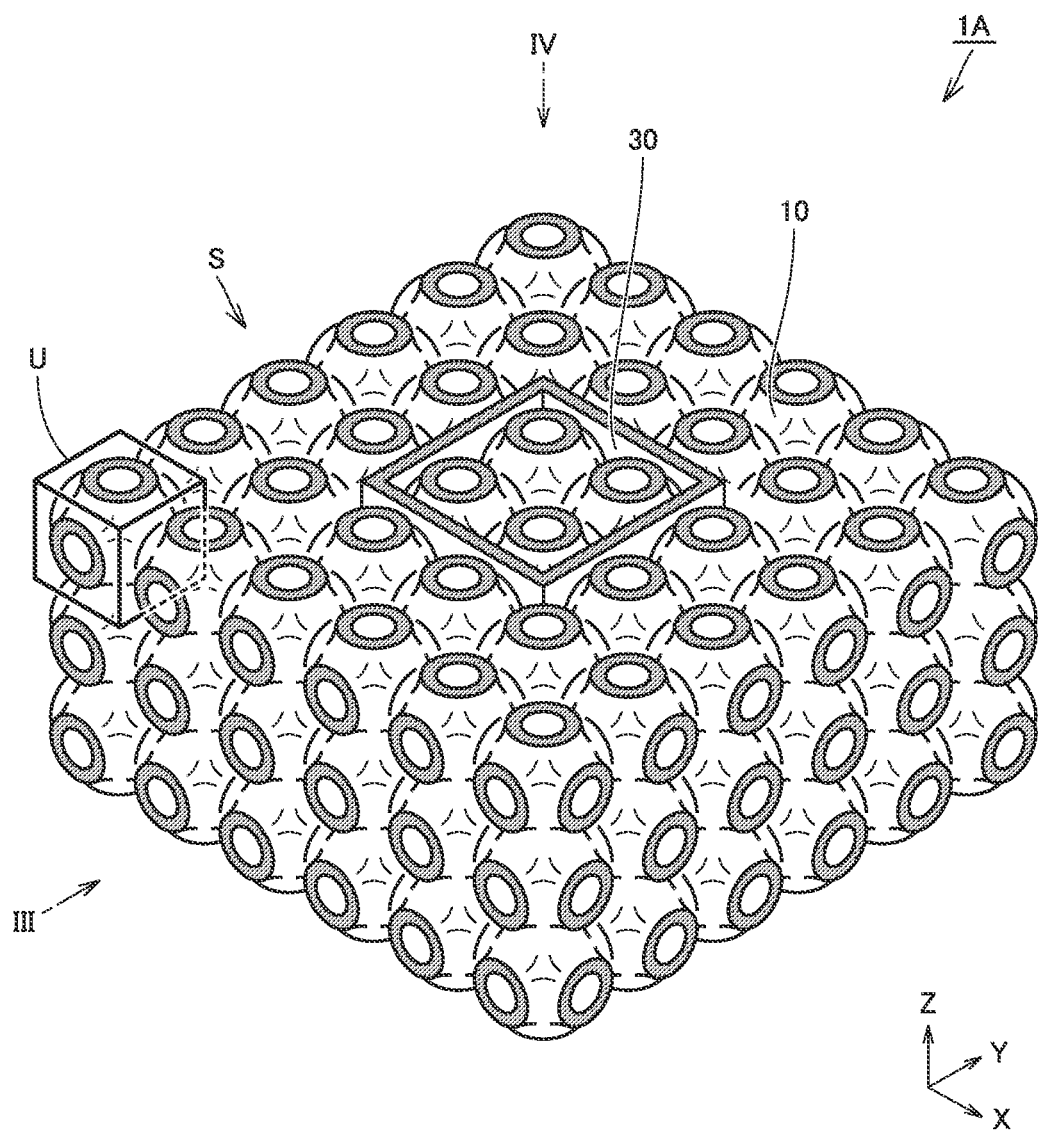
FIG. 1 is a perspective view of a shock absorber according to a first embodiment.
Figure 2:
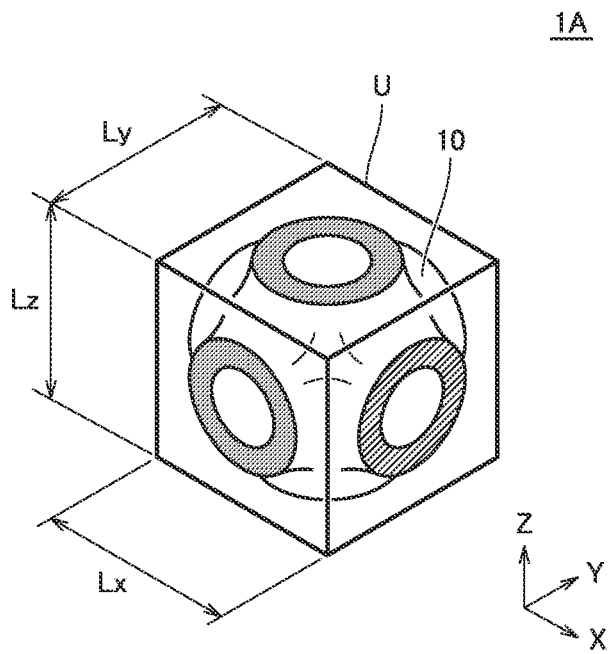
FIG. 2 is a perspective view of a unit structure of the shock absorber shown in FIG. 1.
Figure 3:
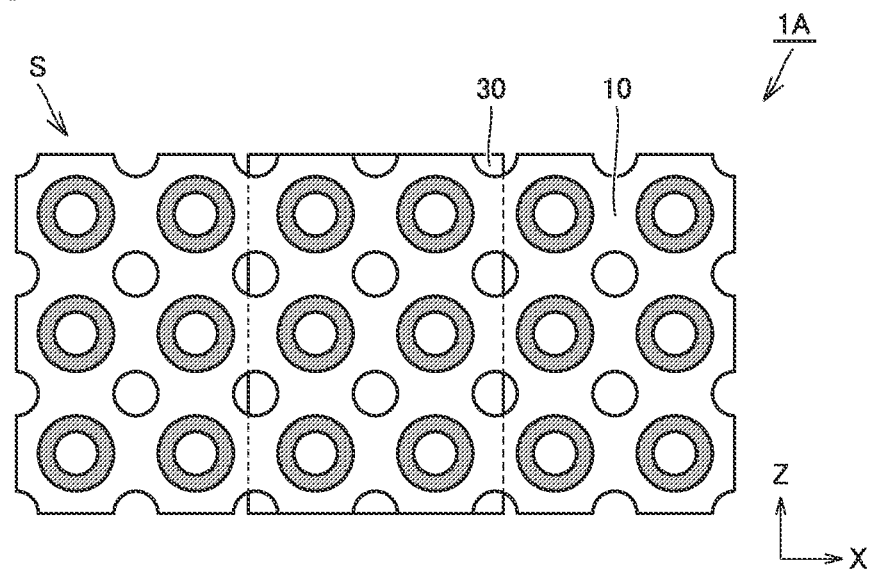
FIG. 3 is a front view of the shock absorber shown in FIG. 1.
Figure 4:
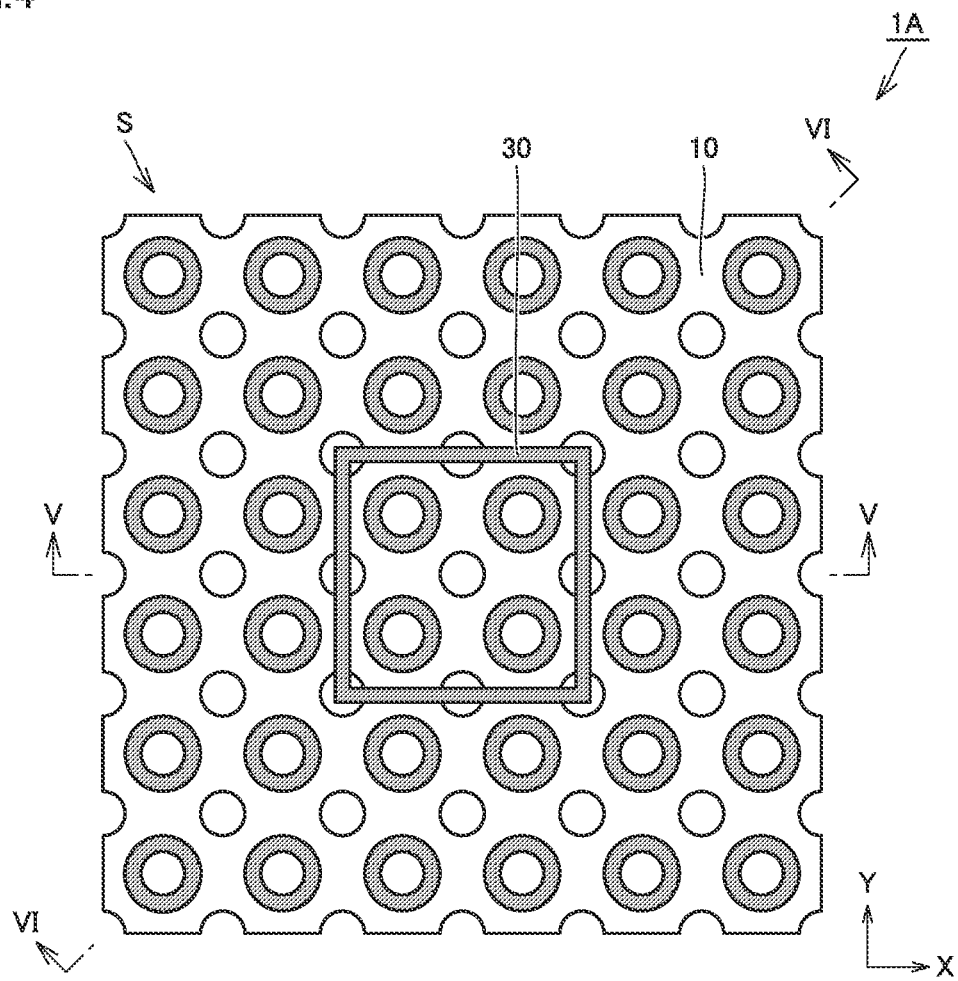
FIG. 4 is a plan view of the shock absorber shown in FIG. 1.
Figure 5:
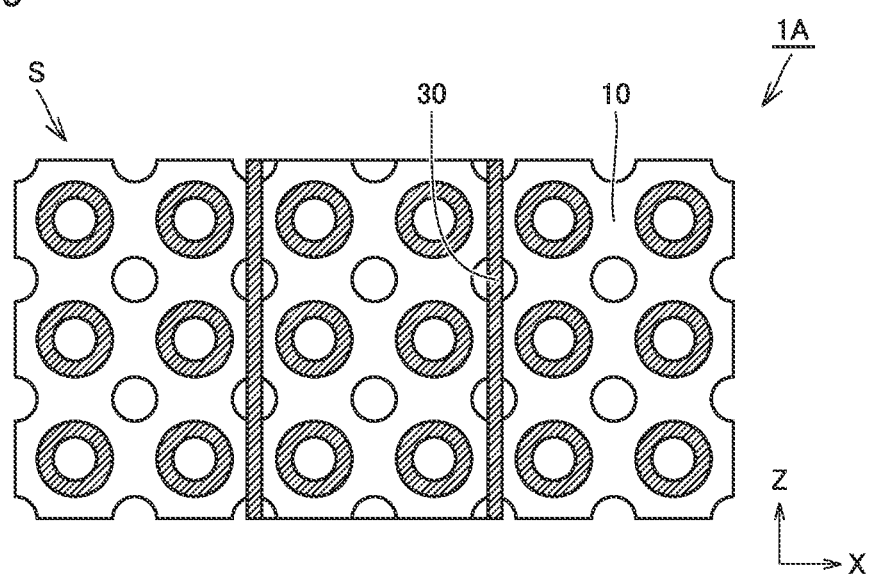
FIG. 5 is a cross section of the shock absorber shown in FIG. 1.
Figure 6:
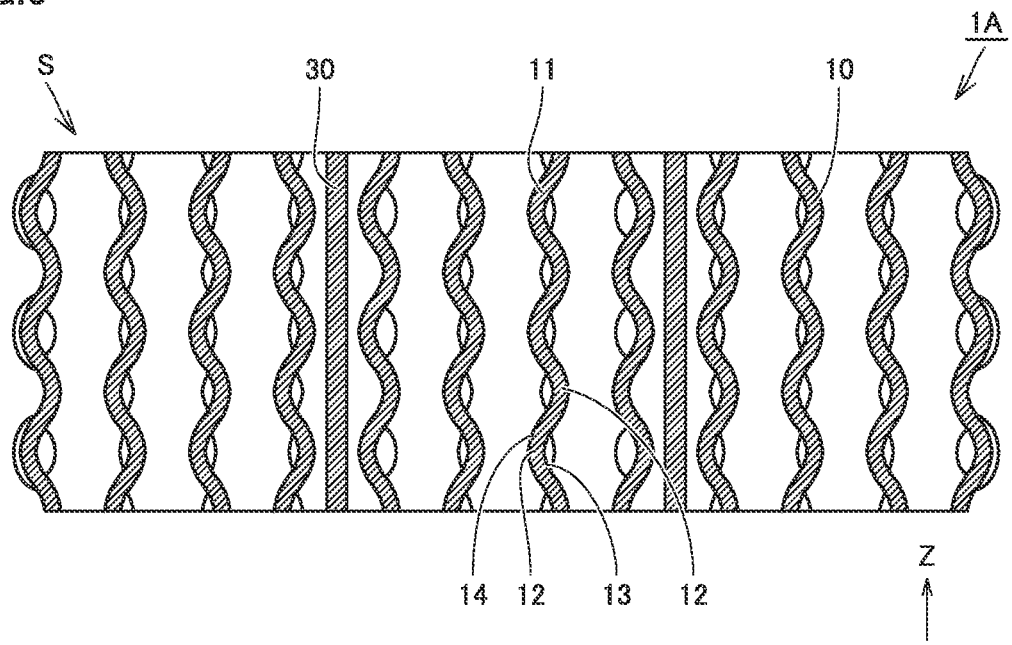
FIG. 6 is a cross section of the shock absorber shown in FIG. 1.

FIG. 1 is a perspective view of a shock absorber according to a first embodiment. FIG. 2 is a perspective view of a unit structure of the shock absorber shown in FIG. 1. FIG. 3 is a front view of the shock absorber seen in a direction indicated by an arrow III shown in FIG. 1. FIG. 4 is a plan view of the shock absorber seen in a direction indicated by an arrow IV shown in FIG. 1. FIG. 5 is a cross section of the shock absorber taken along a line V-V shown in FIG. 4. FIG. 6 is a cross section of the shock absorber taken along a line VI-VI shown in FIG. 4. Hereinafter, a shock absorber 1A according to the present embodiment will be described with reference to FIGS. 1 to 6.

As shown in FIGS. 1 to 6, shock absorber 1A includes a three-dimensional structure S having a plurality of unit structures U (see FIGS. 1 and 2, in particular). The plurality of unit structures U each have a three-dimensional shape formed by a wall 10 having an external shape defined by a pair of parallel curved surfaces.

Herein, in FIGS. 1 and 2, in order to facilitate understanding, a reference character U does not denote the unit structure in a strict sense; rather, it denotes a unit space in the form of a rectangular parallelepiped that is a space occupied by the unit structure. Furthermore, in FIGS. 1 to 4, in order to facilitate understanding, of an external surface of shock absorber 1A having an overall external shape generally in the form a rectangular parallelepiped, end surfaces located in the X, Y and Z directions shown in the figures are shown in a deep color and thus distinguished from the remainder of the external surface. As shown in FIG. 2, a dimension of unit structure U in a widthwise direction (the X direction shown in the figures) is represented as Lx, a dimension of unit structure U in a depthwise direction (the Y direction shown in the figures) is represented as Ly, and a dimension of unit structure U in a heightwise direction (the Z direction shown in the figures) is represented as Lz.

The plurality of unit structures U are repeatedly, regularly and continuously arranged in each of the widthwise, depthwise and heightwise directions. Shock absorber 1A according to the present embodiment has six unit structures U arranged in the widthwise direction or the X direction and the depthwise direction or the Y direction side by side, and has three unit structures U arranged in the heightwise direction or the Z direction side by side.

Shock absorber 1A according to the present embodiment is intended to exhibit a shock absorbing function in the heightwise direction (the Z direction shown in the figure). Accordingly, when shock absorber 1A receives a load, shock absorber 1A exhibits the shock absorbing function in an axial direction, which will match the heightwise direction described above. The number of unit structures U repeated in the widthwise, depthwise and heightwise directions is not particularly limited, and two or more unit structures arranged in at least one of the three directions suffice.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1A has a structure in which a thickness is added to a geometrical surface structure. In shock absorber 1A according to the present embodiment, the surface structure is a Schwarz' P structure, which is a type of mathematically defined triply periodic minimal surface. Note that a minimal surface is defined as a curved surface of those having a given closed curve as a boundary that is minimal in area.

As shown in FIG. 6, three-dimensional structure S that is a Schwarz' P structure with a thickness added thereto has a meandering portion 11 which is a portion presenting a cross-sectional shape extending in a meandering manner when three-dimensional structure S is cut along a specific plane. In the present embodiment, the specific plane is a plane orthogonal to the plane of the sheet of FIG. 4 and parallel to the line VI-VI.

While there will be three types of meandering portions 11 in total in terms of the structure of three-dimensional structure S: one extending in the widthwise direction; one extending in the depthwise direction; and one extending in the heightwise direction, herein, meandering portion 11 which appears in the cross section shown in FIG. 6, that is, extends in the heightwise direction (i.e., the Z direction), is noted.

Meandering portion 11 extending in the heightwise direction has a plurality of turning points 12 located in the heightwise direction, and turning point 12 is provided with an internal corner portion 13 and an external corner portion 14. Of these portions, internal corner portion 13 is a portion which appears in the above cross-sectional shape to have a concave shape on a surface of wall 10, and external corner portion 14 is a portion which appears in the above cross-sectional shape to have a convex shape on a surface of wall 10. Herein, a distance between meandering portion 11 extending in the heightwise direction and meandering portion 11 adjacent thereto varies depending on the location in the heightwise direction, and the distance periodically increases and decreases in the heightwise direction.

While the above-described dimensions Lx, Ly, and Lz are not particularly limited and are variable, in the present embodiment these dimensions Lx, Ly, and Lz satisfy Lx=Ly=Lz. Note that when, of Lx, Ly, and Lz, dimension Lz in the axial direction in which a shock absorbing function is intended to be exhibited, or the heightwise direction, is represented as L1 and the longer one of the remaining, widthwise and depthwise dimensions Lx and Ly is represented as L2, dimensions L1 and L2 satisfying 1.1≤L1/L2≤4.0 allow large compressive stiffness to be obtained and dimensions L1 and L2 satisfying 0.1≤L1/L2≤0.9 allow compressive stiffness to be reduced and hence high deformability to be obtained. Note, however, that dimensions L1 and L2 do not necessarily satisfy these conditions, and whether these conditions are satisfied is arbitrary.

As shown in FIG. 1 and FIGS. 3 to 6, shock absorber 1A has a differently shaped portion 30 in addition to wall 10 described above. Differently shaped portion 30 is a portion which does not correspond to wall 10 defining unit structure U, and is distinguished from wall 10.

Differently shaped portion 30 is locally provided in a shock absorbing region, which is a region in which three-dimensional structure S described above has unit structure U disposed (in the present embodiment, the entirety of shock absorber 1A corresponds to the shock absorbing region). More specifically, in the present embodiment, differently shaped portion 30 is provided at a center portion of shock absorber 1A in a plan view, and is not provided in a peripheral portion which is a portion excluding the center portion.

Differently shaped portion 30 is in the form of a plate having a thickness in a direction intersecting with the axial direction (that is, the Z direction) in which shock absorber 1A exhibits a shock absorbing function when shock absorber 1A receives a load. More specifically, in the present embodiment, differently shaped portion 30 is in the form of a rectangular tube composed of four plate-shaped portions, and each plate-shaped portion extends in the Z direction shown in the figure. In particular, in the present embodiment, the four plate-shaped portions constituting differently shaped portion 30 traverses the shock absorbing region in the Z direction shown in the figure to reach opposite ends of shock absorber 1A.

Differently shaped portion 30 is disposed in a space located between meandering portions 11 described above, and is connected to be integrated with unit structure U of an adjacent portion. Accordingly, a portion of shock absorber 1A provided with differently shaped portion 30 will be enhanced in compressive stiffness more than the remaining portion of shock absorber 1A (that is, a portion without differently shaped portion 30).

This is because, in the portion of shock absorber 1A provided with differently shaped portion 30 that has a shape of a plate extending in the axial direction, the compressive stiffness of differently shaped portion 30 having the shape of the plate is further added to the compressive stiffness of wall 10 of the portion provided with differently shaped portion 30. Thus providing shock absorber 1A with such differently shaped portion 30 allows shock absorber 1A to have a local, significantly stiff portion.

Note that, as has been described above, when differently shaped portion 30 is configured to reach opposite ends of shock absorber 1A in the axial direction, differently shaped portion 30 will act like a partition, and the above-described effect can be more remarkable.

A shock absorber which is lightweight and has an excellent shock absorbing function can thus be obtained by adopting a configuration in which differently shaped portion 30 that does not correspond to wall 10 defining unit structure U is locally provided in a shock absorbing region which is a region in which three-dimensional structure S has unit structure U disposed, as in shock absorber 1A according to the present embodiment.

Herein, while shock absorber 1A may be manufactured in any method, it can be additively manufactured using a three dimensional additive manufacturing apparatus for example. When shock absorber 1A is additively manufactured using a three dimensional additive manufacturing apparatus, wall 10 and differently shaped portion 30 will be identical in material. Note, however, that when a three dimensional additive manufacturing apparatus of a fused deposition modelling (FDM) system is used, it is also possible to form wall 10 of a material and form differently shaped portion 30 of a different material.

While shock absorber 1A (that is, wall 10 and differently shaped portion 30) may basically be formed of any material having a large elastic force, it is preferably formed of a resin material or a rubber material. More specifically, when shock absorber 1A is formed of resin, shock absorber 1A can be formed for example of thermoplastic resin such as ethylene-vinyl acetate copolymer (EVA) or can be formed for example of thermosetting resin such as polyurethane (PU). When shock absorber 1A is formed of rubber, it can be formed for example of butadiene rubber.

Shock absorber 1A can be composed of a polymer composition. In that case, an example of a polymer to be contained in the polymer composition includes olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), propylene-vinyl acetate copolymer, and the like.

The polymer may be an amide-based polymer such as an amide-based elastomer and an amide-based resin. Examples of the amide-based polymer include polyamide 6, polyamide 11, polyamide 12, polyamide 66, and polyamide 610.

The polymer may be an ester-based polymer such as an ester-based elastomer and an ester-based resin. Examples of the ester-based polymer include polyethylene terephthalate and polybutylene terephthalate.

The polymer may be a urethane-based polymer such as a urethane-based elastomer and a urethane-based resin. Examples of the urethane-based polymer include polyester-based polyurethane and polyether-based polyurethane.

The polymer may be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), and acrylonitrile butadiene styrene resin (ABS).

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, polyvinyl chloride-based resins, silicone-based elastomers, butadiene rubber (BR), isoprene rubber (IR), chloroprene (CR), natural rubber (NR), styrene-butadiene rubber (SBR), acrylonitrile-butadiene rubber (NBR), butyl rubber (IIR), and the like.

As has been described above, shock absorber 1A according to the present embodiment will be lightweight and have an excellent shock absorbing function. This is significantly attributed to a structural feature (a feature in shape) of shock absorber 1A. Hereinafter, an effect obtained by shock absorber 1A according to the present embodiment will be described based on a result of a first verification test conducted by the present inventor to simulate the shock absorbing function of the shock absorber composed of three-dimensional structure S in which a thickness is added to a Schwarz' P structure (that is, a shock absorber without differently shaped portion 30 as described above).

Figure 7:
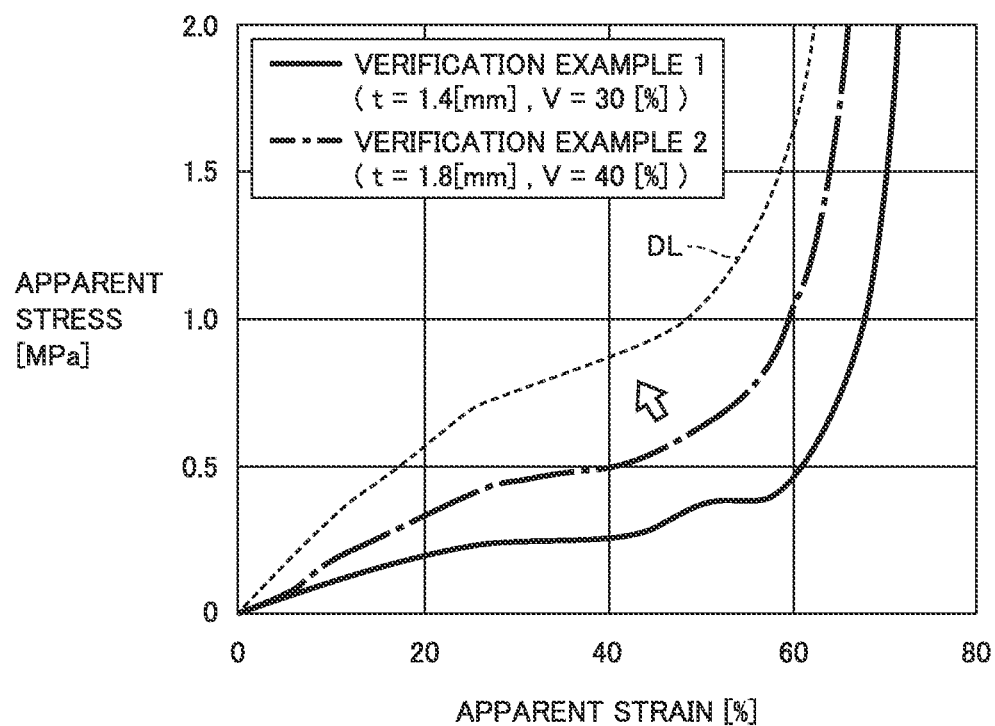
FIG. 7 is a graph showing a result of simulating the shock absorbing functions of the shock absorbers according to verification examples 1 and 2.

FIG. 7 is a graph showing a result of simulating the shock absorbing functions of the shock absorbers for verification examples 1 and 2.

In the first verification test, models for shock absorbers for verification examples 1 and 2 were specifically designed and a case in which these models received an external force in a prescribed direction was assumed, and how the models would behave in that case was simulated and their behaviors were individually analyzed. More specifically, a so-called stress-strain curve was obtained for each of these models.

Herein, as has been described above, the shock absorbers according to the verification examples 1 and 2 are each a shock absorber including three-dimensional structure S in which a thickness is added to a Schwarz' P structure (that is, a shock absorber without differently shaped portion 30 described above), and thus composed of wall 10 alone.

More specifically, the shock absorber according to the verification example 1 includes unit structure U having widthwise, depthwise and heightwise dimensions each 10 mm with wall 10 having a thickness t of 1.4 mm. This case provides a volume ratio V of about 30%.

The shock absorber according to the verification example 2 includes unit structure U having widthwise, depthwise and heightwise dimensions each of 10 mm with wall 10 having a thickness t of 1.8 mm. This case provides a volume ratio V of about 40%.

Further, the shock absorbers according to verification examples 1 and 2 both received external force in the axial direction described above or the heightwise direction. Note that the shock absorbers according to the verification examples 1 and 2 were both assumed to be formed of a urethane-based acrylic polymer.

To increase compressive stiffness, unit structure U may typically have wall 10 increased in thickness. However, when wall 10 is increased in thickness, volume ratio V will also increase accordingly, so that the larger wall 10 is in thickness, the larger volume ratio V is, resulting in the shock absorber being heavier. That is, there is a so-called trade-off relationship between ensuring compressive stiffness and reducing weight.

However, for example, when the shock absorbers according to the verification examples 1 and 2 are provided with differently shaped portions 30 as described above locally at a portion, that portion provided with differently shaped portion 30 will provide performance as indicated in FIG. 7 by a broken line DL, and the shock absorbers can as a whole obtain a desired shock absorbing function. When this method is compared with obtaining locally large compressive stiffness by increasing wall 10 of the portion of interest entirely in thickness, the former can significantly suppress an increase in weight of the shock absorber.

Shock absorber 1A according to the present embodiment described above can thus be a shock absorber which is lightweight and has an excellent shock absorbing function, and can be used for various applications.

Note that, as a three-dimensional shape formed by a wall having an external shape defined by a pair of parallel curved surfaces, other than that in which a thickness is added to a Schwarz' P structure, as described above, there are also a three-dimensional shape in which a thickness is added to a Schwarz' D structure, a three-dimensional shape in which a thickness is added to a gyroid structure, and the like. Therefore, a shock absorber including as a shock absorbing region a three-dimensional structure in which a thickness is added to the Schwarz' D structure, the gyroid structure or the like may locally be provided with such a differently shaped portion as described above.

(First to Third Variations)

Figure 8:
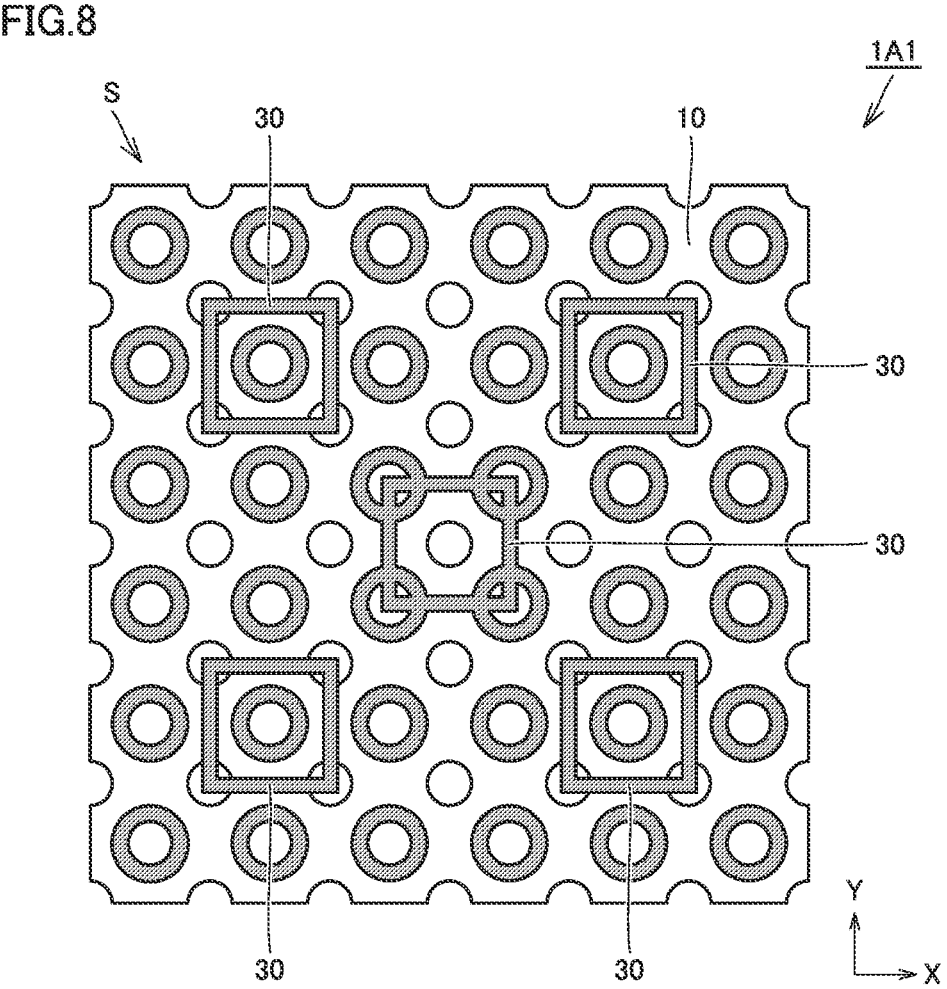
FIG. 8 is a plan view of a shock absorber according to a first variation.
Figure 9:
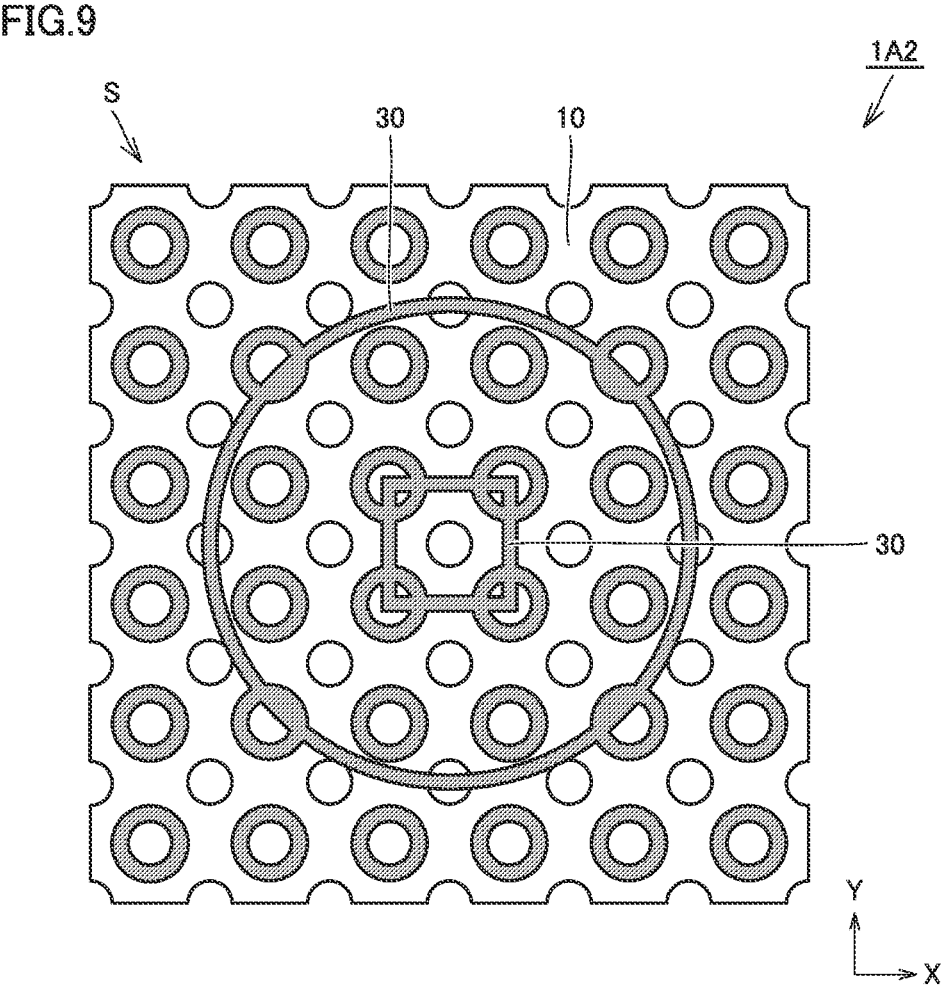
FIG. 9 is a plan view of a shock absorber according to a second variation.
Figure 10:
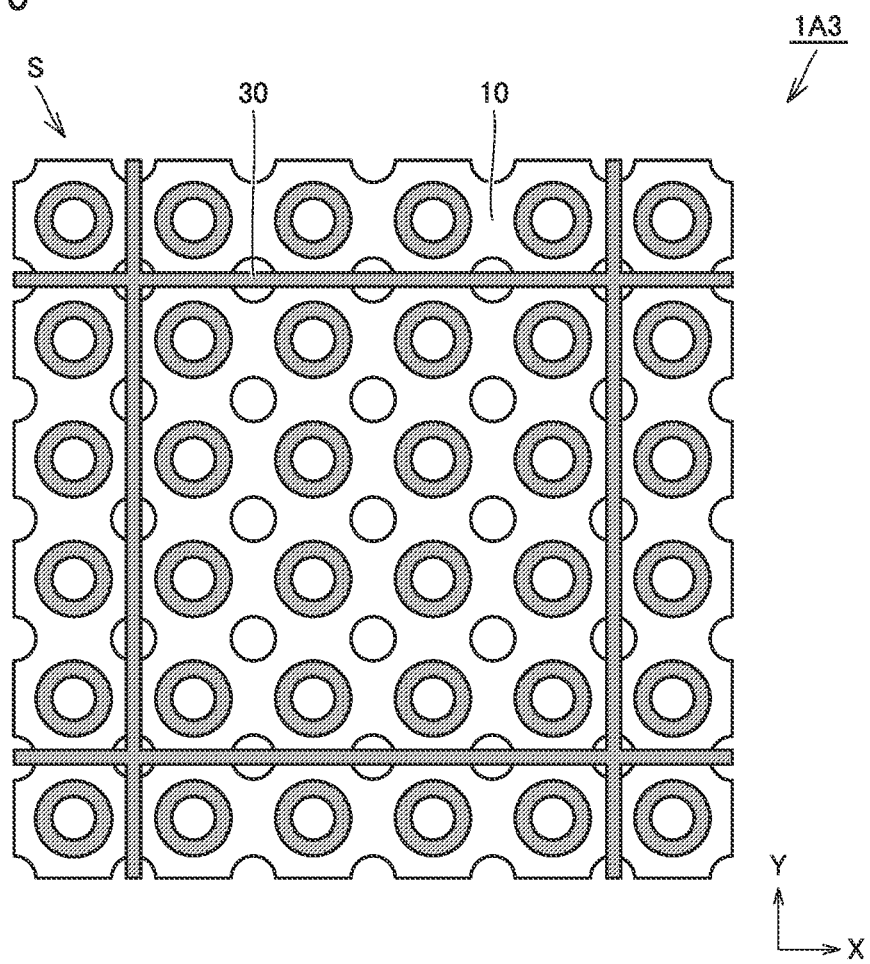
FIG. 10 is a plan view of a shock absorber according to a third variation.

FIGS. 8 to 10 are plan views of shock absorbers according to first to third variations, respectively. Hereinafter, shock absorbers 1A1 to 1A3 according to the first to third variations based on the first embodiment described above will be described with reference to FIGS. 8 to 10.

While in the first embodiment, differently shaped portion 30 in the form of a rectangular tube is provided to shock absorber 1A only at a center portion in a plan view by way of example, shock absorbers exhibiting different shock absorbing functions and being also light in weight can be manufactured by variously changing differently shaped portion 30 in position, shape, number and the like. The first to third variations described below exemplify a case in which shock absorber 1A is thus changed.

As shown in FIG. 8, shock absorber 1A1 according to the first variation is provided with a plurality of differently shaped portions 30 that are identically shaped and independent of one another uniformly throughout a shock absorbing region. More specifically, shock absorber 1A1 according to the first variation has the plurality of differently shaped portions 30 each in the form of a rectangular tube, and differently shaped portions 30 each in the form of the rectangular tube are arranged in a staggered manner in a plan view.

As shown in FIG. 9, shock absorber 1A2 according to the second variation is provided with a plurality of differently shaped portions differently configured and independent of one another, and provided in a shock absorbing region. More specifically, shock absorber 1A2 according to the second variation is provided with differently shaped portion 30 in the form of a cylinder and a rectangular tube arranged concentrically in a plan view.

As shown in FIG. 10, shock absorber 1A3 according to the third variation is provided with a plurality of differently shaped portions 30 in the form of plates intersecting one another in a shock absorbing region. More specifically, shock absorber 1A3 according to the third variation has differently shaped portions 30 disposed to together form a number sign, and located along a peripheral edge of shock absorber 1A3 when seen in a plan view.

Thus, differently shaped portion 30 changed in position, shape, number and the like variously can also be as effective as has been described in the first embodiment. In particular, when differently shaped portion 30 that is locally provided is provided uniformly throughout the shock absorber, the shock absorber can obtain a generally uniform shock absorbing function throughout the shock absorber while having a reduced weight, and when differently shaped portions 30 having different shapes are provided in the shock absorber, the shock absorber can exhibit a different shock absorbing function for each portion of the shock absorber while having a reduced weight.

Second Embodiment

Figure 11:
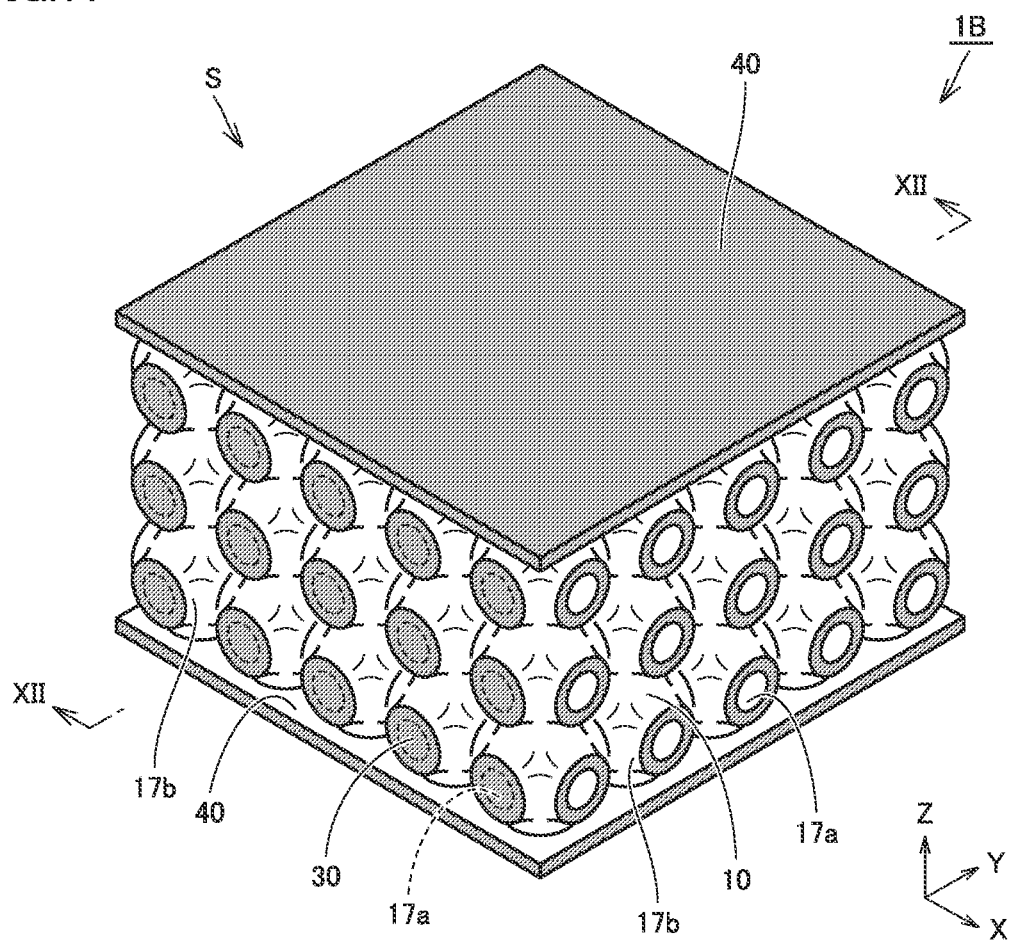
FIG. 11 is a perspective view of a shock absorber according to a second embodiment.
Figure 12:
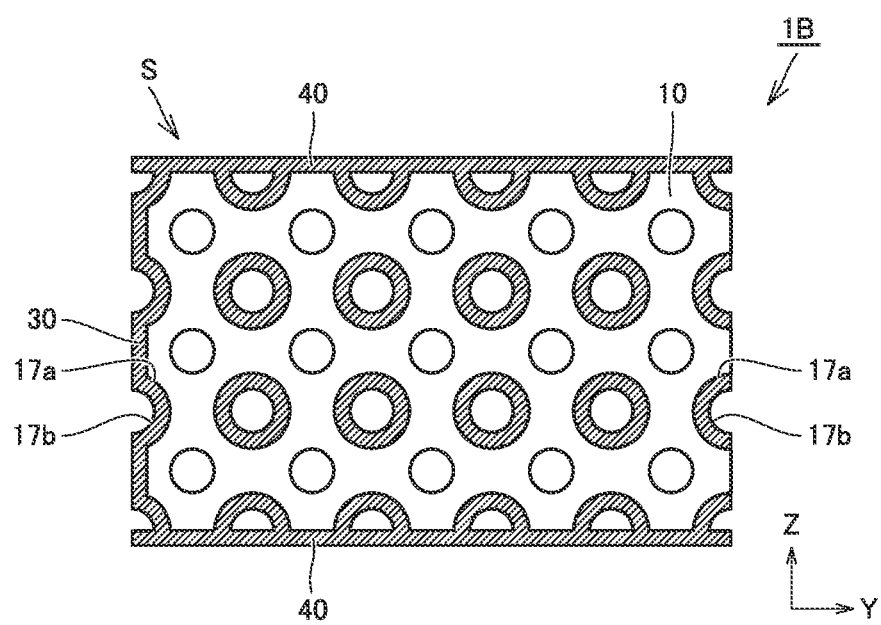
FIG. 12 is a cross section of the shock absorber shown in FIG. 11.

FIG. 11 is a perspective view of a shock absorber according to a second embodiment. FIG. 12 is a cross section of the shock absorber taken along a line XII-XII shown in FIG. 11. A shock absorber 1B according to the present embodiment will be described below with reference to FIGS. 11 and 12. Shock absorber 1B according to the present embodiment is different from shock absorber 1A according to the first embodiment mainly in how differently shaped portion 30 is configured.

As shown in FIGS. 11 and 12, shock absorber 1B according to the present embodiment includes a three-dimensional structure S having a plurality of unit structures, and three-dimensional structure S is formed of wall 10 having an external shape defined by a pair of parallel curved surfaces. Shock absorber 1B according to the present embodiment has a Schwarz' P structure as a reference in structure for three-dimensional structure S.

Shock absorber 1B is intended to exhibit a shock absorbing function in the heightwise direction (the Z direction shown in the figures), and a pair of supports 40 is provided at end portions in the heightwise direction to sandwich three-dimensional structure S. Paired supports 40 are each in the form of a plate. Paired supports 40 may each be a member discrete from three-dimensional structure S and bonded or the like and thus assembled to three-dimensional structure S or may be formed integrally with three-dimensional structure S. The pair of supports 40 is not necessarily formed of a material identical to that of three-dimensional structure S and may be formed of a material different from that of three-dimensional structure S.

Herein, shock absorber 1B according to the present embodiment has five unit structures U arranged in each of the widthwise direction or the X direction and the depthwise direction or the Y direction side by side, and has three unit structures U arranged in the heightwise direction or the Z direction side by side. In FIG. 11, to facilitate understanding, end surfaces located in the X, Y and Z directions shown in the figure are shown in a dark color and thus distinguished from the remainder of the external surface.

Shock absorber 1B according to the present embodiment is provided with a plurality of differently shaped portions 30 at a prescribed position in one end portion of a pair of end portions of the shock absorbing region composed of three-dimensional structure S that is located in the Y direction. The plurality of differently shaped portions 30 are provided to close a specific opening of a plurality of openings of three-dimensional structure S.

That is, when three-dimensional structure S has a Schwarz' P structure as a reference in structure, three-dimensional structure S will have an end with a plurality of first openings 17a aligned in a matrix and independent of one another and a single second opening 17b in the form of a lattice surrounding the plurality of first openings 17a. The plurality of differently shaped portions 30 are provided in the form of a cover so as to close the plurality of first openings 17a.

Herein, the plurality of differently shaped portions 30 each form a shape of a plate having a thickness in a direction intersecting with the axial direction (that is, the Z direction) in which shock absorber 1B exhibits a shock absorbing function as shock absorber 1B receives a load. That is, the plurality of differently shaped portions 30 each extend along the XZ plane. Thus, a portion of shock absorber 1B that is provided with the plurality of differently shaped portions 30 (That is, one of the pair of end portions of the shock absorbing region located in the Y direction) will be enhanced in compressive stiffness more than the remainder of shock absorber 1B.

Thus this configuration can also provide the shock absorbing region with a local, significantly stiff portion, and the shock absorber can be lightweight and have an excellent shock absorbing function, and can be used for various applications. Further, adopting the above configuration allows the plurality of differently shaped portions 30 to also function as a type of cover, and a secondary effect is also obtained, that is, can suppress otherwise intrusion of foreign matters into shock absorber 1B through those portions.

While shock absorber 1B according to the present embodiment is provided with a plurality of differently shaped portions 30 in the form of a cover only at one of a pair of end portions of the shock absorbing region located in the Y direction by way of example, a plurality of differently shaped portions 30 in the form of a cover may further be provided at at least one of the other end portion located in the Y direction and a pair of end portions located in the X direction.

FIGS. 13 and 14 are diagrams showing first to ninth configuration examples of the end portion of the shock absorber shown in FIG. 11. Hereinafter, with reference to FIGS. 13 and 14, some possible configurations of the end portion of shock absorber 1B will be described as first to ninth configuration examples. Variously changing the end portion in configuration can change the shock absorbing function variously.

While shock absorber 1B according to the second embodiment described above includes as a configuration of an end portion of shock absorber 1B a configuration in which the plurality of first openings 17a are exposed as they are (the configuration corresponds to the first configuration example shown in FIGS. 13 and 14) and a configuration in which the plurality of first openings 17a are closed by providing differently shaped portion 30 in the form of a plate (more precisely, a flat plate) (the configuration corresponds to the ninth configuration example shown in FIG. 14), differently shaped portion 30 can also be changed in shape variously when the plurality of first openings 17a are closed by differently shaped portion 30.

For example, as indicated in FIG. 13 by the second to fifth configuration examples, when differently shaped portion 30 is changed in thickness, the end portion can be changed in compressive stiffness accordingly.

That is, when a differently shaped portion 30b having a medium thickness, as in the third configuration example, serves as a reference, a differently shaped portion 30a having a relatively smaller thickness, as in the second configuration example, allows the end portion to have a relatively small compressive stiffness, and when there is no differently shaped portion provided, as in the first configuration example, the end portion can further be reduced in compressive stiffness. In contrast, a differently shaped portion 30c having a relatively increased thickness, as in the fourth configuration example, can increase the end portion's compressive stiffness to be relatively large.

Thus increasing or decreasing differently shaped portion 30 in thickness will also increase or decrease compressive stiffness accordingly. In this case, however, the shock absorber as a whole has a weight increasing or decreasing as differently shaped portion 30 is increased or decreased in thickness, and simply increasing differently shaped portion 30 in thickness would invite an increase in weight. In this regard, for example, as in the fifth configuration example, a differently shaped portion 30d varied in thickness to have a relatively increased thickness at a portion while having a relatively reduced thickness at a portion can provide relatively large compressive stiffness while suppressing an increase in weight.

For example, as indicated in FIG. 14 by the sixth to ninth configuration examples, when differently shaped portion 30 is changed in shape, the end portion can be changed in compressive stiffness accordingly.

That is, a differently shaped portion 30e in the form of a corrugated plate in cross section, as in the sixth configuration example, allows the end portion to have larger compressive stiffness than providing no differently shaped portion per se, as in the first configuration example, and a differently shaped portion 30f shaped in the form of a curved convex plate, as in the seventh configuration example, allows the end portion to have further larger compressive stiffness than differently shaped portion 30e in the form of a corrugated plate in cross section, as in the sixth configuration. Furthermore, differently shaped portion 30g in the form of a curved concave plate, as in the eighth configuration example, allows the end portion to have further larger compressive stiffness than differently shaped portion 30f shaped in the form of a curved convex plate, as in the seventh configuration example, and in addition, a differently shaped portion 30h in the form of a flat plate, as in the ninth configuration example, allows the end portion to have further larger compressive stiffness than differently shaped portion 30g in the form of a curved concave plate, as in the eighth configuration example.

Thus changing differently shaped portion 30 in shape will also change compressive stiffness accordingly. In that case, however, the shock absorber's overall weight will change as differently shaped portion 30 changes in shape. Note that when weight is considered, the first configuration example provides a smallest weight, followed by the ninth configuration example, the seventh and eighth configuration examples, and the sixth configuration example.

As is apparent from the above description, allowing the shock absorber to have an end portion changed in configuration variously for example as in the first to ninth configuration examples described above can provide a shock absorbing function with variations and allows the shock absorber to be used in more various applications.

(Fourth Variation)

Figure 15:
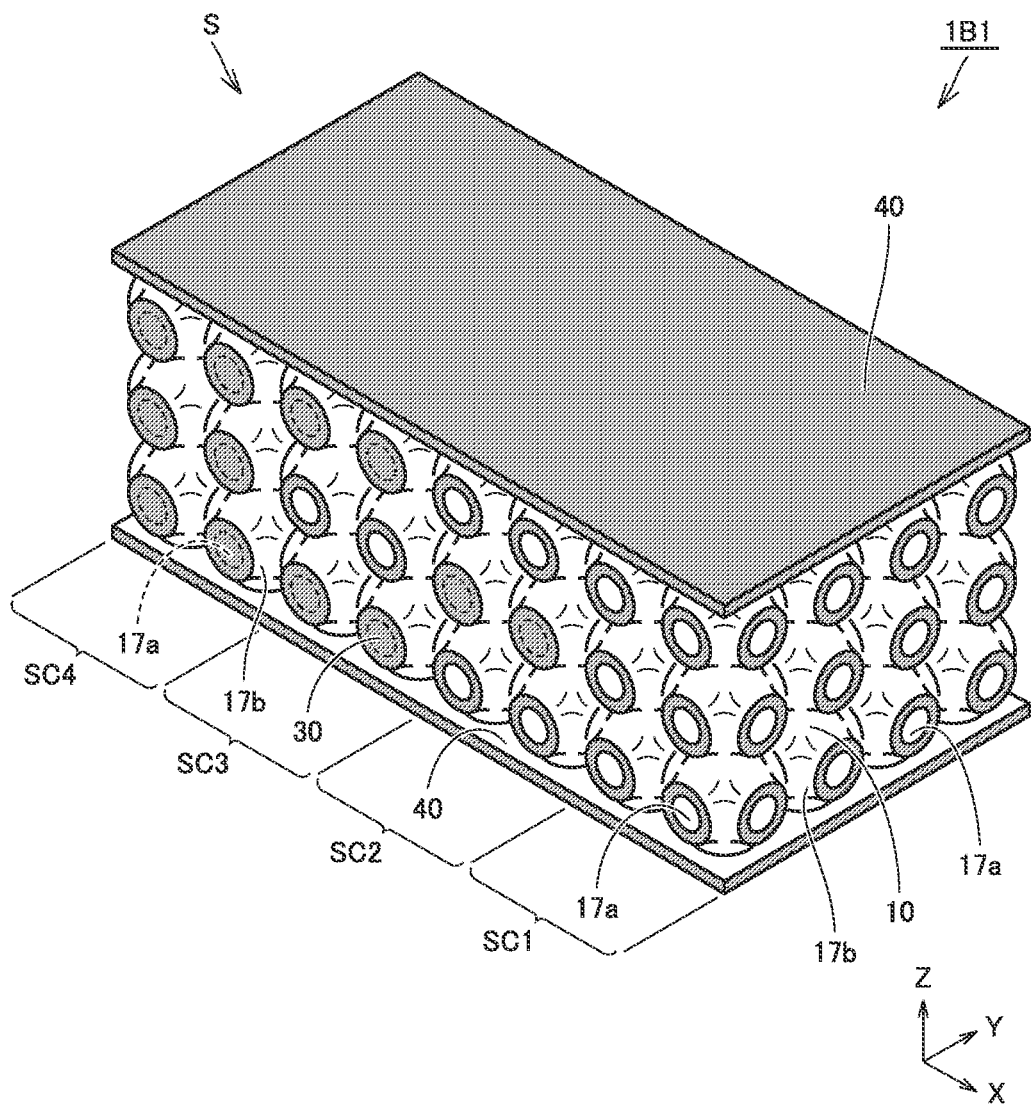
FIG. 15 is a perspective view of a shock absorber according to a fourth variation.

FIG. 15 is a perspective view of a shock absorber according to a fourth variation. Hereinafter, a shock absorber 1B1 according to the fourth variation based on the second embodiment will be described with reference to FIG. 15.

In the second embodiment described above, the plurality of first openings 17a located at a prescribed end portion of shock absorber 1B are all closed at that end portion by differently shaped portion 30 in the form of a cover by way of example, it is not always necessary to close all of the plurality of first openings 17a located at that end portion by differently shaped portion 30, and it is also possible to limit doing so to a portion to change a shock absorbing function for each portion variously. The fourth variation described below shows one example thereof.

As shown in FIG. 15, shock absorber 1B1 according to the fourth variation has eight unit structures U arranged in the widthwise direction or the X direction side by side, four unit structures U arranged in the depthwise direction or the Y direction side by side, and three unit structures U arranged in the heightwise direction or the Z direction side by side. In FIG. 15, to facilitate understanding, end surfaces located in the X direction, the Y direction, and the Z direction shown in the figure are shown in a dark color and thus distinguished from the remainder of the external surface.

Herein, in shock absorber 1B1 according to the present embodiment, a shock absorbing region formed by three-dimensional structure S is divided into four sections SC1 to SC4 in the X direction, and four sections SC1 to SC4 are each different in how one end portion of a pair of end portions located in the Y direction is configured.

That is, section SC1 has the one end portion with a total of six first openings 17a all opened. Section SC2 has the one end with a total of four first opening 17a at upper and lower stages opened and two first openings 17a at a middle stage closed by differently shaped portion 30. Section SC3 has the one end with two first openings 17a at the middle stage opened and a total of four first openings 17a at the upper and lower stages closed by differently shaped portion 30. Section SC4 has the one end with a total of six first openings 17a all closed by differently shaped portion 30.

Therefore, by variously selecting an opening to be closed by differently shaped portion 30, it is possible to form in a shock absorbing region a region different in compressive stiffness for each portion and furthermore, in a stepwise manner. Therefore, by adopting such a configuration, a lightweight and excellently shock absorbing shock absorber which can be used in various applications can be provided.

(Fifth and Sixth Variations)

Figure 16:
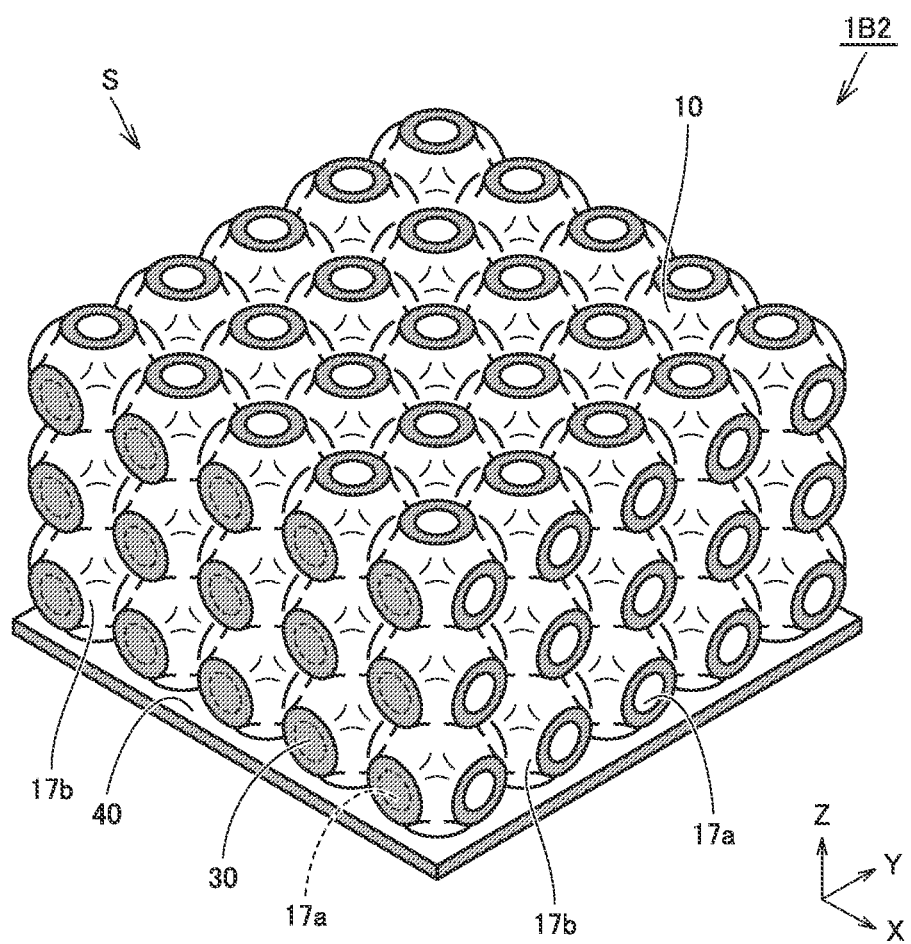
FIG. 16 is a perspective view of a shock absorber according to a fifth variation.
Figure 17:
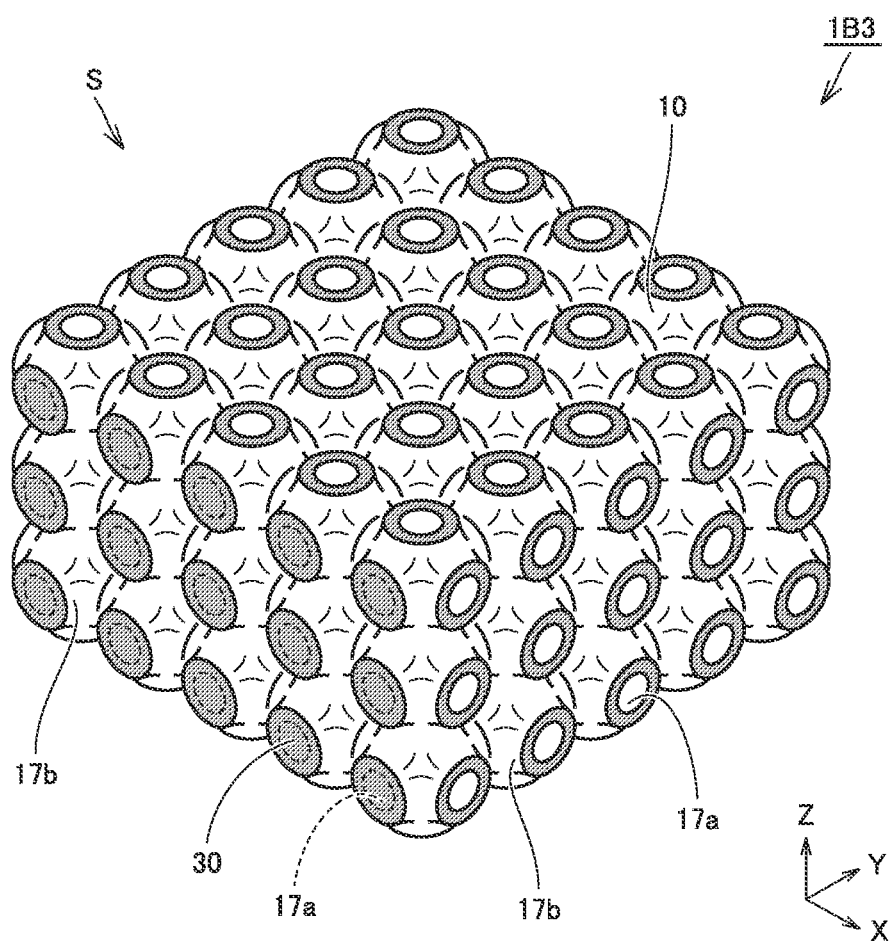
FIG. 17 is a perspective view of a shock absorber according to a sixth variation.

FIGS. 16 and 17 are perspective views of shock absorbers according to fifth and sixth variations, respectively. Hereinafter, shock absorbers 1B2 and 1B3 according to the fifth and sixth variations based on the second embodiment will be described with reference to FIGS. 16 and 17.

As shown in FIG. 16, shock absorber 1B2 according to the fifth variation is different from shock absorber 1B according to the second embodiment described above in that support 40 is provided only at one end portion in the heightwise direction (the Z direction indicated in the figure) in which shock absorber 1B2 exhibits a shock absorbing function as the shock absorber receives a load. That is, shock absorber 1B2 according to the fifth variation has the other end portion in the heightwise direction such that an end surface of three-dimensional structure S having a plurality of openings is exposed as it is.

As shown in FIG. 17, shock absorber 1B3 according to the sixth variation is different from shock absorber 1B according to the second embodiment described above in that support 40 (see FIG. 11 for example) is not provided at any of a pair of end portions in the heightwise direction (the Z direction indicated in the figure) in which shock absorber 1B3 exhibits a shock absorbing function as the shock absorber receives a load. That is, shock absorber 1B3 according to the sixth variation has opposite end portions in the heightwise direction such that for each end portion, an end surface of three-dimensional structure S having a plurality of openings is exposed as it is.

In contrast, shock absorber 1B2 and 1B3 according to the fifth and sixth variations, as well as shock absorber 1B according to the second embodiment, are each provided with a plurality of differently shaped portions 30 at a prescribed position in one end portion of a pair of end portions of a shock absorbing region composed of three-dimensional structure S that is located in the Y direction. Such a configuration, as well as the second embodiment, allows the shock absorbers to be lightweight and have an excellent shock absorbing function, and be used in various applications.

Third Embodiment

Figure 18:
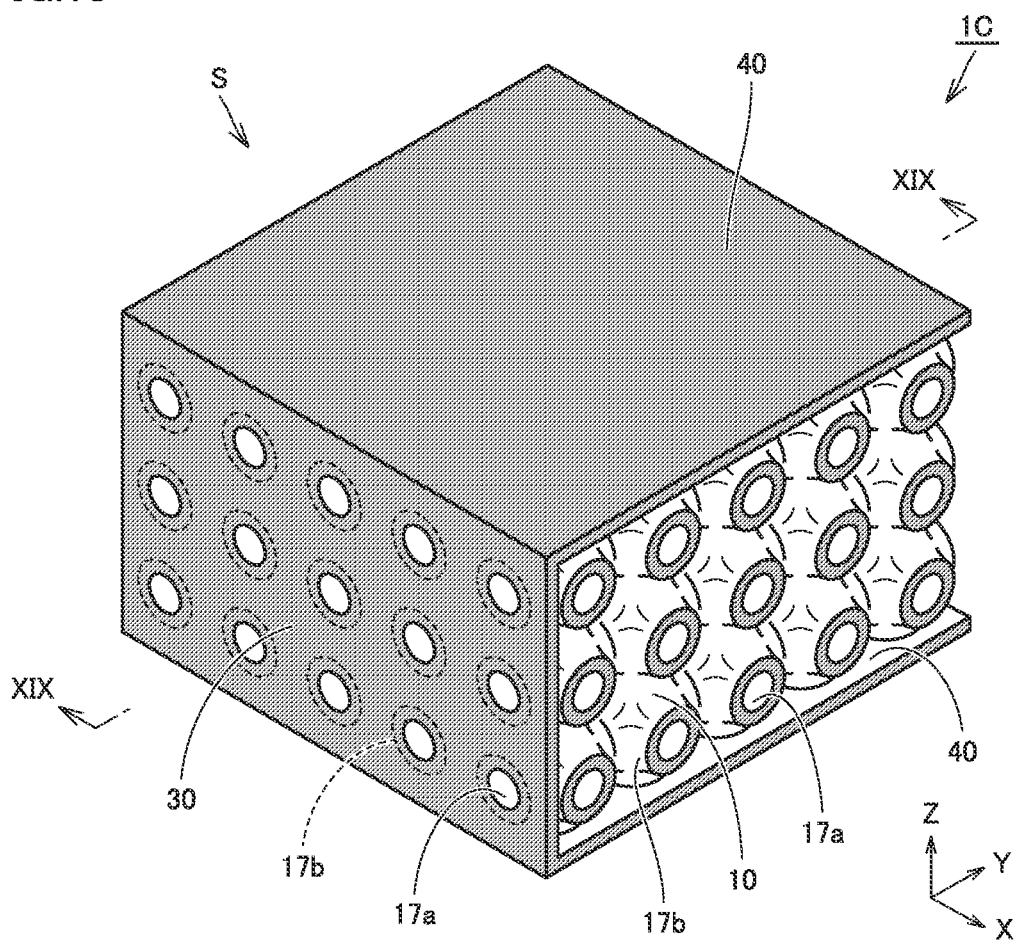
FIG. 18 is a perspective view of a shock absorber according to a third embodiment.
Figure 19:
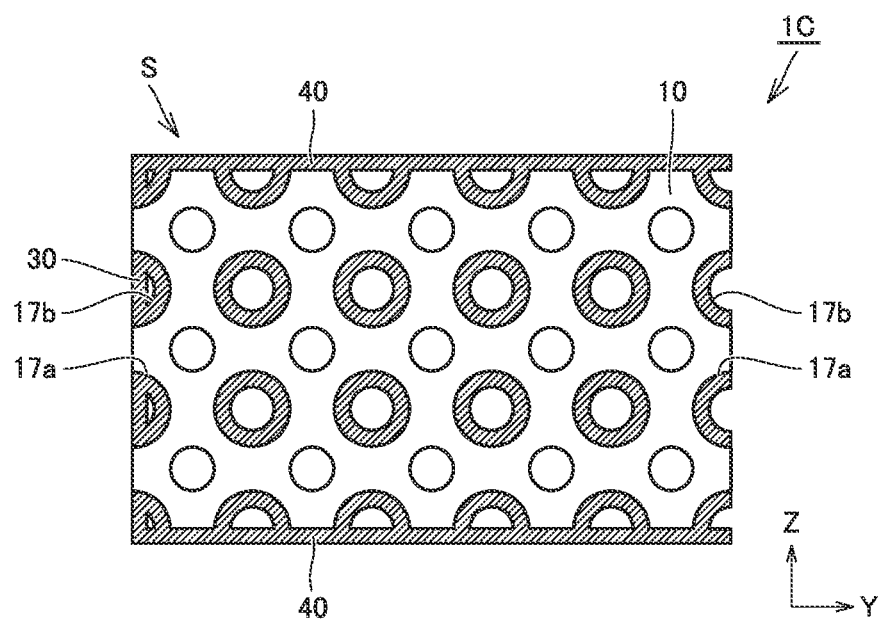
FIG. 19 is a cross section of the shock absorber shown in FIG. 18.

FIG. 18 is a perspective view of a shock absorber according to a third embodiment. FIG. 19 is a cross section of the shock absorber taken along a line XIX-XIX indicated in FIG. 18. Shock absorber 1C according to the present embodiment will be described below with reference to FIGS. 18 and 19. Shock absorber 1C according to the present embodiment is different from shock absorber 1B according to the second embodiment mainly in how differently shaped portion 30 is configured.

As shown in FIGS. 18 and 19, shock absorber 1C according to the present embodiment is provided with a single differently shaped portion 30 at a prescribed position in one end portion of a pair of end portions of a shock absorbing region composed of three-dimensional structure S that is located in the Y direction. The single differently shaped portion 30 is provided to close a specific opening of a plurality of openings of three-dimensional structure S.

That is, as well as in the second embodiment, three-dimensional structure S will have an end with a plurality of first openings 17a aligned in a matrix and independent of one another and a single second opening 17b in the form of a lattice surrounding the plurality of first openings 17a, and the single differently shaped portion 30 is provided in the form of a cover so as to close the single second opening 17b.

Herein, the single differently shaped portion 30 forms a shape of a plate having a thickness in a direction intersecting with the axial direction (that is, the Z direction) in which shock absorber 1C exhibits a shock absorbing function as the shock absorber receives a load. That is, the single differently shaped portion 30 extends along the XZ plane. Thus, a portion of shock absorber 1C that is provided with the single differently shaped portion 30 (That is, one of the pair of end portions of the shock absorbing region located in the Y direction) will be enhanced in compressive stiffness more than the remainder of shock absorber 1C.

Thus this configuration can also provide the shock absorbing region with a local, significantly stiff portion, and the shock absorber can be lightweight and have an excellent shock absorbing function, and can be used for various applications. Further, adopting the above configuration also allows the single differently shaped portion 30 to function as a type of cover, and a secondary effect is also obtained, that is, can suppress otherwise intrusion of foreign matters into the shock absorber through that portion.

While shock absorber 1C according to the present embodiment is provided with a single differently shaped portion 30 in the form of a cover only at one of a pair of end portions of the shock absorbing region located in the Y direction by way of example, the single differently shaped portion 30 in the form of a cover may further be provided at at least one of the other end portion located in the Y direction and a pair of end portions located in the X direction.

Fourth Embodiment

Figure 20:
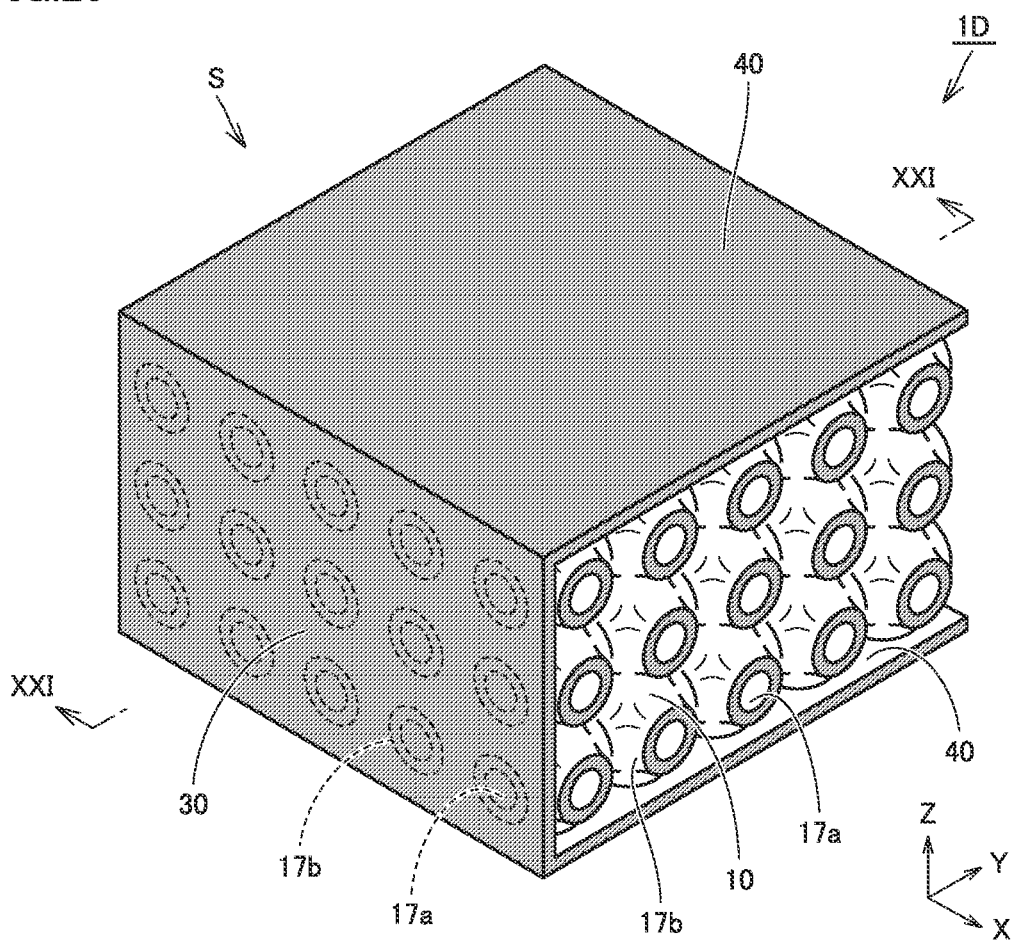
FIG. 20 is a perspective view of a shock absorber according to a fourth embodiment.
Figure 21:
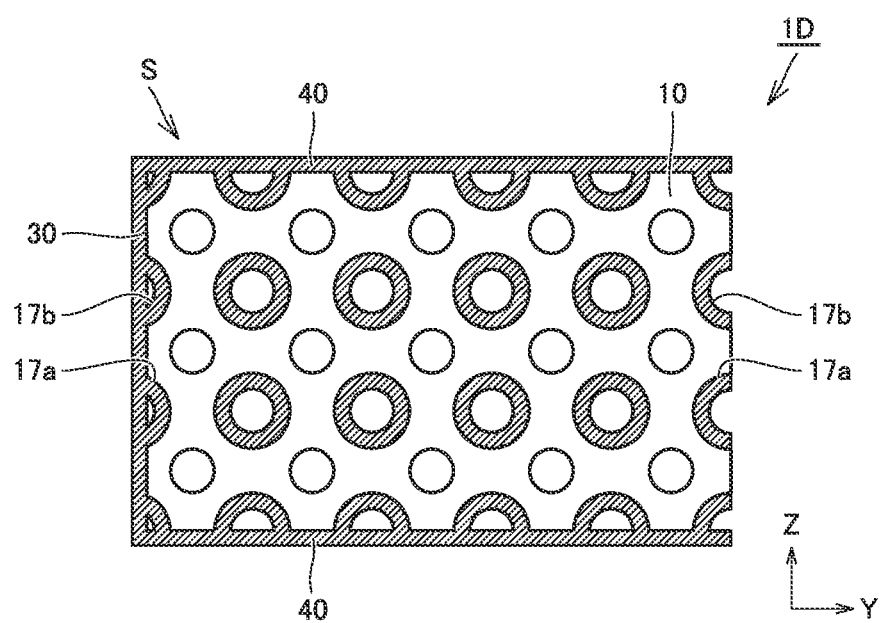
FIG. 21 is a cross section of the shock absorber shown in FIG. 20.

FIG. 20 is a perspective view of a shock absorber according to a fourth embodiment. FIG. 21 is a cross section of the shock absorber taken along a line XXI-XXI indicated in FIG. 20. Hereinafter, a shock absorber 1D according to the present embodiment will be described with reference to FIGS. 20 and 21. Shock absorber 1D according to the present embodiment is different from shock absorber 1B according to the second embodiment mainly in how differently shaped portion 30 is configured.

As shown in FIGS. 20 and 21, shock absorber 1D according to the present embodiment is provided with a single differently shaped portion 30 at a prescribed position in one end portion of a pair of end portions of a shock absorbing region composed of three-dimensional structure S that is located in the Y direction. The single differently shaped portion 30 is provided to close all of a plurality of openings of three-dimensional structure S.

That is, as well as in the second embodiment, three-dimensional structure S will have an end with a plurality of first openings 17a aligned in a matrix and independent of one another and a single second opening 17b in the form of a lattice surrounding the plurality of first openings 17a, and the single differently shaped portion 30 is provided in the form of a cover so as to close all of the plurality of first openings 17a and the single second opening 17b.

Herein, the single differently shaped portion 30 forms a shape of a plate having a thickness in a direction intersecting with the axial direction (that is, the Z direction) in which shock absorber 1D exhibits a shock absorbing function as the shock absorber receives a load. That is, the single differently shaped portion 30 extends along the XZ plane. Thus, a portion of shock absorber 1D that is provided with the single differently shaped portion 30 (That is, one of the pair of end portions of the shock absorbing region located in the Y direction) will be enhanced in compressive stiffness more than the remainder of shock absorber 1D.

Thus this configuration can also provide the shock absorbing region with a local, significantly stiff portion, and the shock absorber can be lightweight and have an excellent shock absorbing function, and can be used for various applications. Further, adopting the above configuration also allows the single differently shaped portion 30 to function as a type of cover, and a secondary effect is also obtained, that is, can suppress otherwise intrusion of foreign matters into the shock absorber through that portion.

While shock absorber 1D according to the present embodiment is provided with a single differently shaped portion 30 in the form of a cover only at one of a pair of end portions of the shock absorbing region located in the Y direction by way of example, the single differently shaped portion 30 in the form of a cover may further be provided at at least one of the other end portion located in the Y direction and a pair of end portions located in the X direction.

Fifth Embodiment

Figure 22:
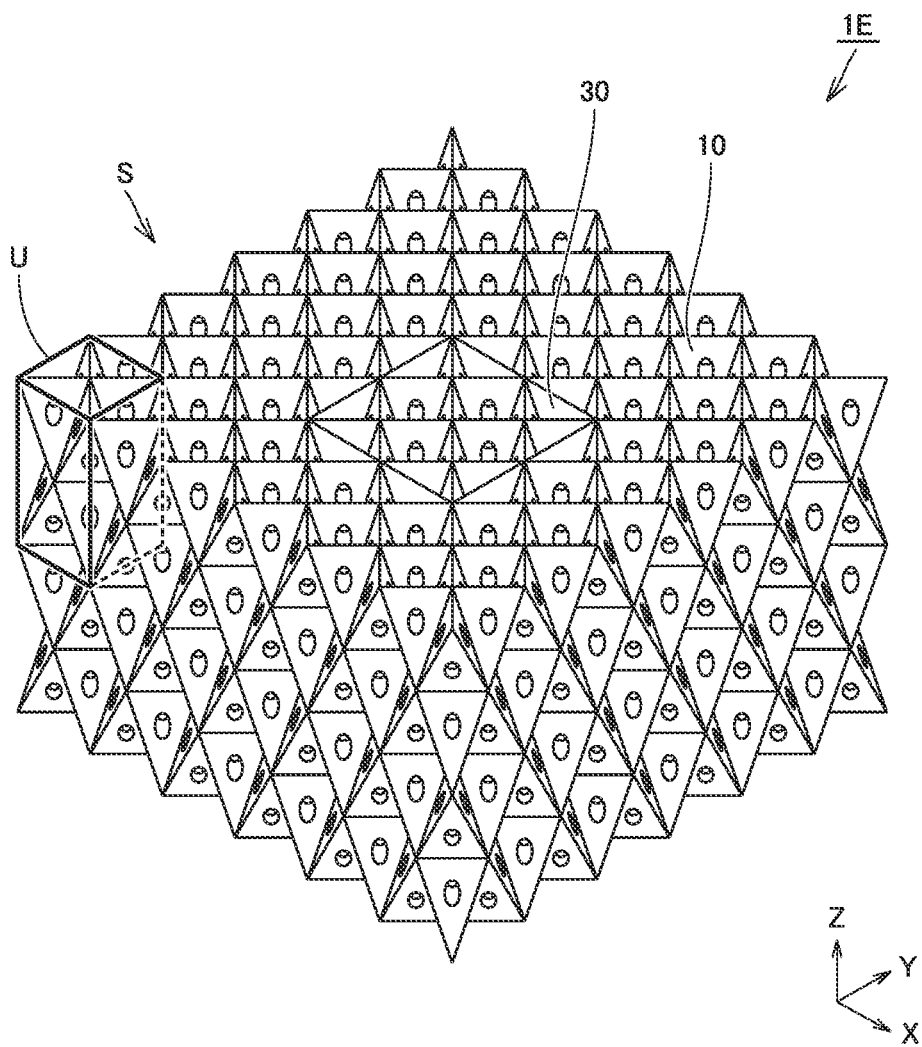
FIG. 22 is a perspective view of a shock absorber according to a fifth embodiment.
Figure 23:
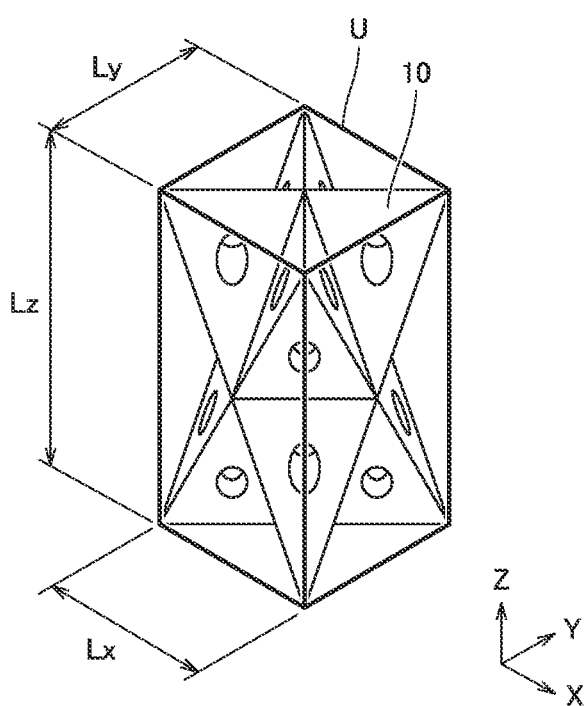
FIG. 23 is a perspective view of a unit structure of the shock absorber shown in FIG. 22.

FIG. 22 is a perspective view of a shock absorber according to a fifth embodiment. FIG. 23 is a perspective view of a unit structure of the shock absorber shown in FIG. 22. A shock absorber 1E according to the present embodiment will be described below with reference to FIGS. 22 and 23.

As shown in FIGS. 22 and 23, shock absorber 1E includes three-dimensional structure S having a plurality of unit structures U. The plurality of unit structures U each have a three-dimensional shape formed by wall 10 having an external shape defined by a pair of parallel planes.

Herein, in FIGS. 22 and 23, in order to facilitate understanding, a reference character U does not denote the unit structure in a strict sense; rather, it denotes a cuboidal unit space occupied by the unit structure. Note that as shown in FIG. 23, a dimension of unit structure U in a widthwise direction (the X direction shown in the figures) is represented as Lx, a dimension of unit structure U in a depthwise direction (the Y direction shown in the figures) is represented as Ly, and a dimension of unit structure U in a heightwise direction (the Z direction shown in the figures) is represented as Lz.

The plurality of unit structures U are repeatedly, regularly and continuously arranged in each of the widthwise, depthwise and heightwise directions. Shock absorber 1E according to the present embodiment has six unit structures U arranged in the widthwise direction or the X direction and the depthwise direction or the Y direction side by side, and has two unit structures U arranged in the heightwise direction or the Z direction side by side.

Shock absorber 1E according to the present embodiment is intended to exhibit a shock absorbing function in the heightwise direction (the Z direction shown in the figure). Accordingly, when shock absorber 1E receives a load, shock absorber 1E exhibits the shock absorbing function in an axial direction, which will match the heightwise direction described above. How many unit structures U are repeated in the widthwise, depthwise and heightwise directions is not particularly limited, and two or more unit structures arranged in at least one of the three directions suffice.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1E has a structure in which a thickness is added to a geometrical surface structure. In shock absorber 1E according to the present embodiment, the surface structure is an octet structure, which is a type of a polyhedron having a cavity therein.

While the above-described dimensions Lx, Ly, and Lz are not particularly limited and are variable, in the present embodiment these dimensions Lx, Ly, and Lz satisfy Lx=Ly=Lz/2. Note that when, of Lx, Ly, and Lz, dimension Lz in the heightwise direction or the axial direction in which a shock absorbing function is intended to be exhibited is represented as L1 and the longer one of the remaining, widthwise and lengthwise dimensions Lx and Ly is represented as L2, dimensions L1 and L2 satisfying $1.1 \leq L1/L2 \leq 4.0$ allow large compressive stiffness to be obtained and dimensions L1 and L2 satisfying $0.1 \leq L1/L2 \leq 0.9$ allow compressive stiffness to be reduced and hence high deformability to be obtained. Note, however, that dimensions L1 and L2 do not necessarily satisfy these conditions, and whether these conditions are satisfied is arbitrary.

Shock absorber 1E has differently shaped portion 30 in addition to wall 10 described above. Differently shaped portion 30 is a portion which does not correspond to wall 10 defining unit structure U, and is distinguished from wall 10.

Differently shaped portion 30 is locally provided in a shock absorbing region, which is a region in which three-dimensional structure S described above has unit structure U disposed (in the present embodiment, the entirety of shock absorber 1E corresponds to the shock absorbing region). Although not described specifically, differently shaped portion 30, as well as that described in the first embodiment, is in the form of a rectangular tube, and is provided at a center portion of shock absorber 1E in a plan view.

Differently shaped portion 30 is connected to be integrated with unit structure U of a portion to which differently shaped portion 30 is adjacent. Accordingly, a portion of shock absorber 1E provided with differently shaped portion 30 will be enhanced in compressive stiffness more than a remaining portion of shock absorber 1E (that is, a portion without differently shaped portion 30).

Thus, as well as in the first embodiment, a shock absorber which is lightweight and has an excellent shock absorbing function can thus be obtained by adopting a configuration in which differently shaped portion 30 that does not correspond to wall 10 defining unit structure U is locally provided in a shock absorbing region which is a region in which three-dimensional structure S has unit structure U disposed, as in shock absorber 1E according to the present embodiment.

Note that, as a three-dimensional shape formed by a wall having an external shape defined by a pair of parallel planes, other than that in which a thickness is added to an octet structure, as described above, there are also a three-dimensional shape in which a thickness is added to a cubic structure, a three-dimensional shape in which a thickness is added to a cubic octet structure, and the like. Therefore, a shock absorber including as a shock absorbing region a three-dimensional structure in which a thickness is added to the cubic structure, the cubic octet structure or the like may locally be provided with such a differently shaped portion as described above.

Further, similarly as has been described in the first embodiment, it is also possible as a matter of course to change the differently shaped portion in position, shape, number and the like variously. In that case, it is possible to configure the shock absorber to have a generally uniform shock absorbing function throughout the shock absorber while reducing it in weight and configure the shock absorber to have different shock absorbing functions in different portions of the shock absorber.

Sixth Embodiment

Figure 24:
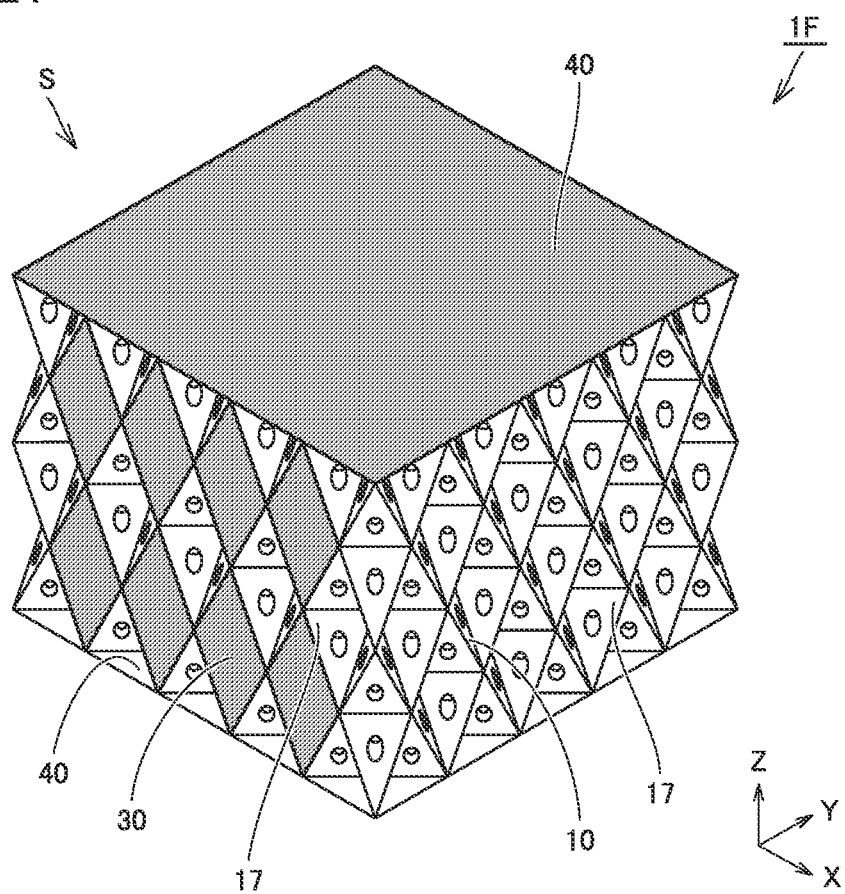
FIG. 24 is a perspective view of a shock absorber according to a sixth embodiment.

FIG. 24 is a perspective view of a shock absorber according to a sixth embodiment. A shock absorber 1F according to the present embodiment will be described below with reference to FIG. 24. Shock absorber 1F according to the present embodiment is different from shock absorber 1E according to the fifth embodiment mainly in how differently shaped portion 30 is configured.

As shown in FIG. 24, shock absorber 1F according to the present embodiment includes three-dimensional structure S having a plurality of unit structures, and three-dimensional structure S is formed of wall 10 having an external shape defined by a pair of parallel planes. Shock absorber 1F according to the present embodiment has an octet structure as a reference in structure for three-dimensional structure S.

Shock absorber 1F is intended to exhibit a shock absorbing function in the heightwise direction (the Z direction shown in the figure), and a pair of supports 40 is provided at end portions in the heightwise direction to sandwich three-dimensional structure S. Paired supports 40 are each in the form of a plate. Paired supports 40 may each be a member discrete from three-dimensional structure S and bonded or the like and thus assembled to three-dimensional structure S or may be formed integrally with three-dimensional structure S.

Herein, shock absorber 1F according to the present embodiment has five unit structures U arranged in each of the widthwise direction or the X direction and the depthwise direction or the Y direction side by side, and has two unit structures U arranged in the heightwise direction or the Z direction side by side. In FIG. 24, to facilitate understanding, end surfaces located in the X, Y and Z directions shown in the figure are shown in a dark color and thus distinguished from the remainder of the external surface.

Shock absorber 1F according to the present embodiment is provided with a plurality of differently shaped portions 30 at a prescribed position in one end portion of a pair of end portions of the shock absorbing region composed of three-dimensional structure S that is located in the Y direction. The plurality of differently shaped portions 30 are provided to close a specific opening of a plurality of openings of three-dimensional structure S.

That is, when three-dimensional structure S has an octet structure as a reference in structure, three-dimensional structure S will have an end portion with a plurality of openings 17 arranged in the form of an oblique lattice and independent of one another. The plurality of differently shaped portions 30 are provided in the form of a cover so as to close some of openings 17.

Herein, the plurality of differently shaped portions 30 each form a shape of a plate having a thickness in a direction intersecting with the axial direction (that is, the Z direction) in which shock absorber 1F exhibits a shock absorbing function as the shock absorber receives a load. That is, the plurality of differently shaped portions 30 each extend along the XZ plane. Thus, a portion of shock absorber 1F that is provided with the plurality of differently shaped portions 30 (That is, one of the pair of end portions of the shock absorbing region located in the Y direction) will be enhanced in compressive stiffness more than the remainder of shock absorber 1F.

Thus this configuration can also provide the shock absorbing region with a local, significantly stiff portion, and the shock absorber can be lightweight and have an excellent shock absorbing function, and can be used for various applications. Further, adopting the above configuration allows the plurality of differently shaped portions 30 to also function as a type of cover, and a secondary effect is also obtained, that is, can suppress otherwise intrusion of foreign matters into shock absorber 1F through those portions.

While shock absorber 1F according to the present embodiment is provided with a plurality of differently shaped portions 30 in the form of a cover only at one of a pair of end portions of the shock absorbing region located in the Y direction by way of example, a plurality of differently shaped portions 30 in the form of a cover may further be provided at at least one of the other end portion located in the Y direction and a pair of end portions located in the X direction.

In addition, as indicated in the second to fourth embodiments and the fourth to sixth variations described above, which one of a plurality of openings located at an end portion of the shock absorber is provided with a differently shaped portion in the foin of a cover, what thickness, shape and the like the differently shaped portion in the form of a cover should have when it is provided, and the like are variable.

Seventh Embodiment

Figure 25:
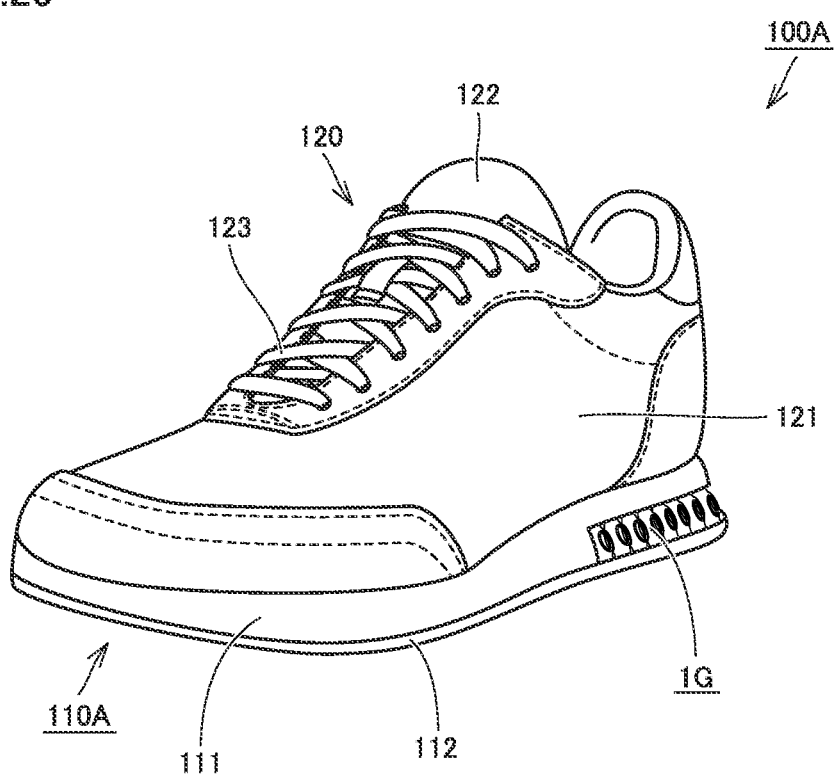
FIG. 25 is a perspective view of a shoe sole according to a seventh embodiment and a shoe comprising the shoe sole.
Figure 26:
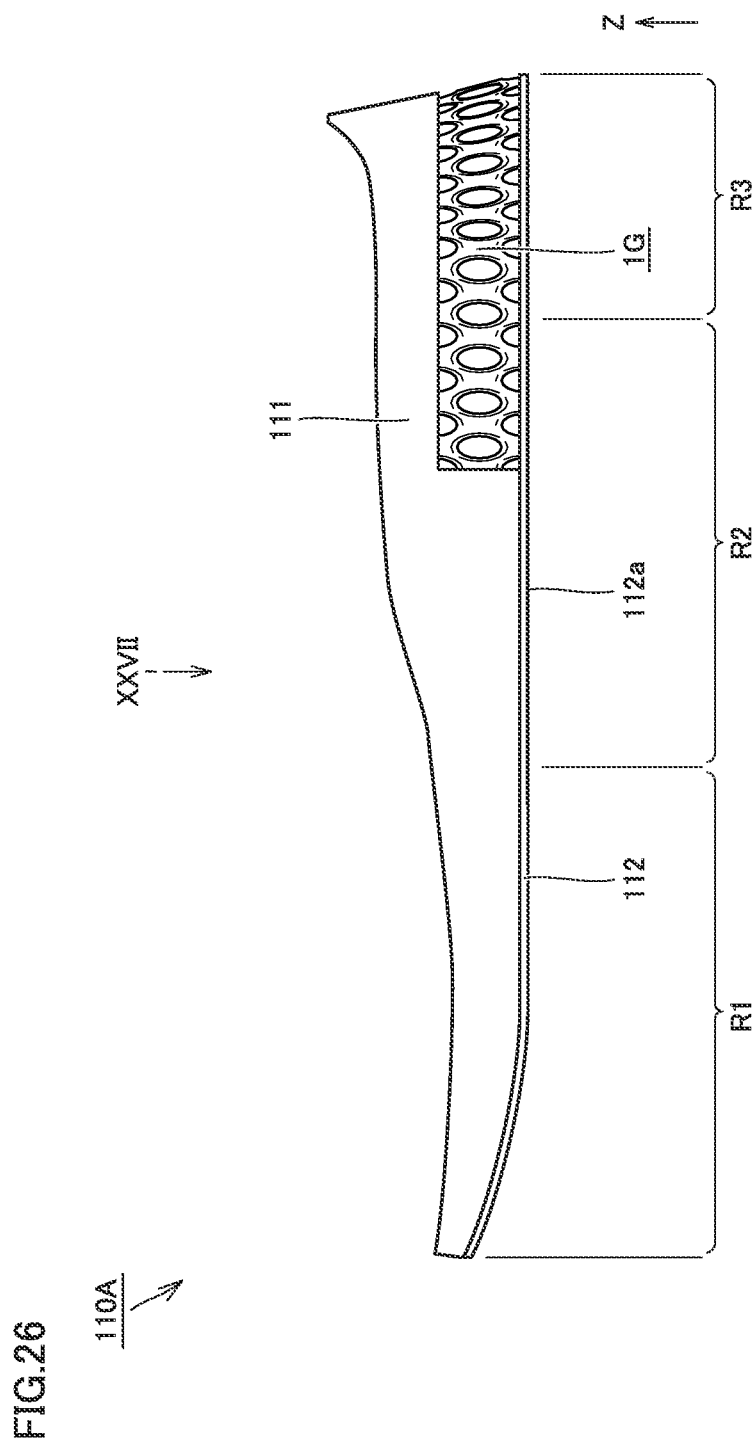
FIG. 26 is a side view of the shoe sole shown in FIG. 25.
Figure 27:
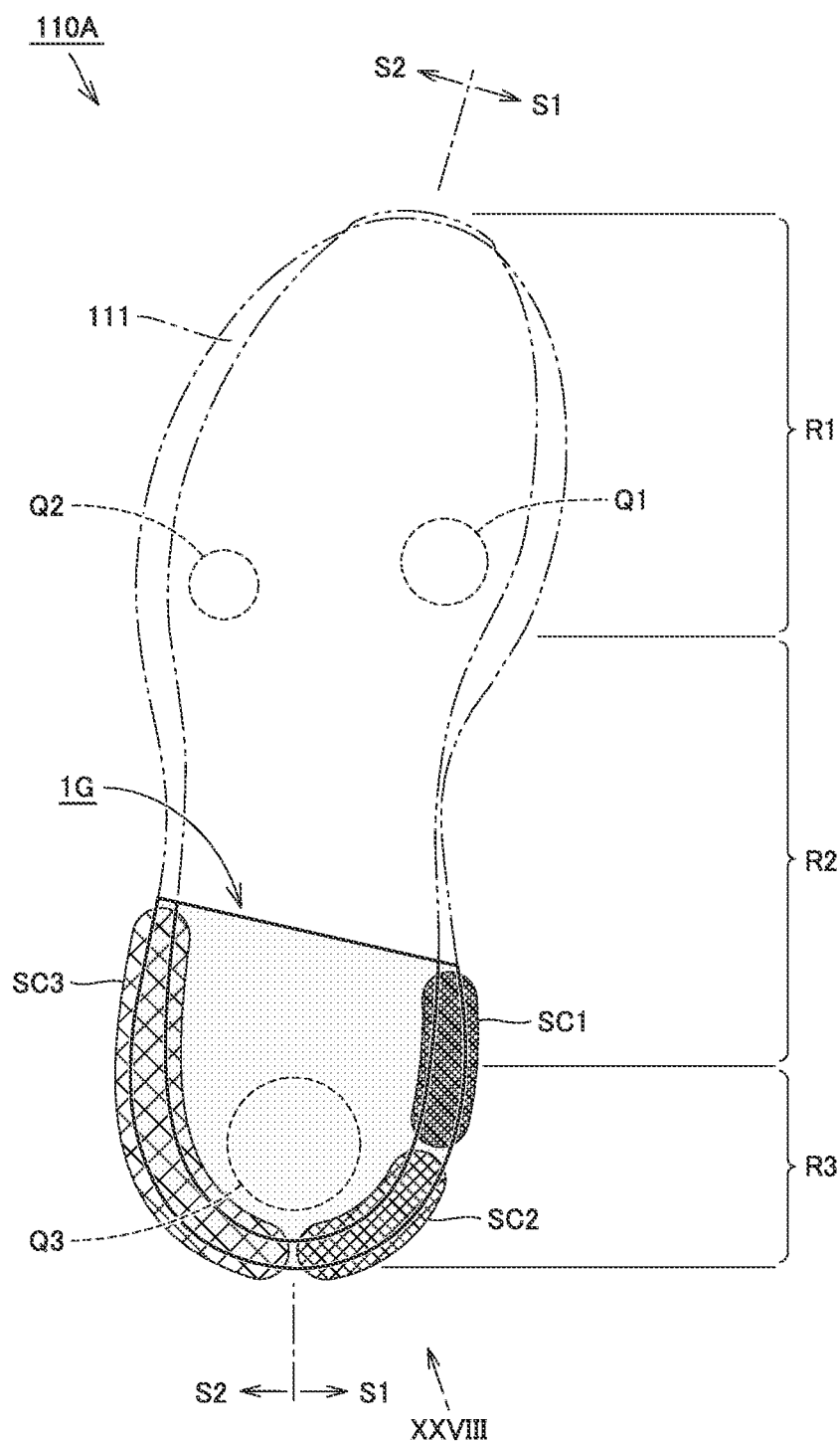
FIG. 27 schematically shows a configuration of the shoe sole shown in FIG. 25.
Figure 28:
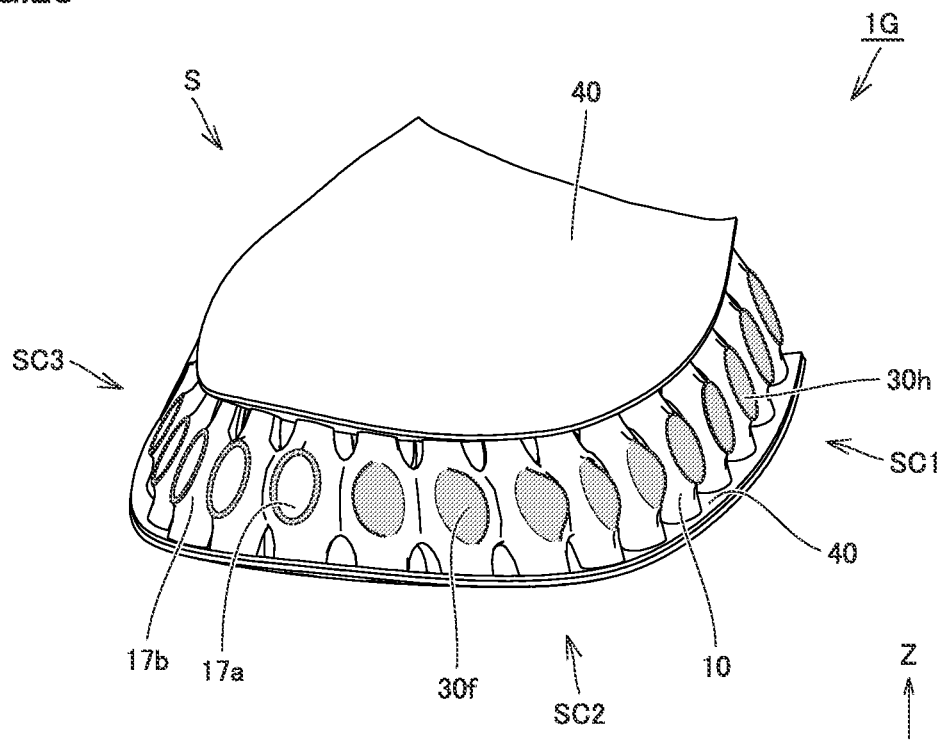
FIG. 28 is a perspective view of a shock absorber that the shoe sole shown in FIG. 25 comprises.

FIG. 25 is a perspective view of a shoe sole and a shoe comprising the shoe sole according to a seventh embodiment. FIG. 26 is a side view of the shoe sole shown in FIG. 25. FIG. 27 schematically shows a configuration of the shoe sole shown in FIG. 25, as seen in a direction indicated by an arrow XXVII indicated in FIG. 26. FIG. 28 is a perspective view of a shock absorber that the shoe sole shown in FIG. 25 comprises, as seen in a direction indicated by an arrow XXVIII indicated in FIG. 27. Hereinafter, a shoe sole 110A and a shoe 100A that comprises shoe sole 110A according to the present embodiment will be described with reference to FIGS. 25 to 28. Shoe sole 110A according to the present embodiment comprises a shock absorber 1G approximate in configuration to shock absorber 1B according to the second embodiment and shock absorber 1B1 according to the fourth variation.

As shown in FIG. 25, shoe 100A includes shoe sole 110A and an upper 120. Shoe sole 110A is a member that covers the sole of a foot and has a generally flat shape. Upper 120 has a shape that at least covers the entirety of a portion on a side of the bridge of a foot inserted in the shoe, and is located above shoe sole 110A.

Upper 120 includes an upper body 121, a tongue 122, and a shoelace 123. Of these, tongue 122 and shoelace 123 are both fixed or attached to upper body 121.

Upper body 121 has an upper portion provided with an upper opening for exposing an upper portion of an ankle and a portion of the bridge of a foot. Upper body 121 has a lower portion provided with a lower opening covered with shoe sole 110A as an example and has a lower end French-seamed or the like to form a bottom portion as another example.

Tongue 122 is fixed to upper body 121 by sewing, welding, bonding, or a combination thereof so as to cover a portion of the upper opening provided in upper body 121 that exposes a portion of the bridge of a foot. For upper body 121 and tongue 122, woven fabric, knitted fabric, nonwoven fabric, synthetic leather, resin, or the like is used for example, and for a shoe required to be air permeable and lightweight, in particular, a double raschel warp knitted fabric with a polyester yarn knitted therein is used.

Shoelace 123 is composed of a member in the form of a string for drawing portions of a peripheral edge of the upper opening provided to upper body 121 and exposing a portion of the bridge of a foot together in the direction of the width of the foot, and shoelace 123 is passed through a plurality of hole provided through the peripheral edge of the upper opening. When a foot is inserted in upper body 121 and shoelace 123 is tightened, upper body 121 can be brought into close contact with the foot.

As shown in FIGS. 25 to 27, shoe sole 110A includes a midsole 111, an outsole 112, and shock absorber 1G. Midsole 111 is located on top of shoe sole 110A and joined to upper 120. Outsole 112 has a lower surface with a tread 112a (see FIG. 26), and is located at a lower portion of shoe sole 110A. Shock absorber 1G is interposed at a prescribed position between midsole 111 and outsole 112.

Midsole 111 preferably has an appropriate strength and also excellently absorbs shock, and from this viewpoint, midsole 111 can for example be a foam material made of resin or rubber, and particularly suitably a foam material made of a thermoplastic resin such as ethylene-vinyl acetate copolymer (EVA), a thermosetting resin such as polyurethane (PU), butadiene rubber, or the like.

Outsole 112 preferably provides excellent wear resistance and excellent grip, and from this viewpoint, outsole 112 can be made of rubber, for example. A tread pattern may be provided on the lower surface of outsole 112, or tread 112a, from the viewpoint of providing enhanced grip.

As shown in FIGS. 26 and 27, in a fore-aft direction representing a longitudinal direction in a plan view (a lateral direction in FIG. 26 and a vertical direction in FIG. 27), shoe sole 110A is divided into a front foot portion R1 supporting the toes and ball of a foot, a middle foot portion R2 supporting the arch of the foot, and a rear foot portion R3 supporting the heel of the foot. Further, as shown in FIG. 27, in a direction of the width of a foot, which is a direction intersecting with the longitudinal direction in the plan view, shoe sole 110A is divided into a portion on a medial foot side representing a medial side of the foot in anatomical position (that is, a side closer to the median) (i.e., a portion on a side S1 in FIG. 27) and a portion on a lateral foot side representing a lateral side of the foot in anatomical position (that is, a side farther from the median) (i.e., a portion on a side S2 in FIG. 27).

As shown in FIG. 27, a portion of front foot portion R1 of shoe sole 110A on the medial foot side (or side S1) includes a portion Q1 to support the ball of the great toe of the foot. A portion of front foot portion R1 of shoe sole 110A on the lateral foot side (or side S2) includes a portion Q2 to support the ball of the little toe of the foot. A portion of rear foot portion R3 of shoe sole 110A across the medial foot side (or side S1) and the lateral foot side (or side S2) includes a portion Q3 to support the calcaneus bone of the foot.

Herein, shoe 100A according to the present embodiment has midsole 111 with a notch having a prescribed shape, and shock absorber 1G is accommodated in the notch and thus sandwiched and thus fixed between midsole 111 and outsole 112 in the direction of the thickness of shoe sole 110A.

More specifically, as shown in FIGS. 26 and 27, midsole 111 has the notch formed at a position corresponding to a portion of middle foot portion R2 closer to rear foot portion R3 and the entirety of rear foot portion R3, and shock absorber 1G having an external shape generally in the form of the letter D in a plan view is disposed to fill the notch. Thus, a portion of an end portion of shock absorber 1G is located along a portion of the edge of shoe sole 110A, that is, along a rear edge of middle foot portion R2 on the medial foot side, an edge of rear foot portion R3 on the medial foot side, a rear edge of rear foot portion R3, an edge of rear foot portion R3 on the lateral foot side, and a rear edge of middle foot portion R2 on the lateral foot side. In FIG. 27, in order to facilitate understanding, a region in which shock absorber 1G is disposed, as seen in a plan view of shoe sole 110A, is shown in a light color. That is, shock absorber 1G has a shock absorbing region not only along an edge portion of shoe sole 110A but also in a region inner than the edge portion.

As shown in FIGS. 25, 26, and 28, shock absorber 1G has its shock absorbing region composed of three-dimensional structure S having a Schwarz' P structure as a reference. Therefore, as shown in FIG. 28, shock absorber 1G has an end portion with a plurality of first openings 17a independent of one another and aligned in a matrix and a single second opening 17b in the form of a lattice surrounding the plurality of first openings 17a, as described above. Note that shock absorber 1G has a plurality of unit structures U arranged in both the widthwise direction and the depthwise direction (that is, the horizontal direction), and only one unit structure U arranged in the heightwise direction (that is, the Z direction).

While shock absorber 1G is not particularly limited to any particular material, as has been described in the first embodiment, it can be formed for example of a resin material or a rubber material, and particularly suitably composed of a thermoplastic resin such as ethylene-vinyl acetate copolymer (EVA), a thermosetting resin such as polyurethane (PU), butadiene rubber or the like. It can also be a polymer composition such as an olefin-based polymer, an amide-based polymer, an ester-based polymer, a urethane-based polymer, a styrene-based polymer, an acrylic polymer or the like.

While wall 10 constituting three-dimensional structure S of shock absorber 1G is not particularly limited in thickness, it preferably has a thickness of 0.1 mm or more and 10 mm or less, more preferably 1 mm or more and 5 mm or less.

Herein, as shown in FIG. 27, an end portion of shock absorber 1G located along an edge portion of shoe sole 110A is divided into three sections SC1 to SC3 according to a difference in configuration. More specifically, section SC1 corresponds to a rear edge of middle foot portion R2 on the medial foot side and a front edge of rear foot portion R3 on the medial foot side, section SC2 corresponds to a rear edge of rear foot portion R3 on the medial foot side, and section SC3 corresponds to an edge of rear foot portion R3 on the lateral foot side and a rear edge of middle foot portion R2 on the lateral foot side.

As shown in FIG. 28, in section SC1, a plurality of first openings 17a located at an end portion of shock absorber 1G are each closed by differently shaped portion 30h in the form of a flat plate (see the ninth configuration example shown in FIG. 14). In section SC2, a plurality of first openings 17a located at an end portion of shock absorber 1G are each closed by differently shaped portion 30f in the form of a curved convex plate (see the seventh configuration example shown in FIG. 14). In section SC3, in contrast, a plurality of first openings 17a located at an end portion of shock absorber 1G are each unclosed and exposed. In FIG. 26, in order to facilitate understanding, only the end surface of the end portion of shock absorber 1G excluding support 40 is shown in a dark color.

This configuration allows shock absorber 1G to have section SC1 with larger compressive stiffness than section SC2 and section SC3, and section SC2 with larger compressive stiffness than section SC3. That is, shock absorber 1G can have an end portion with compressive stiffness variable for each section and allows compressive stiffness to be enhanced in the order of section SC3, section SC2, and section SC1.

Accordingly, around portion Q3 supporting the calcaneus of a foot, shoe sole 110A has relatively larger compressive stiffness at a rear portion of middle foot portion R2 on the medial foot side and a portion of rear foot portion R3 on the medial foot side, and relatively smaller compressive stiffness at a rear portion of middle foot portion R2 on the lateral foot side and a portion of rear foot portion R3 on the lateral foot side.

This configuration can suppress rolling of a heel inwards more than necessary when landing, i.e., so-called overpronation. That is, when an overpronator wears shoe 100A comprising shoe sole 110A according to the present embodiment, the overpronator can have his/her foot sole stably supported at the rear portion of middle foot portion R2 on the medial foot side and the portion of rear foot portion R3 on the medial foot side, and accordingly, pressure acting on midsole 111 can be dispersed and midsole 111 can be prevented from having excessive deformation, and as a result, overpronation can be suppressed.

Further, this configuration, as described above, allows a foot sole to be stably supported at the rear portion of middle foot portion R2 on the medial foot side and the portion of rear foot portion R3 on the medial foot side, and accordingly, can disperse pressure acting on midsole 111 and prevent midsole 111 from having excessive deformation, so that when a person with pes planovalgus wears shoe 100A comprising shoe sole 110A according to the present embodiment, he/she can avoid a load concentrating at a portion of his/her feet on the medial foot side when landing.

On the other hand, the above configuration can significantly alleviate shock exerted to the foot sole when landing as shock absorber 1G deforms more significantly at the rear portion of middle foot portion R2 on the lateral foot side and the portion of rear foot portion R3 on the lateral foot side.

Therefore, shoe sole 110A and shoe 100A comprising shoe sole 110A according to the present embodiment can be excellent in stability when landing and also satisfactorily fit to a foot and be lightweight, and are particularly suitable for overpronators and people with pes planovalgus.

Shock absorber 1G may be disposed such that the axial direction, or its heightwise direction (the Z direction indicated in the figure) is orthogonal to tread 112a of shoe sole 110A. With this configuration, a load exerted to shoe sole 110A from the sole of a foot and the ground when landing will be absorbed as shock absorber 1G deforms with large deformability, and a load exerted from shoe sole 110A to the sole of the foot is reduced and a high shock absorbing function can thus be obtained.

(Seventh and Eighth Variations)

Figure 29:
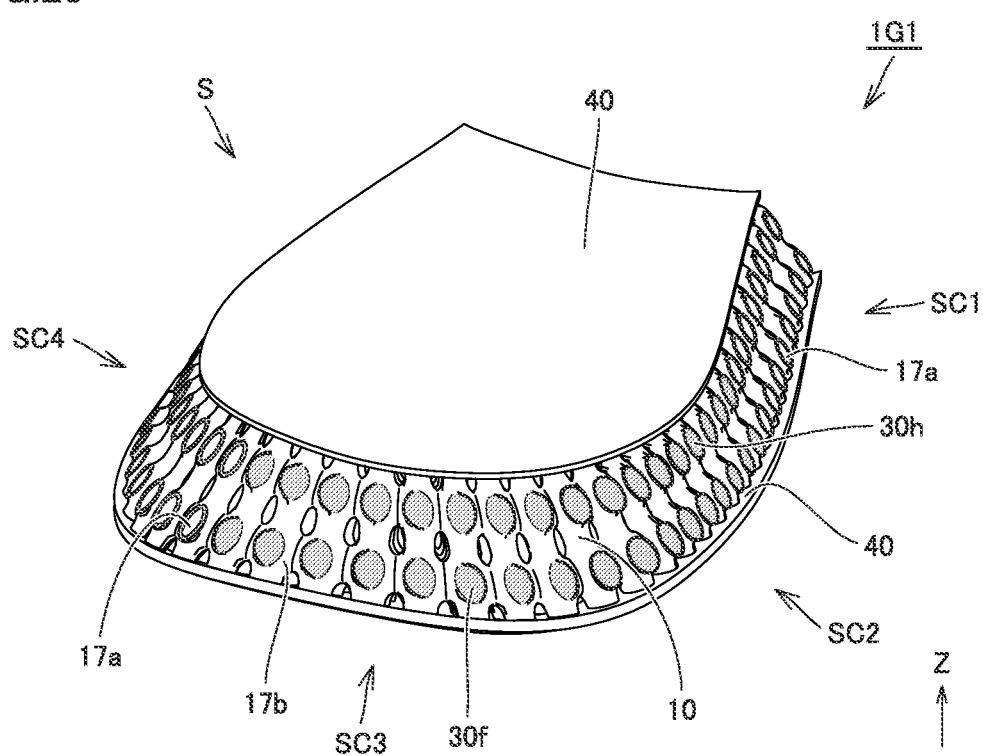
FIG. 29 is a perspective view of a shock absorber that a shoe sole according to a seventh variation comprises.
Figure 30:
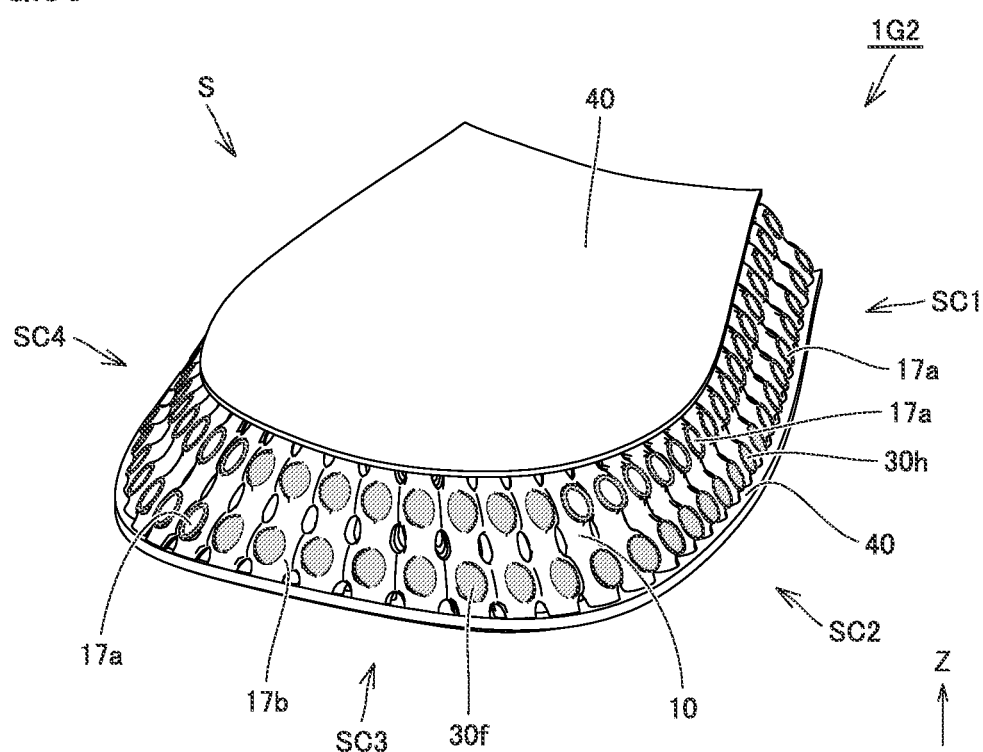
FIG. 30 is a perspective view of a shock absorber that a shoe sole according to an eighth variation comprises.

FIGS. 29 and 30 are perspective views of shock absorbers that a shoe sole comprises according to seventh and eighth variations, respectively. Hereinafter, shock absorbers 1G1 and 1G2 comprised in the shoe sole according to the seventh and eighth variations based on the seventh embodiment will be described with reference to FIGS. 29 and 30. The shoe sole according to the seventh and eighth variations is comprised by shoe 100A according to the seventh embodiment instead of shoe sole 110A described above.

As shown in FIG. 29, as well as shock absorber 1G comprised by shoe sole 110A according to the seventh embodiment, shock absorber 1G1 comprised by the shoe sole according to the seventh variation has a generally D-shaped external shape in a plan view having substantially the same size as that of shock absorber 1G so as to be disposed in the shoe sole at a portion of middle foot portion R2 closer to rear foot portion R3 and the entirety of rear foot portion R3. Shock absorber 1G1, unlike shock absorber 1G described above, has two unit structures U arranged in the heightwise direction (that is, the Z direction).

Herein, an end portion of shock absorber 1G1 located along an edge portion of the shoe sole is divided into four sections SC1 to SC4 according to a difference in configuration. More specifically, section SC1 corresponds to a rear edge of middle foot portion R2 on the medial foot side, section SC2 corresponds to a front edge of rear foot portion R3 on the medial foot side, section SC3 corresponds to a rear edge of rear foot portion R3 on the medial foot side, and section SC4 corresponds to an edge of rear foot portion R3 on the lateral foot side and a rear edge of middle foot portion R2 on the lateral foot side.

In section SC1, a plurality of first openings 17a located at an end portion of shock absorber 1G1 are each unclosed and exposed. In section SC2, in contrast, a plurality of first openings 17a located at an end portion of shock absorber 1G1 are each closed by differently shaped portion 30h in the form of a flat plate (see the ninth configuration example shown in FIG. 14). In section SC3, a plurality of first openings 17a located at an end portion of shock absorber 1G1 are each closed by differently shaped portion 30f in the form of a curved convex plate (see the seventh configuration example shown in FIG. 14). Furthermore, in section SC4, a plurality of first openings 17a located at an end portion of shock absorber 1G1 are each unclosed and exposed.

This configuration allows shock absorber 1G1 to have section SC2 with larger compressive stiffness than sections SC1, SC3 and SC4, section SC3 with larger compressive stiffness than sections SC1 and SC4, and section SC1 with compressive stiffness of substantially the same extent as section SC4. That is, shock absorber 1G1 can have an end portion with compressive stiffness variable for each section and allows compressive stiffness to be enhanced relatively in the order of sections SC1 and SC4, section SC3, and section SC2.

Accordingly, around portion Q3 supporting the calcaneus of a foot, the shoe sole has relatively larger compressive stiffness at a portion of rear foot portion R3 on the medial foot side, and relatively smaller compressive stiffness at a front portion of middle foot portion R2 on the medial foot side, a rear portion of middle foot portion R2 on the lateral foot side and a portion of rear foot portion R3 on the lateral foot side.

Therefore, such a configuration can also achieve an effect substantially similar to that described in the seventh embodiment, and can provide a shoe sole and a shoe comprising the shoe sole that are excellent in stability when landing and also satisfactorily fit to a foot and are lightweight, that are particularly suitable for overpronators and people with pes planovalgus.

As shown in FIG. 30, shock absorber 1G2 comprised by the shoe sole according to the eighth variation is different in configuration from shock absorber 1G 1 comprised by the shoe sole according to the seventh variation only in that a plurality of first openings 17a located at an upper stage of section SC2 are not closed by differently shaped portion 30h in the form of a flat plate and instead exposed as they are.

In such a configuration, section SC2 has a lower stage provided with differently shaped portion 30h in the form of a flat plate and thus has relatively enhanced compressive stiffness, while section SC2 has the upper stage with the plurality of first openings 17a opened and hence relatively reduced compressive stiffness. Therefore, this configuration allows a user to have his/her foot sole to be stably supported at a portion of rear foot portion R3 on the medial foot side and can also provide better fitting to the foot.

Eighth Embodiment

Figure 31:
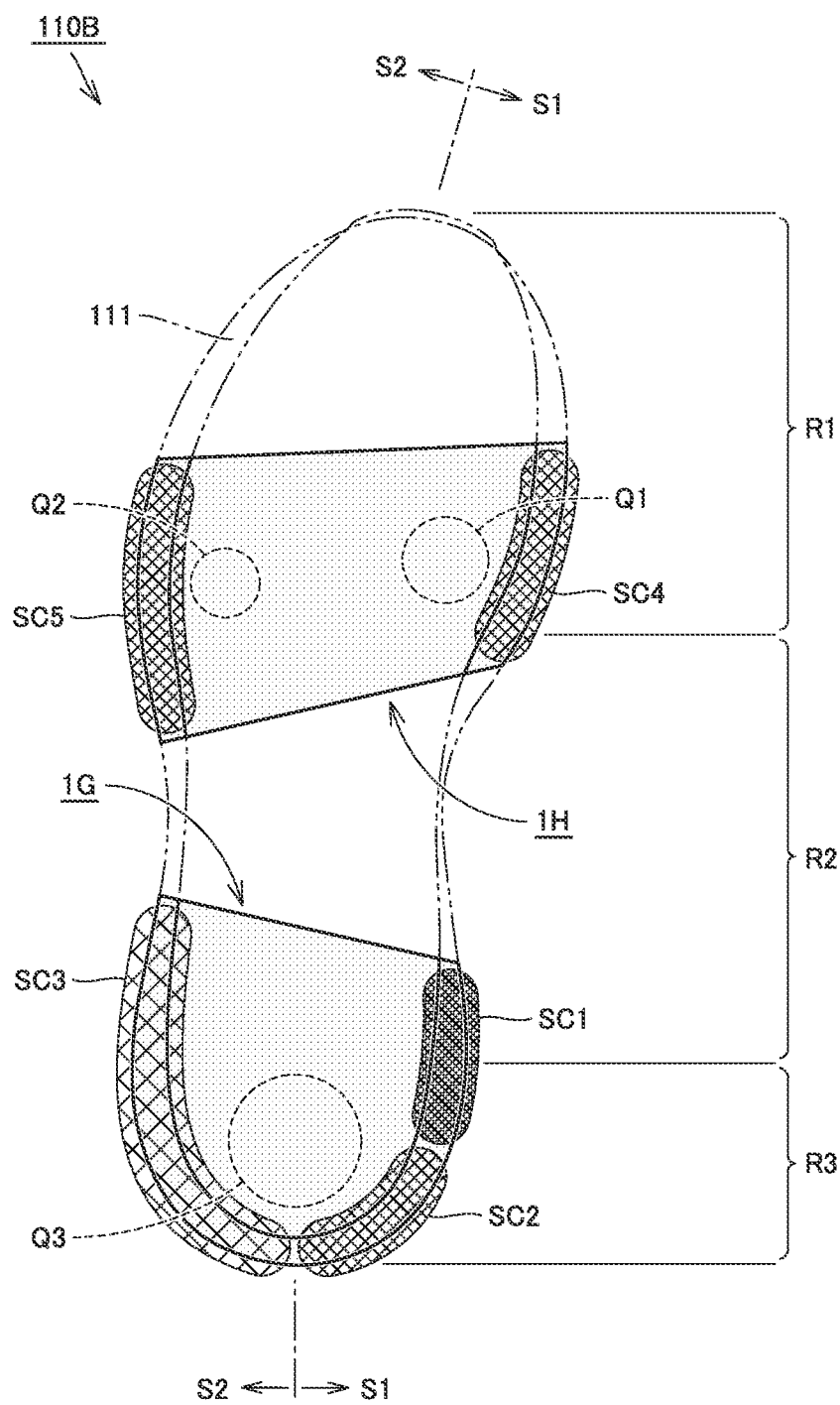
FIG. 31 schematically shows a configuration of a shoe sole according to an eighth embodiment.

FIG. 31 schematically shows a configuration of a shoe sole according to an eighth embodiment. Hereinafter, a shoe sole 110B and shock absorbers 1G and 1H comprised therein according to the present embodiment will be described with reference to FIG. 31. Shoe sole 110B according to the present embodiment is comprised by shoe 100A according to the seventh embodiment instead of shoe sole 110A described above.

As shown in FIG. 31, shoe sole 110B further comprises shock absorber 1H in addition to shock absorber 1G comprised by shoe sole 110A according to the seventh embodiment. As well as in the case of the seventh embodiment described above, shock absorber 1G is disposed at a portion of middle foot portion R2 closer to rear foot portion R3 and the entirety of rear foot portion R3. In contrast, shock absorber 1H is disposed at a portion of front foot portion R1 closer to middle foot portion R2 and a portion of middle foot portion R2 closer to front foot portion R1.

Midsole 111 has a notch formed at a position corresponding to the portion of front foot portion R1 closer to middle foot portion R2 and the portion of middle foot portion R2 closer to front foot portion R1, and the notch is filled with shock absorber 1H having a generally quadrangular external shape in a plan view. Thus, a portion of an end portion of shock absorber 1H is generally located along an edge portion of shoe sole 110B, that is, a rear edge of front foot portion R1 on the medial foot side, a front edge of middle foot portion R2 on the lateral foot side, and a rear edge of front foot portion R1 on the lateral foot side. In FIG. 31, in order to facilitate understanding, a region in which shock absorbers 1G and 1H are disposed, as seen in a plan view of shoe sole 110B, is shown in a light color. That is, as well as shock absorber 1G, shock absorber 1H has a shock absorbing region not only along an edge portion of shoe sole 110B described above but also in a region inner than the edge portion.

Herein, an end portion of shock absorber 1H located along an edge portion of shoe sole 110B is divided into two sections SC4 and SC5 according to a difference in configuration. More specifically, section SC4 corresponds to a rear edge of front foot portion R1 on the medial foot side and section SC5 corresponds to a front edge of middle foot portion R2 on the lateral foot side and a rear edge of front foot portion R1 on the lateral foot side. Note that sections SC4 and SC5 both have a configuration similar to that of section SC2 of shock absorber 1G.

Accordingly, around portion Q1 supporting the ball of the great toe of a foot, shoe sole 110B will have relatively larger compressive stiffness at the rear portion of front foot portion R1 on the medial foot side, and around portion Q2 supporting the ball of the little toe of the foot, shoe sole 110B will have relatively larger compressive stiffness at the rear portion of front foot portion R1 on the lateral foot side and the front portion of middle foot portion R2 on the lateral foot side.

This configuration allows a foot sole to be stably supported not only at the rear portion of middle foot portion R2 on the medial foot side and the portion of rear foot portion R3 on the medial foot side, but also at the rear portion of front foot portion R1 on the medial foot side as well as the rear portion of front foot portion R1 on the lateral foot side and the front portion of middle foot portion R2 on the lateral foot side, and when this is compared with the seventh embodiment, the former can provide a shoe sole and a shoe comprising the shoe sole that are more excellent in stability when landing and also more satisfactorily fit to a foot and are more lightweight, that are more particularly suitable for overpronators and people with pes planovalgus.

Ninth Embodiment

Figure 32:
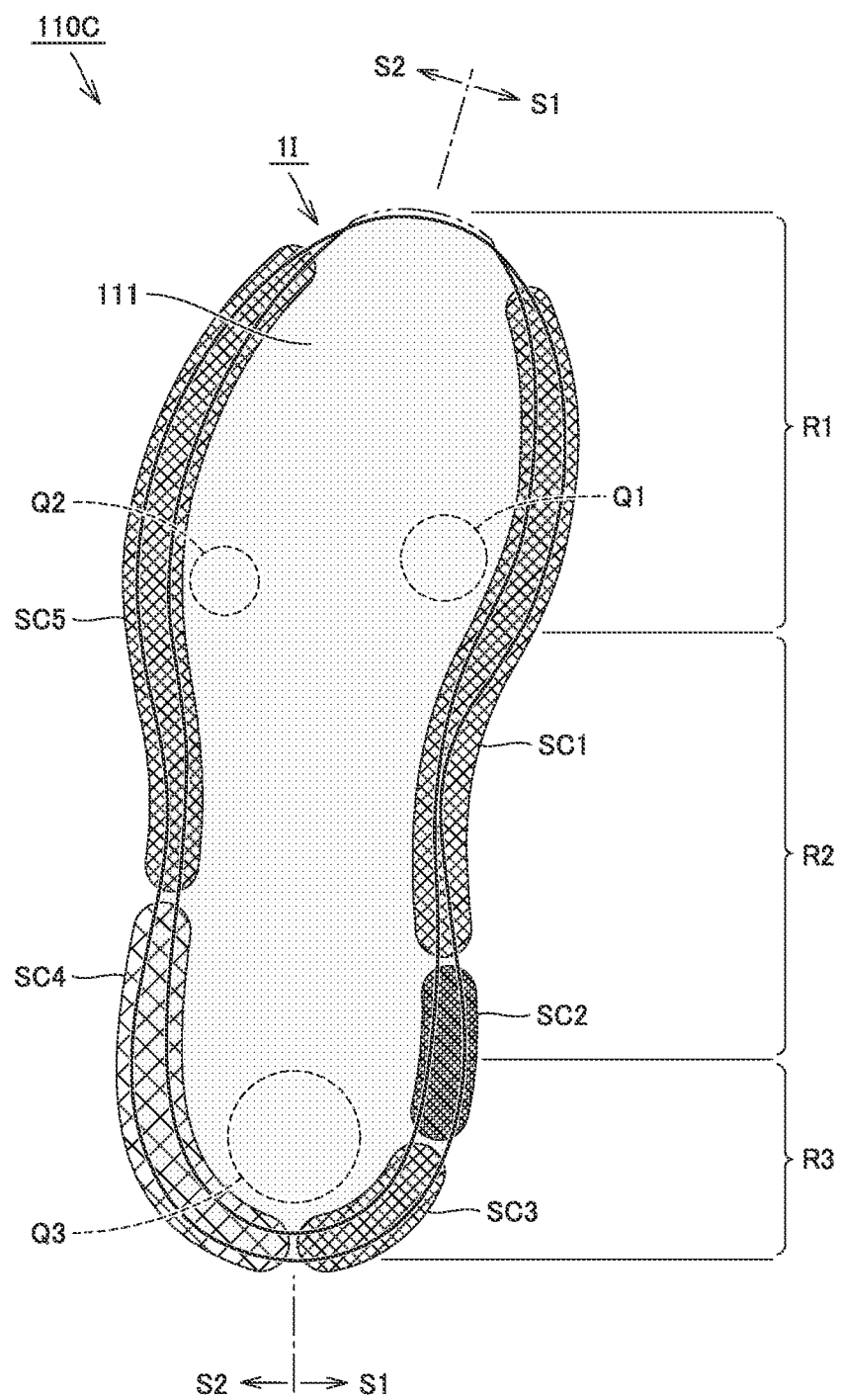
FIG. 32 schematically shows a configuration of a shoe sole according to a ninth embodiment.

FIG. 32 schematically shows a configuration of a shoe sole according to a ninth embodiment. Hereinafter, referring to FIG. 32, a shoe sole 110C and a shock absorber 1I comprised by shoe sole 110C according to the present embodiment will be described. Shoe sole 110C according to the present embodiment is comprised by shoe 100A according to the seventh embodiment instead of shoe sole 110A described above.

As shown in FIG. 32, shoe sole 110C comprises shock absorber 1I having a configuration different from that of shock absorber 1G comprised by shoe sole 110A according to the seventh embodiment. More specifically, shock absorber 1I is disposed throughout the entire area of shoe sole 110C in a plan view (that is, all of front foot portion R1, middle foot portion R2, and rear foot portion R3). In FIG. 32, in order to facilitate understanding, a region in which shock absorber 1I is disposed, as seen in a plan view of shoe sole 110C, is shown in a light color. That is, shock absorber 1I has a shock absorbing region not only along an edge portion of shoe sole 110C, which will be described hereinafter, but also in a region inner than that edge portion.

Herein, an end portion of shock absorber 1I located along an edge of shoe sole 110C is divided into five sections SC1 to SC5 according to a difference in configuration. More specifically, section SC1 corresponds to an edge of front foot portion R1 on the medial foot side and an edge of middle foot portion R2 on the medial foot side excluding a portion thereof closer to the rear side. Section SC2 corresponds to a rear edge of middle foot portion R2 on the medial foot side and a front edge of rear foot portion R3 on the medial foot side. Section SC3 corresponds to a rear edge of rear foot portion R3 on the medial foot side. Section SC4 corresponds to an edge of rear foot portion R3 on the lateral foot side and a rear edge of middle foot portion R2 on the lateral foot side. Section SC5 corresponds to an edge of middle foot portion R2 on the lateral foot side excluding a rear portion thereof, and an edge of front foot portion R1 on the lateral foot side.

Section SC1, section SC3, and section SC5 have a configuration similar to that of section SC2 of shock absorber 1G described above. Section SC2 has a configuration similar to that of section SC1 of shock absorber 1G. Section SC4 has a configuration similar to that of section SC3 of shock absorber 1G.

Accordingly, around portion Q1 supporting the ball of the great toe of a foot, shoe sole 110C will have relatively larger compressive stiffness at the rear portion of front foot portion R1 on the medial foot side, around portion Q2 supporting the ball of the little toe of the foot, shoe sole 110C will have relatively larger compressive stiffness at the rear portion of front foot portion R1 on the lateral foot side and the front portion of middle foot portion R2 on the lateral foot side, and around portion Q3 supporting the calcaneus of the foot, shoe sole 110C will have relatively larger compressive stiffness at the portion of rear foot portion R3 on the medial foot side.

Therefore, such a configuration, as well as the eight embodiment, can provide a shoe sole and a shoe comprising the shoe sole that are excellent in stability when landing and also satisfactorily fit to a foot and are lightweight, that are particularly suitable for overpronators and people with pes planovalgus.

Tenth Embodiment

Figure 33:
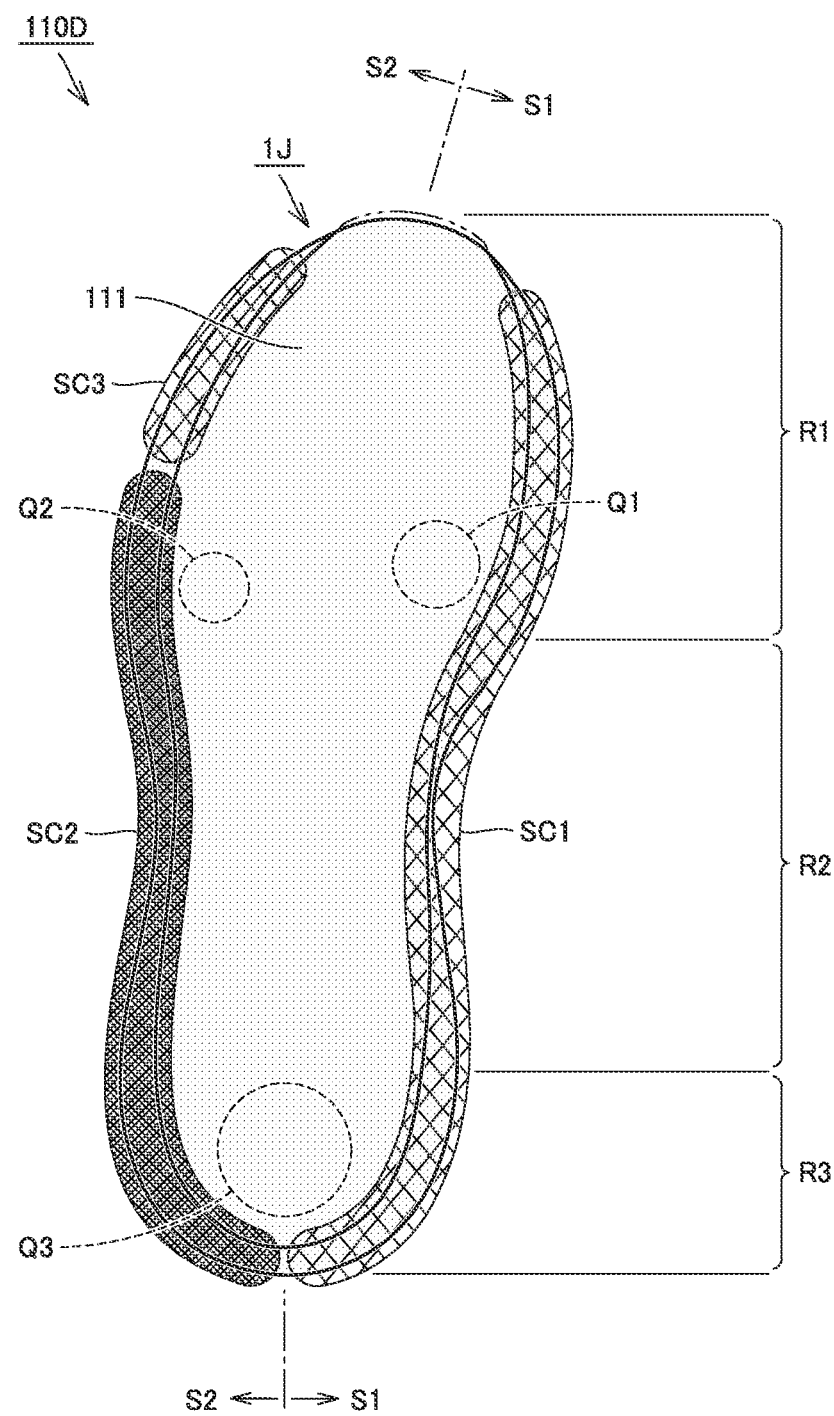
FIG. 33 schematically shows a configuration of a shoe sole according to a tenth embodiment.

FIG. 33 schematically shows a configuration of a shoe sole according to a tenth embodiment. Hereinafter, a shoe sole 110D and a shock absorber 1J comprised thereby according to the present embodiment will be described with reference to FIG. 33. Shoe sole 110D according to the present embodiment is comprised by shoe 100A according to the seventh embodiment instead of shoe sole 110A described above.

As shown in FIG. 32, shoe sole 110D comprises shock absorber 1J having a configuration different from that of shock absorber 1G comprised by shoe sole 110A according to the seventh embodiment. More specifically, shock absorber 1J is disposed throughout the entire area of shoe sole 110D in a plan view (that is, all of front foot portion R1, middle foot portion R2, and rear foot portion R3). In FIG. 33, in order to facilitate understanding, a region in which shock absorber 1J is disposed, as seen in a plan view of shoe sole 110D, is shown in a light color. That is, shock absorber 1J has a shock absorbing region not only along an edge portion of shoe sole 110D, which will be described hereinafter, but also in a region inner than that edge portion.

Herein, an end portion of shock absorber 1J located along an edge of shoe sole 110D is divided into three sections SC1 to SC3 according to a difference in configuration. More specifically, section SC1 corresponds to an edge portion of front foot portion R1 on the medial foot side, an edge portion of middle foot portion R2 on the medial foot side, and an edge portion of rear foot portion R3 on the medial foot side, section SC2 corresponds to an edge portion of rear foot portion R3 on the lateral foot side, an edge portion of middle foot portion R2 on the lateral foot side, and a rear edge portion of front foot portion R1 on the lateral foot side, and section SC3 corresponds to an edge portion of front foot portion R1 on the lateral foot side excluding a rear portion thereof.

Sections SC1 and SC3 both have a configuration similar to that of section SC3 of shock absorber 1G described above, and section SC2 has a configuration similar to that of section SC1 of shock absorber 1G.

Accordingly, around portion Q3 supporting the calcaneus of a foot, shoe sole 110D will have relatively larger compressive stiffness at the rear portion of middle foot portion R2 on the lateral foot side and the portion of rear foot portion R3 on the lateral foot side, and around portion Q2 supporting the ball of the little toe of the foot, shoe sole 110D will have relatively larger compressive stiffness at the rear portion of front foot portion R1 on the lateral foot side and the front portion of middle foot portion R2 on the lateral foot side. Furthermore, shoe sole 110D has a relatively smaller compressive stiffness at a portion on the medial foot side.

This configuration can suppress insufficient inward rolling of a heel when landing, i.e., so-called underpronation. That is, when an underpronator wears shoe 100A comprising shoe sole 110D according to the present embodiment, the underpronator can have his/her foot sole stably supported at a portion on the lateral foot side, and accordingly, pressure acting on midsole 111 can be dispersed and midsole 111 can be prevented from having excessive deformation, and as a result, underpronation can be suppressed.

Further, this configuration allows a foot sole to be stably supported at the portion on the lateral foot side, as described above, and accordingly, can disperse pressure acting on midsole 111 and prevent midsole 111 from having excessive deformation, so that when a person with genu valgum wears shoe 100A comprising shoe sole 110D according to the present embodiment, he/she can avoid a load concentrating at a portion of his/her feet on the lateral foot side when landing.

On the other hand, the above configuration can significantly alleviate shock exerted to the foot soles when landing as shock absorber 1G deforms more significantly at a portion on the medial foot side.

Therefore, shoe sole 110D and shoe 100A comprising shoe sole 110D according to the present embodiment can be excellent in stability when landing and also satisfactorily fit to a foot and be lightweight, and are particularly suitable for underpronator and people with genu valgum.

Eleventh Embodiment

Figure 34:
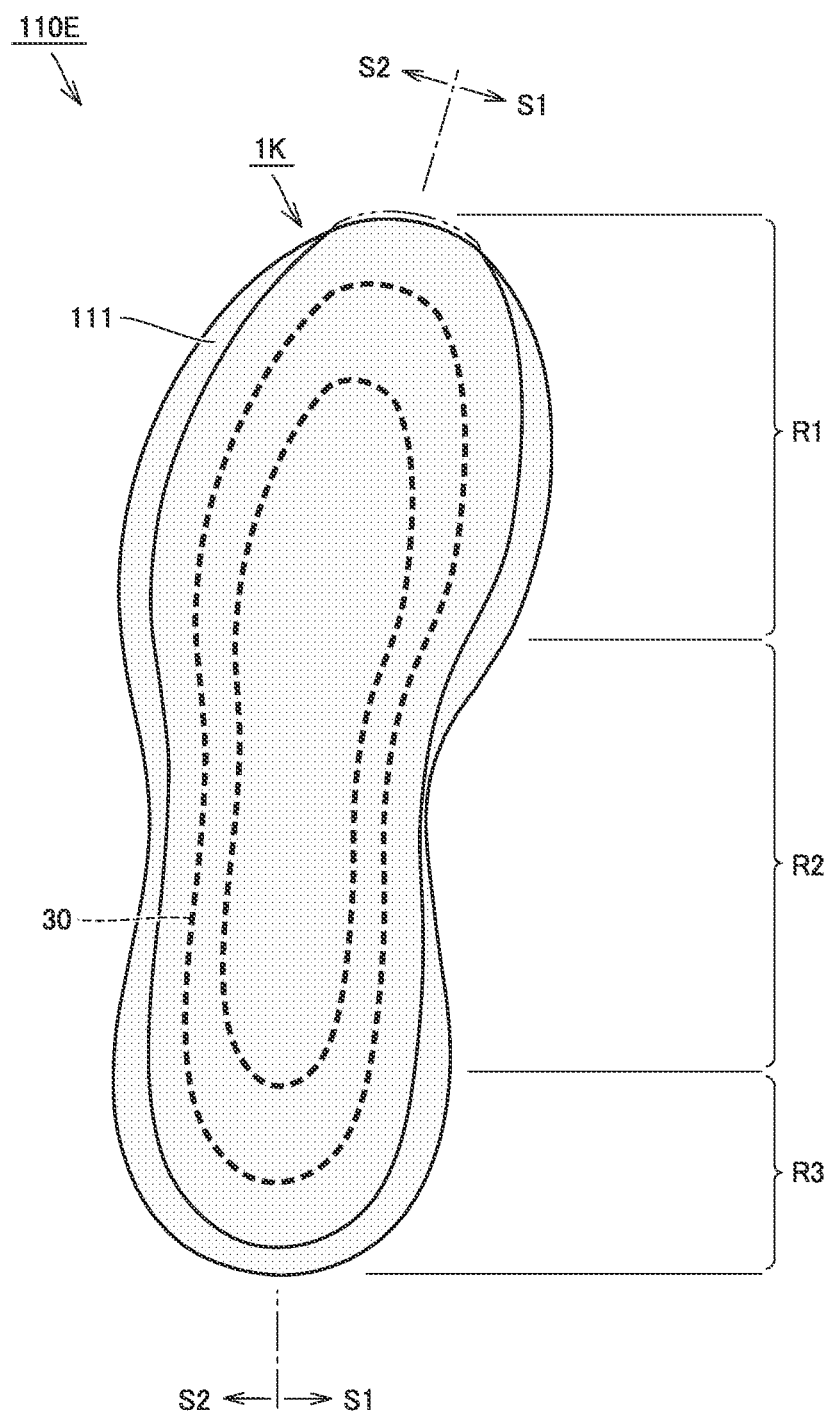
FIG. 34 schematically shows a configuration of a shoe sole according to an eleventh embodiment.

FIG. 34 schematically shows a configuration of a shoe sole according to an eleventh embodiment. Hereinafter, referring to FIG. 34, a shoe sole 110E and a shock absorber 1K comprised by shoe sole 110E according to the present embodiment will be described. Shoe sole 110E according to the present embodiment is comprised by shoe 100A according to the seventh embodiment instead of shoe sole 110A described above.

As shown in FIG. 34, shoe sole 110E comprises shock absorber 1K having a configuration different from that of shock absorber 1G comprised by shoe sole 110A according to the seventh embodiment. More specifically, shock absorber 1K is disposed throughout the entire area of shoe sole 110E in a plan view (that is, all of front foot portion R1, middle foot portion R2, and rear foot portion R3). In FIG. 34, in order to facilitate understanding, a region in which shock absorber 1K is disposed, as seen in a plan view of shoe sole 110E, is shown in a light color. That is, shock absorber 1K has a shock absorbing region not only along an edge portion of shoe sole 110E, which will be described hereinafter, but also in a region inner than that edge portion.

Unlike shock absorber 1G described above, shock absorber 1K has no differently shaped portion at an end portion located along the edge portion of shoe sole 110E, and has differently shaped portion 30 at a position in shock absorber 1L inner than the end portion in a plan view. Differently shaped portion 30 is locally provided in a shock absorbing region of shock absorber 1K formed of unit structures U, and more specifically, a double annular pattern having one annulus inside the other annulus in a plan view is adopted so that differently shaped portion 30 is uniformly located throughout shock absorber 1K.

Differently shaped portion 30 is in the form of a plate having a thickness in a direction intersecting with an axial direction (that is, a direction orthogonal to the plane of the sheet of FIG. 34) in which shock absorber 1K exhibits a shock absorbing function as the shock absorber receives a load, and differently shaped portion 30 extends in the axial direction and thus reaches opposite ends of shock absorber 1K. Differently shaped portion 30 is integrally connected to unit structure U of a portion adjacent thereto. Therefore, a portion of shock absorber 1K provided with differently shaped portion 30 will be larger in compressive stiffness than the remainder of shock absorber 1K.

Thus, shoe sole 110E comprising shock absorber 1K having a configuration in which differently shaped portion 30 is locally provided in a shock absorbing region in which unit structure U is disposed, and shoe 100A comprising shoe sole 110E can be lightweight and have an excellent shock absorbing function. In particular, by adopting the above configuration, differently shaped portion 30 that is locally provided can be provided uniformly throughout the entirety of shock absorber 1K, and shock absorber 1K can obtain a generally uniform shock absorbing function throughout the shock absorber while it is reduced in weight.

In the present embodiment, when differently shaped portion 30 is not provided on the side of the upper layer of shock absorber 1K and differently shaped portion 30 is provided only on the side of the lower layer of shock absorber 1K, a shoe sole and a shoe comprising the shoe sole that satisfactorily fit to a foot and also maintain large compressive stiffness can be obtained. In contrast, when differently shaped portion 30 is not provided on the side of the lower layer of shock absorber 1K and differently shaped portion 30 is provided only on the side of the upper layer of shock absorber 1K, it is easier to maintain the midsole's warped shape at front foot portion R1 when running, so that a work of an ankle joint when kicking out to run can be alleviated, and an energy-saving type shoe sole and shoe comprising the same can be obtained.

Twelfth Embodiment

Figure 35:
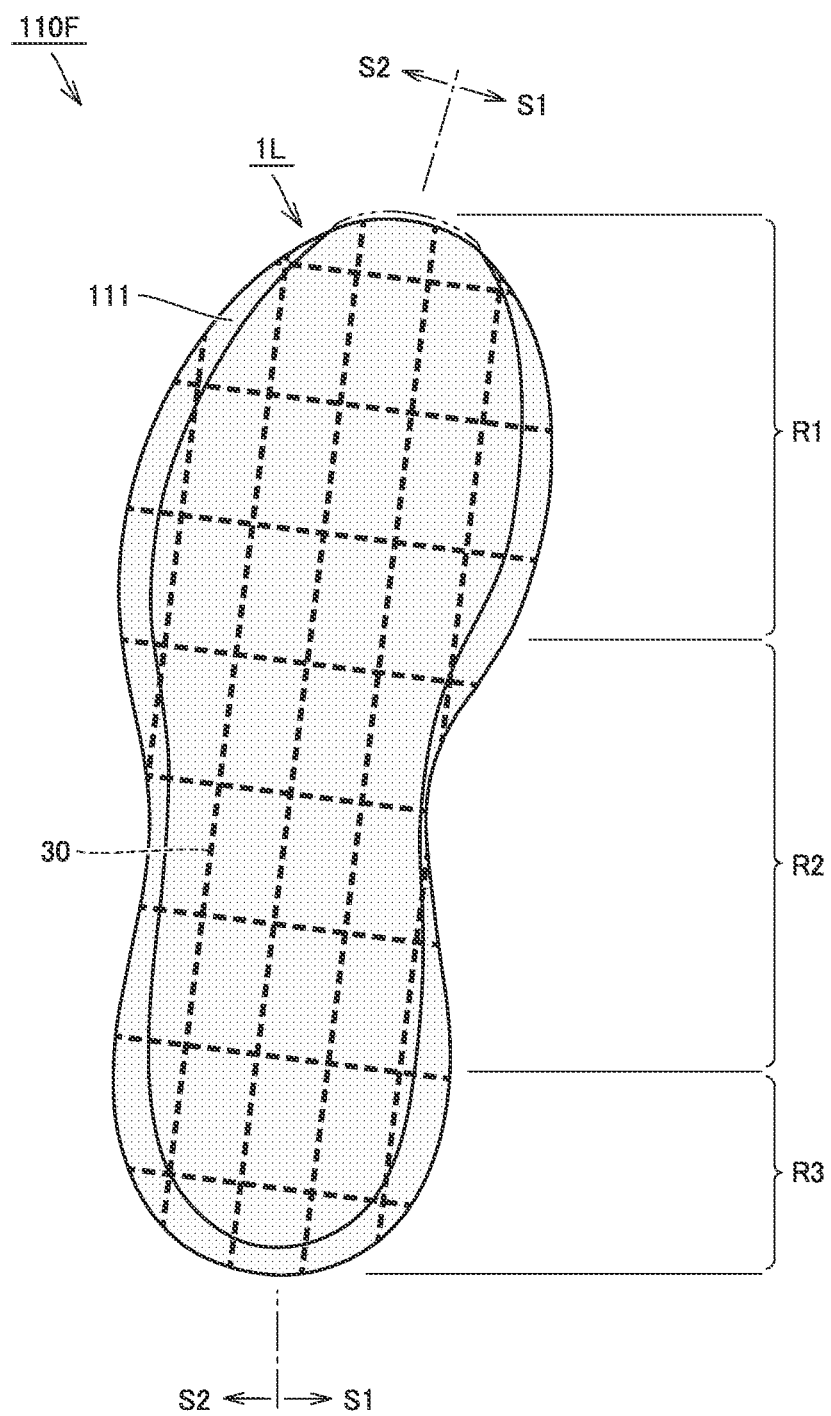
FIG. 35 schematically shows a configuration of a shoe sole according to a twelfth embodiment.

FIG. 35 schematically shows a configuration of a shoe sole according to a twelfth embodiment. Hereinafter, referring to FIG. 35, a shoe sole 110F and a shock absorber 1L comprised by shoe sole 110F according to the present embodiment will be described. Shoe sole 110F according to the present embodiment is comprised by shoe 100A according to the seventh embodiment instead of shoe sole 110A described above.

As shown in FIG. 35, shoe sole 110F comprises shock absorber 1L having a configuration different from that of shock absorber 1G comprised by shoe sole 110A according to the seventh embodiment. More specifically, shock absorber 1L is disposed throughout the entire area of shoe sole 110F in a plan view (that is, all of front foot portion R1, middle foot portion R2, and rear foot portion R3). In FIG. 35, in order to facilitate understanding, a region in which shock absorber 1L is disposed, as seen in a plan view of shoe sole 110F, is shown in a light color. That is, shock absorber 1L has a shock absorbing region not only along an edge portion of shoe sole 110F, which will be described hereinafter, but also in a region inner than that edge portion.

Unlike shock absorber 1G described above, shock absorber 1L has differently shaped portion 30 not only at an end portion located along the edge portion of shoe sole 110F but also a position in shock absorber 1L inner than the end portion in a plan view. Differently shaped portion 30 is locally provided in a shock absorbing region of shock absorber 1L formed of unit structures U, and more specifically, differently shaped portion 30 is in the form of a lattice in a plan view that reaches the end portion of shoe sole 110F described above so that differently shaped portion 30 is uniformly located throughout shock absorber 1L.

Differently shaped portion 30 is in the form of a plate having a thickness in a direction intersecting with an axial direction (that is, a direction orthogonal to the plane of the sheet of FIG. 35) in which shock absorber 1L exhibits a shock absorbing function as the shock absorber receives a load, and differently shaped portion 30 extends in the axial direction and thus reaches opposite ends of shock absorber 1L. Differently shaped portion 30 is integrally connected to unit structure U of a portion adjacent thereto. Therefore, a portion of shock absorber 1L provided with differently shaped portion 30 will be larger in compressive stiffness than the remainder of shock absorber 1L.

Thus, shoe sole 110F comprising shock absorber 1L having a configuration in which differently shaped portion 30 is locally provided in a shock absorbing region in which unit structure U is disposed, and shoe 100A comprising shoe sole 110F can be lightweight and have an excellent shock absorbing function. In particular, by adopting the above configuration, differently shaped portion 30 that is locally provided can be provided uniformly throughout the entirety of shock absorber 1L, and shock absorber 1L can obtain a generally uniform shock absorbing function throughout the shock absorber while it is reduced in weight.

In the present embodiment, when differently shaped portion 30 is not provided on the side of the upper layer of shock absorber 1L and differently shaped portion 30 is provided only on the side of the lower layer of shock absorber 1L, a shoe sole and a shoe comprising the shoe sole that satisfactorily fit to a foot and also maintain large compressive stiffness can be obtained. In contrast, when differently shaped portion 30 is not provided on the side of the lower layer of shock absorber 1L and differently shaped portion 30 is provided only on the side of the upper layer of shock absorber 1L, it is easier to maintain the midsole's warped shape at front foot portion R1 when running, so that a work of an ankle joint when kicking out to run can be alleviated, and an energy-saving type shoe sole and shoe comprising the same can be obtained.

Thirteenth Embodiment

Figure 36:
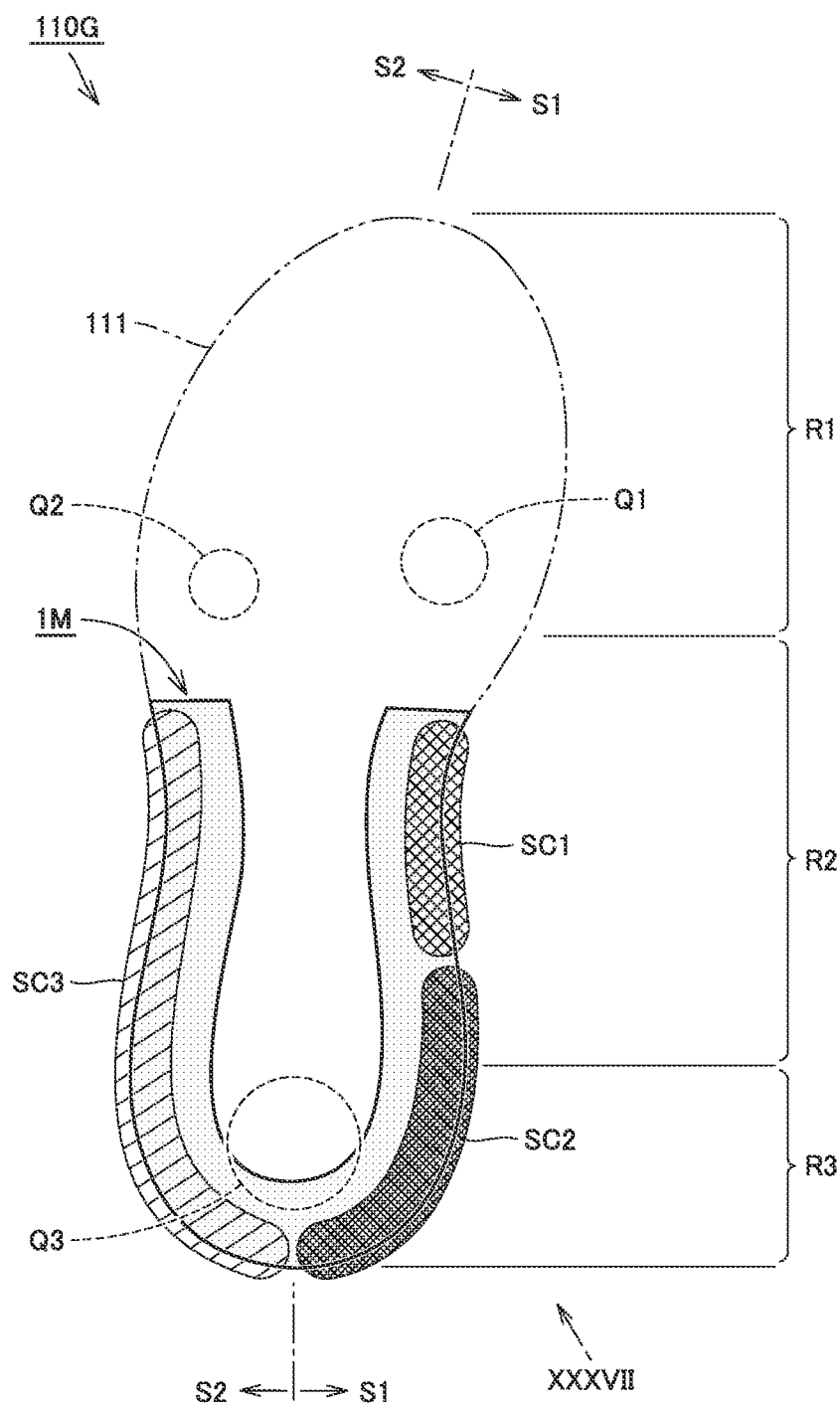
FIG. 36 schematically shows a configuration of a shoe sole according to a thirteenth embodiment.
Figure 37:
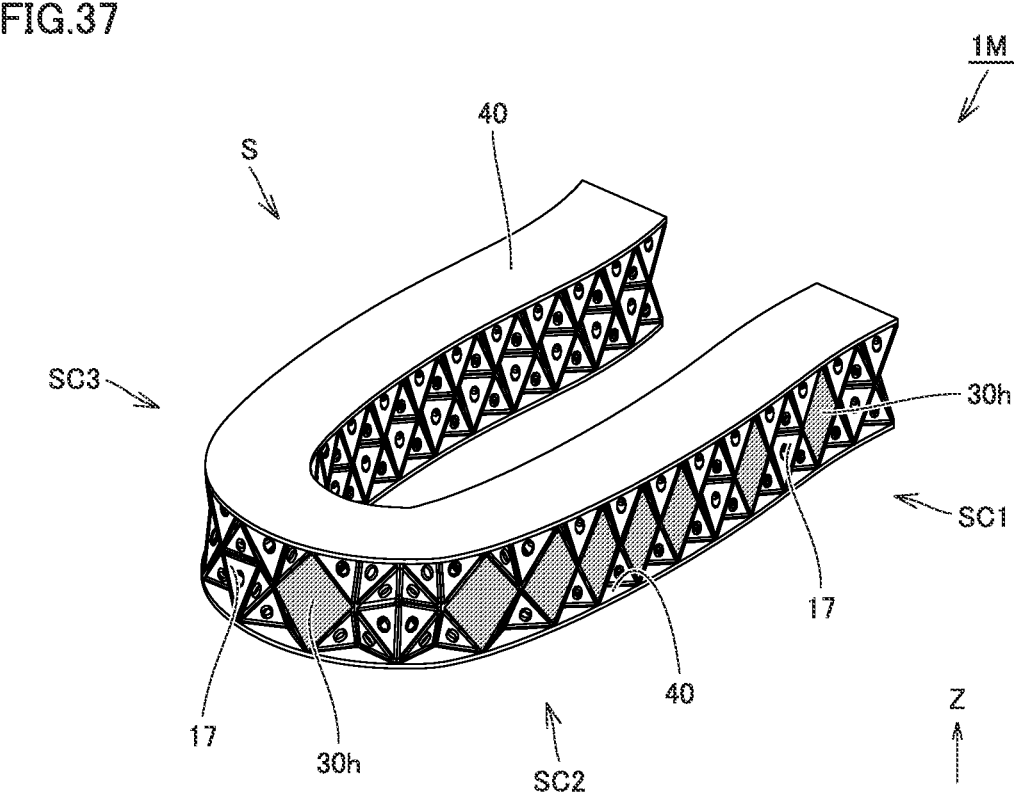
FIG. 37 is a perspective view of a shock absorber that the shoe sole shown in FIG. 36 comprises.

FIG. 36 schematically shows a configuration of a shoe sole according to a thirteenth embodiment. FIG. 37 is a perspective view of a shock absorber comprised by the shoe sole shown in FIG. 36 seen in a direction indicated by an arrow XXXVII indicated in FIG. 36. FIGS. 38A to 38E schematically show examples of arrangements of the unit structure of the shock absorber in the shoe sole shown in FIG. 36. Hereinafter, a shoe sole 110G and a shock absorber 1M comprised thereby according to the present embodiment will be described with reference to FIGS. 36, 37, and 38A to 38E. Shoe sole 110G according to the present embodiment is comprised by shoe 100A according to the seventh embodiment instead of shoe sole 110A described above.

As shown in FIG. 36, shoe sole 110G comprises shock absorber 1M having a configuration different from that of shock absorber 1G comprised by shoe sole 110A according to the seventh embodiment. Specifically, shock absorber 1M is formed generally in the form of the letter U in a plan view and disposed in midsole 111 at a notch formed in the same shape as shock absorber 1M. Accordingly, shock absorber 1M will be disposed generally along an edge of middle foot portion R2 on the medial foot side, an edge of rear foot portion R3 on the medial foot side, a rear edge of rear foot portion R3, an edge of rear foot portion R3 on the lateral foot side, and an edge of middle foot portion R2 on the lateral foot side. In FIG. 36, in order to facilitate understanding, a region in which shock absorber 1M is disposed, as seen in a plan view of shoe sole 110G, is shown in a light color. That is, shock absorber 1M has a shock absorbing region not only along an edge portion of shoe sole 110M, which has been described above, but also in a region inner than that edge portion.

As shown in FIG. 37, shock absorber 1M has its shock absorbing region composed of three-dimensional structure S having an octet structure as a reference. Therefore, shock absorber 1M has an end portion with a plurality of openings 17 independent of one another and aligned in an oblique lattice, as has been described above. Note that shock absorber 1M has a plurality of unit structures U arranged in both the widthwise direction and the depthwise direction (that is, the horizontal direction), and only one unit structure U arranged in the heightwise direction (that is, the Z direction).

Herein, as shown in FIG. 36, an end portion of shock absorber 1M located along an edge portion of shoe sole 110G is divided into three sections SC1 to SC3 according to a difference in configuration. More specifically, section SC1 corresponds to an edge of middle foot portion R2 on the medial foot side closer to the center, section SC2 corresponds to a rear edge of middle foot portion R2 on the medial foot side and an edge of rear foot portion R3 on the medial foot side, and section SC3 corresponds to an edge of rear foot portion R3 on the lateral foot side and an edge of middle foot portion R2 on the lateral foot side excluding a front portion thereof.

As shown in FIG. 37, in section SC1, a plurality of rhombic openings 17 located at an end portion of shock absorber 1M adjacently in the horizontal direction have every other one thereof closed by differently shaped portion 30h in the form of a flat plate (see the ninth configuration example shown in FIG. 14). In section SC2, a plurality of rhombic openings 17 located at an end portion of shock absorber 1M adjacently in the horizontal direction are all closed by differently shaped portion 30h in the form of a flat plate. In section SC3, in contrast, a plurality of openings 17 located at an end of shock absorber 1M are all unclosed and exposed as they are. In FIG. 37, in order to facilitate understanding, of shock absorber 1M, differently shaped portion 30 is alone shown in a dark color.

This configuration allows shock absorber 1M to have section SC2 with larger compressive stiffness than section SC1 and section SC3, and section SC1 with larger compressive stiffness than section SC3. That is, shock absorber 1M can have an end portion with compressive stiffness variable for each section and allows compressive stiffness to be enhanced in the order of section SC3, section SC1, and section SC2.

Accordingly, around portion Q3 supporting the calcaneus of a foot, shoe sole 110G has relatively larger compressive stiffness at a rear portion of middle foot portion R2 on the medial foot side and a portion of rear foot portion R3 on the medial foot side, and relatively smaller compressive stiffness at a rear portion of middle foot portion R2 on the lateral foot side and a portion of rear foot portion R3 on the lateral foot side.

Therefore, shoe sole 110G and shoe 100A comprising shoe sole 110G according to the present embodiment, as well as those in the seventh embodiment, can be excellent in stability when landing and also satisfactorily fit to a foot and be lightweight, and are particularly suitable for overpronators and people with pes planovalgus.

While shock absorber 1M may have a plurality of mutually independent members combined together and mutually bonded together or the like to be generally formed generally in the form of the letter U in a plan view as has been described above, more preferably, it has its entirety configured as a one-piece member to be formed generally in the form of the letter U in a plan view as has been described above. When the latter configuration is adopted, in particular, it is important how shock absorber 1M including a plurality of cuboidal unit structures U is laid out for a non-cuboidal notch while eliminating an unnecessary imbalance of a shock absorbing function in each portion.

Hereinafter, with reference to FIGS. 38A to 38E, a specific designing method will be described which allows a shock absorber comprising a plurality of unit structures U each occupying a cuboidal unit space to be laid out in a non-cuboidal region while eliminating an unnecessary imbalance of a shock absorbing function in each portion simply by changing some or all of the plurality of unit structures U slightly, rather than significantly, in shape.

Figure 38A:
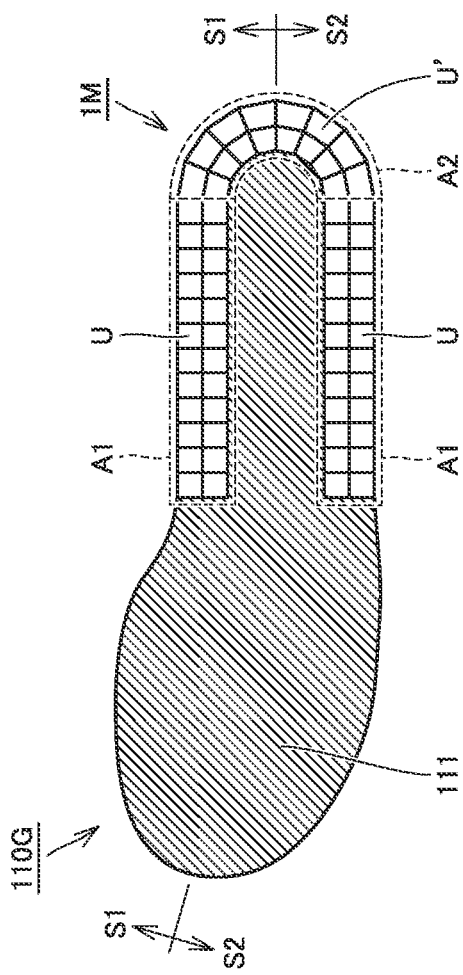
FIGS. 38A to 38E each schematically show an example of arrangement of a unit structure of a shock absorber in the shoe sole shown in FIG. 36.

Initially, as shown in FIG. 38A, a region in which the shock absorber is disposed is divided into an area A1 in which unit structures U can be disposed as they are as they are increased/decreased in number in at least one of the widthwise, depthwise and heightwise directions while they are adjusted in size, and an area A2 in which it is difficult to do so. Specifically, in the present embodiment, of a region in which shock absorber 1M is disposed, an area extending linearly along a peripheral edge of shoe sole 110G on the medial and lateral foot sides corresponds to area A1, and an area extending in a curve along a peripheral edge of shoe sole 110G on the side of the rear end corresponds to area A2.

Figure 38E:
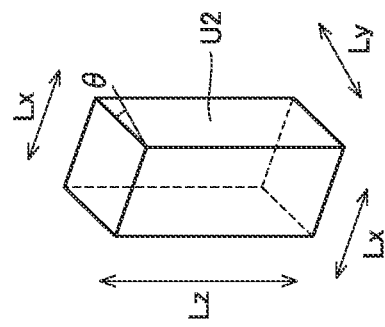
Figure 38D:
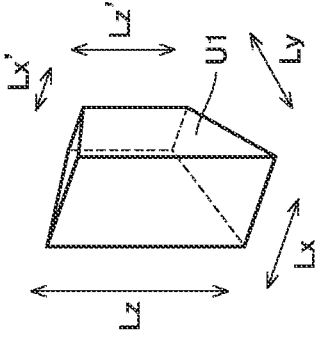
Figure 38C:
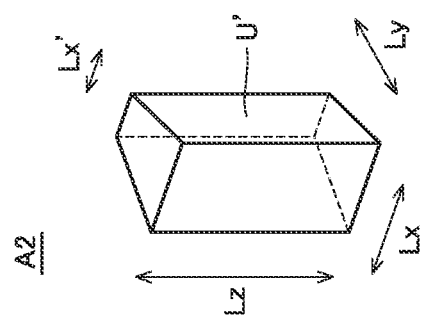
Figure 38B:
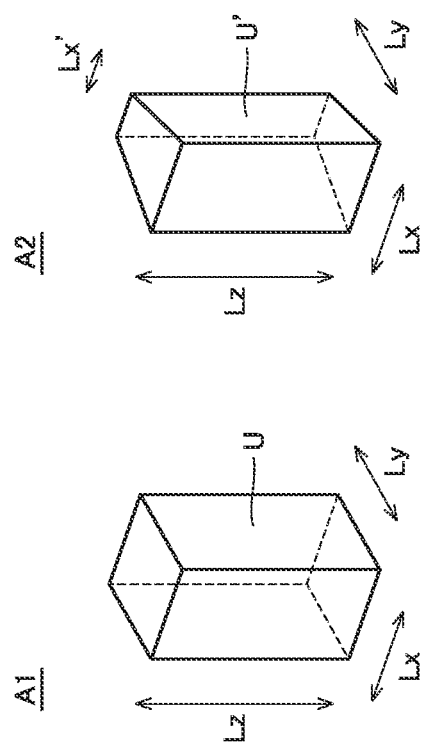

Herein, in area A1, as shown in FIG. 38B, a plurality of unit structures U each occupying a unit space in the form of a cuboid having three sides adjusted to have lengths Lx, Ly, and Lz, respectively, are disposed to be adjacent to one another, for the sake of illustration. Thus, area A1 will have a plurality of unit structures U adjusted in size laid therein without a gap therebetween.

In area A2, a plurality of unit structures U' are disposed to be adjacent to one another, each unit structure U' being configured to occupy a unit space changed in shape to have three pairs of opposite surfaces with a specific one pair having its surfaces non-parallel to each other, as shown in FIG. 38C, for the sake of illustration. Herein, unit structure U' is for example what has been changed in shape to occupy a unit space adjusted so that for example those four sides of the unit space which extend in the widthwise direction have a pair of adjacent sides with a length Lx' slightly shorter than length Lx of the other sides. Such a slight change in shape does not significantly change the unit structure's shock absorbing function.

Unit structures U' thus shaped can be individually adjusted in size and orientation and disposed side by side to be laid substantially without a gap along area A2 that extends in a curve as described above. Thus simply by such a slight change in shape, area A2 also comes to exhibit a shock absorbing function equivalent to that of area A1 described above.

Thus such a designing method can be adopted to allow a shock absorber comprising a plurality of unit structures U each occupying a cuboidal unit space to be laid out in a non-cuboidal region while eliminating an unnecessary imbalance of a shock absorbing function in each portion simply by changing some or all of the plurality of unit structures U slightly, rather than significantly, in shape.

Therefore, when this designing method is employed to design a shock absorber, and based thereon, three dimensional additive manufacturing apparatus is employed to manufacture the shock absorber, the shock absorber can be easily obtained as a one-piece member with a variable external shape.

In the designing method described above, when a shock absorber is laid in a more complicated curved area, a plurality of unit structures U1 may be disposed to be adjacent to one another, unit structure U1 being configured to occupy a unit space changed in shape to have three pairs of opposite surfaces with specific two pairs thereof each having its surfaces non-parallel to each other, as shown in FIG. 38D.

Herein, unit structure U1 is for example what has been changed in shape to occupy a unit space adjusted for example so that those four sides of the unit space which extend in the widthwise direction have a pair of adjacent sides with length Lx' slightly shorter than length Lx of the other sides and, together therewith, furthermore, for example so that those four sides of the unit space which extend in the heightwise direction have a pair of adjacent sides with a length Lz' slightly shorter than length Lz of the other sides. Such a slight change in shape does not significantly change the unit structure's shock absorbing function.

Unit structures U1 thus shaped can be individually adjusted in size and orientation and disposed side by side to be laid substantially without a gap along the above described, complicated curved area. Thus simply by such a slight change in shape, the area also comes to exhibit a shock absorbing function equivalent to that of area A1 described above.

Further, in the designing method described above, when a shock absorber is laid in a linearly extending area, then, in place of unit structure U as shown in FIG. 38B, a plurality of unit structures U2 each as shown in FIG. 38E may be disposed to be adjacent to one another. Herein, unit structure U2 is for example what has been changed in shape to occupy a unit space adjusted to have three pairs of opposite surfaces parallel to each other, with a specific one pair having its surfaces in the form of a parallelogram.

Note that unit structure U2 as shown for example has a pair of surfaces that is located in the heightwise direction inclined in the widthwise direction by an angle θ to be in the form of a parallelogram. Such a slight change in shape does not significantly change the unit structure's shock absorbing function. Thus, unit structures U2 can also be laid to allow a shock absorber to be laid out without a gap while eliminating an unnecessary imbalance of the shock absorbing function for each portion.

(Ninth and Tenth Variations)

Figure 39:
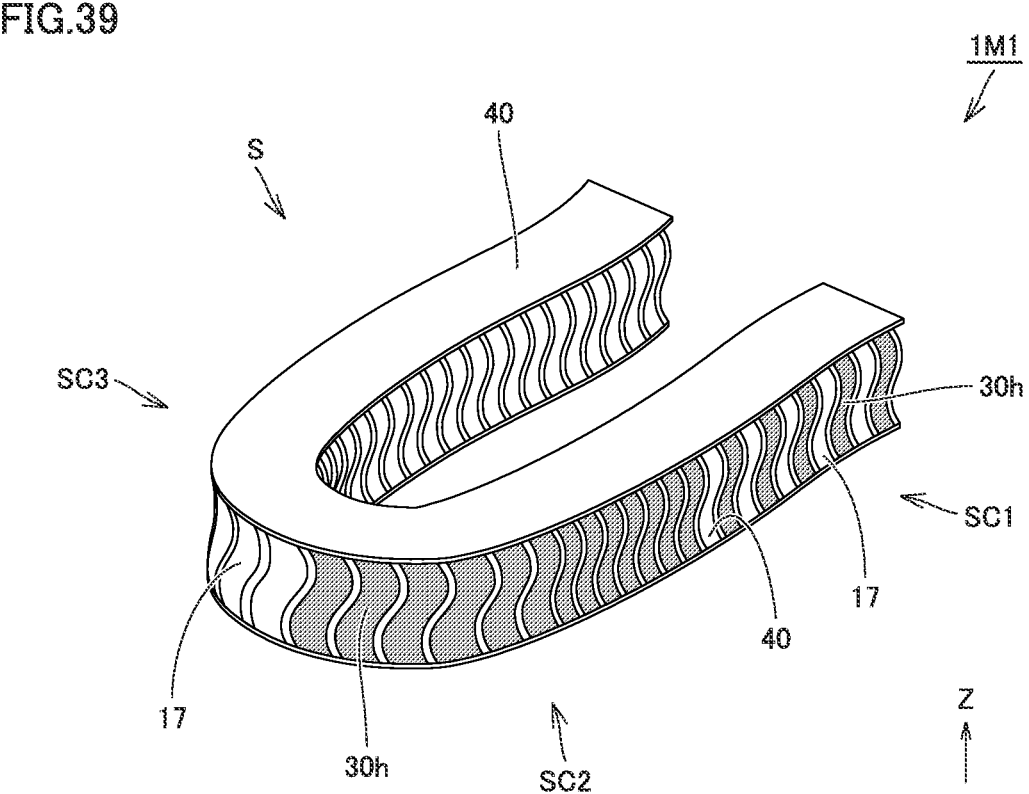
FIG. 39 is a perspective view of a shock absorber that a shoe sole according to a ninth variation comprises.
Figure 40:
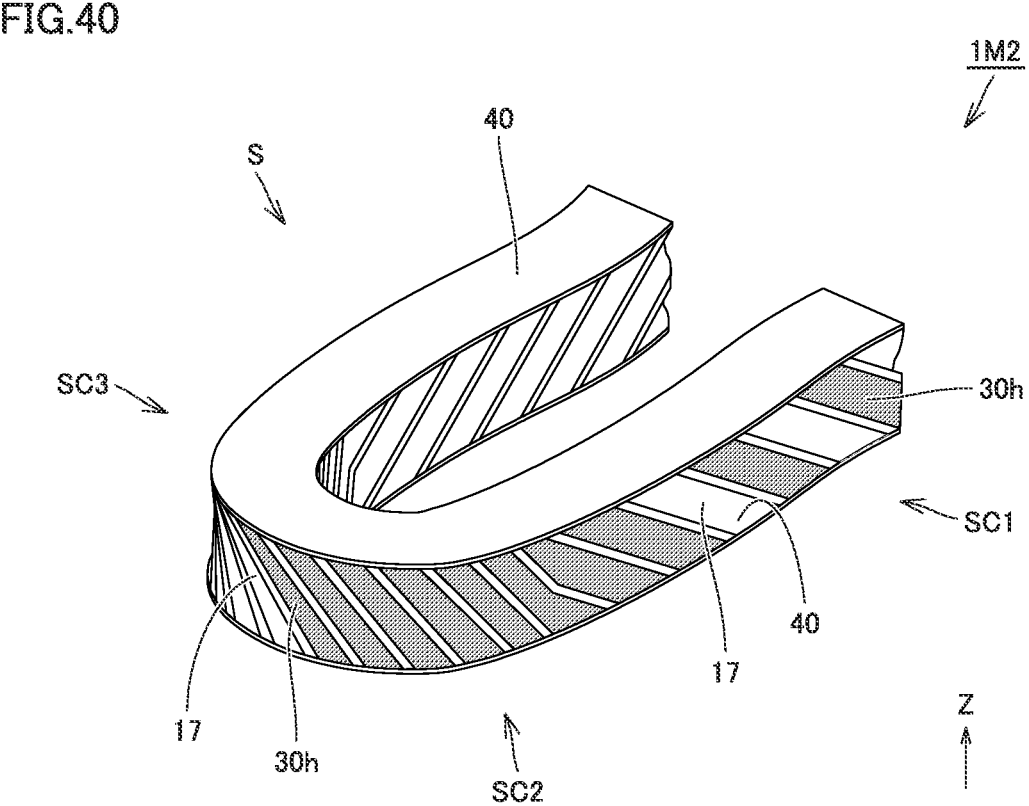
FIG. 40 is a perspective view of a shock absorber that a shoe sole according to a tenth variation comprises.

FIGS. 39 and 40 are perspective views of shock absorbers that a shoe sole comprises according to ninth and tenth variations, respectively. Hereinafter, shock absorbers 1M1 and 1M2 comprised in the shoe sole according to the ninth and tenth variations based on the thirteenth embodiment will be described with reference to FIGS. 39 and 40. The shoe sole according to the ninth and tenth variations is comprised by shoe 100A according to the thirteenth embodiment instead of shoe sole 110G described above.

As shown in FIG. 39, shock absorber 1M1 comprised by the shoe sole according to the ninth variation is similar to shock absorber 1M comprised by shoe sole 110G according to the thirteenth embodiment described above, that is, it is generally in the form of the letter U in a plan view, and the former differs from the latter in that the former has a shock absorbing region composed of three-dimensional structure S with a gyroid structure serving as a reference.

As shown in FIG. 40, shock absorber 1M2 comprised by the shoe sole according to the tenth variation is similar to shock absorber 1M comprised by shoe sole 110G according to the thirteenth embodiment described above, that is, it is generally in the form of the letter U in a plan view, and the former differs from the latter in that the former has a shock absorbing region composed of three-dimensional structure S with a Schwarz' D structure serving as a reference.

Herein, as well as shock absorber 1M described above, shock absorbers 1M1 and 1M2 both have three sections SC1 to SC3. In section SC1, a plurality of openings 17 located at an end portion of shock absorber 1M1, 1M2 adjacently in the horizontal direction have every other one thereof closed by differently shaped portion 30*h* in the form of a flat plate (see the ninth configuration example shown in FIG. 14). In section SC2, a plurality of openings 17 located at an end portion of shock absorber 1M1, 1M2 adjacently in the horizontal direction are all closed by differently shaped portion 30*h* in the form of a flat plate. In section SC3, in contrast, a plurality of openings 17 located at an end of shock absorber 1M1, 1M2 are all unclosed and exposed as they are. Note that, in order to facilitate understanding, FIGS. 39 and 40 do not show the inner structures of shock absorbers 1M1 and 1M2 externally visible through opening 17.

Therefore, such a configuration, as well as the seven embodiment, can provide a shoe sole and a shoe comprising the shoe sole that are excellent in stability when landing and also satisfactorily fit to a foot and are lightweight, that are particularly suitable for overpronators and people with pes planovalgus.

SUMMARY OF DISCLOSURE IN EMBODIMENTS

The first to thirteenth embodiments and their variations disclose characteristic configurations, as summarized below:

A shock absorber according to an aspect of the present disclosure includes a three-dimensional structure composed of a unit structure repeatedly, regularly and continuously arranged in at least one direction, the unit structure being a three-dimensional shape formed by a wall having an external shape defined by a pair of parallel planes or curved surfaces. In the shock absorber according to the present invention, a differently shaped portion which does not correspond to the wall defining the unit structure is locally provided in a shock absorbing region which is a region in which the three-dimensional structure has the unit structure disposed.

In the shock absorber according to an aspect of the present disclosure, the differently shaped portion may be in the form of a plate having a thickness in a direction intersecting with an axial direction in which the shock absorber exhibits a shock absorbing function when the shock absorber receives a load.

In the shock absorber according to an aspect of the present disclosure, the differently shaped portion may reach opposite ends of the shock absorbing region in the axial direction so as to traverse the shock absorbing region.

In the shock absorber according to an aspect of the present disclosure, the differently shaped portion may be provided so as to cover an opening located at an end portion of the shock absorbing region in a direction intersecting with the axial direction.

In the shock absorber according to an aspect of the present disclosure, the three-dimensional structure may be configured by a triply periodic minimal surface with a thickness added thereto.

In the shock absorber according to an aspect of the present disclosure, the three-dimensional structure may have a Schwarz' P structure, a gyroid structure, or a Schwarz' D structure.

In the shock absorber according to an aspect of the present disclosure, the three-dimensional structure may be composed of a plurality of planes disposed to intersect with one another with a thickness added thereto so that the three-dimensional structure has a cavity therein.

In the shock absorber according to an aspect of the present disclosure, the three-dimensional structure may have an octet structure, a cubic structure, or a cubic octet structure.

The shock absorber according to an aspect of the present disclosure may be formed of either a resin material or a rubber material.

The shock absorber according to an aspect of the present disclosure may be composed of a polymer composition containing at least one selected from the group consisting of an olefin-based polymer, an amide-based polymer, an ester-based polymer, a urethane-based polymer, a styrene-based polymer, an acrylic polymer, and a methacrylic polymer.

A shoe sole according to an aspect of the present disclosure comprises the shock absorber according to an aspect of the present disclosure as described above.

In the shoe sole according to an aspect of the present disclosure, the shock absorber may be disposed such that an axial direction in which the shock absorber exhibits a shock absorbing function as the shock absorber receives a load is orthogonal to a tread.

A shoe according to an aspect of the present disclosure comprises the shoe sole according to an aspect of the present disclosure described above, and an upper provided above the shoe sole.

The configuration as above can provide a shock absorber which is lightweight and has an excellent shock absorbing function, and can be used in various applications, a shoe sole comprising the shock absorber, and a shoe comprising the shoe sole.

OTHER EMBODIMENTS

While in the first and third to fifth embodiments and their variations described above, a differently shaped portion provided in a shock absorbing region is formed to reach opposite end portions of the shock absorber in an axial direction in which the shock absorber exhibits a shock absorbing function as the shock absorber receives a load for the sake of illustration, the differently shaped portion may be formed to reach only one end portion in the axial direction or may be formed not to reach either end portion in the axial direction. Such a configuration will also accordingly enhance compressive stiffness at a portion provided with the differently shaped portion.

While in the first to sixth embodiments and their variations, a three-dimensional structure includes a plurality of unit structures with their external shapes equally dimensioned for the sake of illustration, the unit structure can have widthwise, depthwise and heightwise dimensions variably, as has been described above. Accordingly, a three-dimensional structure constituting a shock absorbing region may be configured to include unit structures having external shapes differently dimensioned. This configuration allows compressive stiffness, deformability and the like to be variously adjusted for each portion of the shock absorber.

Therefore, when the unit structure's external dimensions are adjusted for each portion of the shock absorber and furthermore, the differently shaped portion is provided at a specific portion of the shock absorber, variously changing their combination allows the shock absorber to be fabricated with a high degree of freedom in design to have a variety of shock absorbing functions. In particular, when the shock absorber is comprised by a shoe sole the shock absorber can be easily manufactured to have a desired function by adjusting the unit structure's external dimension for each portion of the shock absorber, and introducing or dispensing with the above-described differently shaped portion in the form of a cover at an end portion of the shock absorber and variously changing the differently shaped portion in shape, thickness and the like if it is introduced.

Further, while in the second to fourth and sixth to thirteenth embodiments and their variations described above, a shock absorber formed with a differently shaped portion provided only at an end portion of a shock absorbing region and a shoe sole comprising the shock absorber, and a shoe comprising the shoe sole are indicated as an example for illustration, a shock absorber formed with a differently shaped portion provided not only at an end portion of a shock absorbing region but also at a prescribed position inside the shock absorbing region and a shoe sole comprising the shock absorber, and a shoe comprising the shoe sole may alternatively be provided.

Furthermore, in the seventh to thirteenth embodiments and their variations described above, a shock absorber formed such that a three-dimensional structure serving as a shock absorbing region is sandwiched in its axial direction between a pair of supports is applied to a shoe sole and a shoe comprising the shoe sole, and in that case, the paired supports may each be bonded or similarly fixed to a midsole, an outsole, an upper body, or the like which will be disposed to face the support. When the support as described above is provided at a portion of the shock absorber closer to the tread, the support may per se be provided with the function of an outsole to dispense with an outsole which is a separate member. Further, the shock absorber may not be provided with the support and may directly be bonded or similarly fixed to a midsole, an outsole, an upper body, or the like.

Furthermore, while in the seventh to thirteenth embodiments and their variations described above, a shock absorber is disposed at a portion or the entirety of a shoe sole in a plan view for the sake of illustration, where the shock absorber is provided is not limited to the layouts specifically indicated as examples in these embodiments and their variations. For example, depending on the type the competition in which the shoe is used, how it is used, and the like, the shock absorber may be applied to a portion of the shoe sole on either one of the medial or lateral side or may be applied only at a partial region along an edge of the shoe sole (the partial region may be a plurality of such regions independent of one another). The shock absorber may be provided between the midsole and the upper. When the shock absorber has its entire surface provided with the shock absorber, then, in place of the midsole, its entirety may be replaced with the shock absorber.

In addition, the shock absorber may have a wall varied in thickness depending on where the shock absorber is disposed with respect to the shoe sole, or may have a surface structure varied depending on where the shock absorber is disposed with respect to the shoe sole. For example, a shock absorber having a surface structure of a Schwarz' P structure may be disposed at a portion of the shoe sole, and a shock absorber having a surface structure of a gyroid structure may be disposed at another portion of the shoe sole.

Furthermore, while in the seventh to thirteenth embodiments and their variations described above, the present invention is applied to a shoe comprising a tongue and a shoelace by way of example, the present invention may be applied to a shoe without these components (such as a shoe comprising a sock-shaped upper) and a shoe sole comprised by the shoe.

Further, while in the seventh to thirteenth embodiments and their variations described above, a shock absorber according to the present invention is applied to a shoe sole of a shoe by way of example, the shock absorber according to the present invention is applicable to other shock absorbing applications. For example, the shock absorber according to the present invention can be used in various applications such as packaging materials, floor materials for buildings (for example, houses), surface materials for paving paths, surface materials for sofas and chairs, tires, and the like.

The characteristic configurations disclosed in the first to thirteenth embodiments and their variations can be combined with one another in a range that does not depart from the gist of the present invention.

Fourteenth Embodiment

Figure 41:
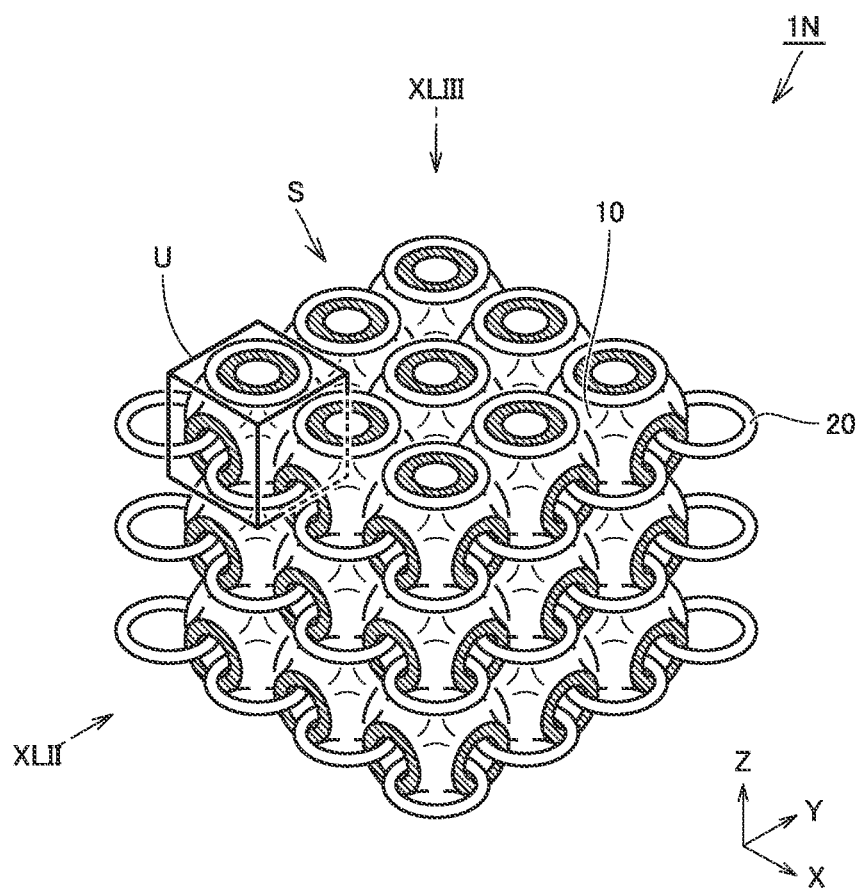
FIG. 41 is a partially cutaway perspective view of a shock absorber according to a fourteenth embodiment.
Figure 42:
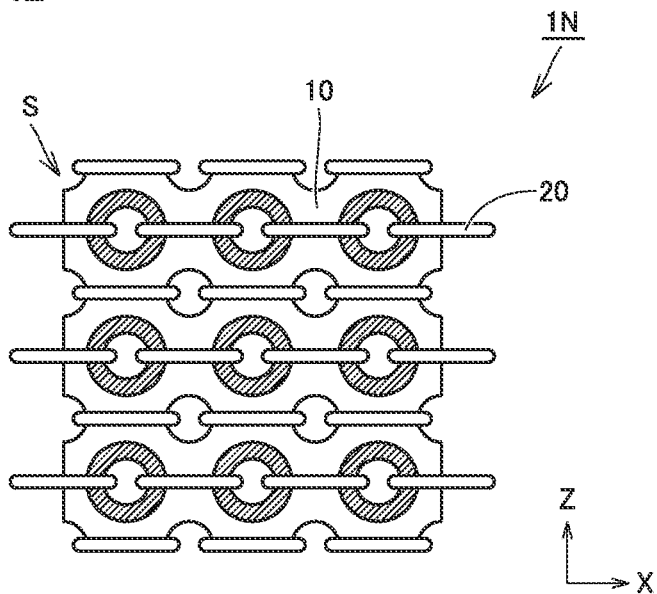
FIG. 42 is a front view of the shock absorber shown in FIG. 41.
Figure 43:
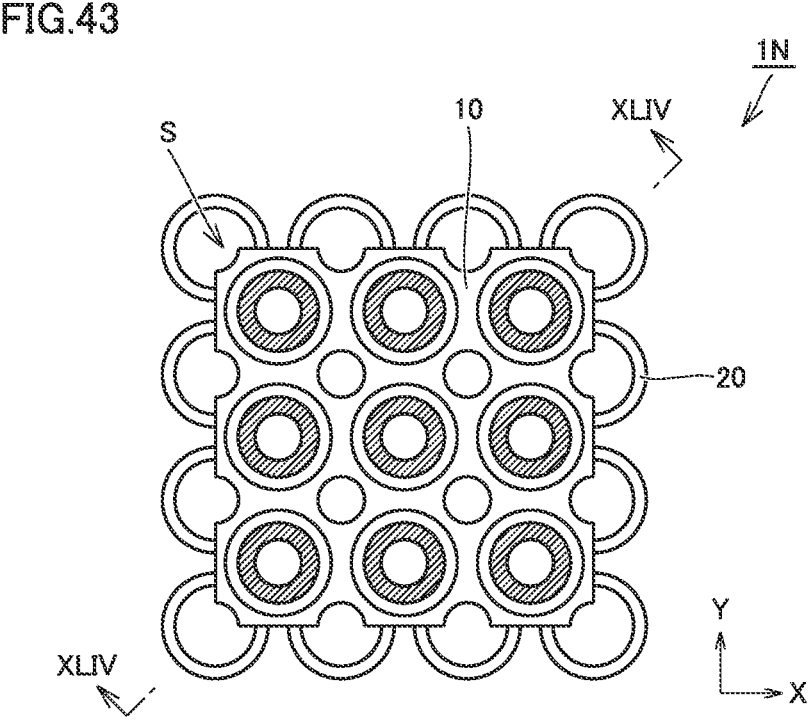
FIG. 43 is a plan view of the shock absorber shown in FIG. 41.
Figure 44:
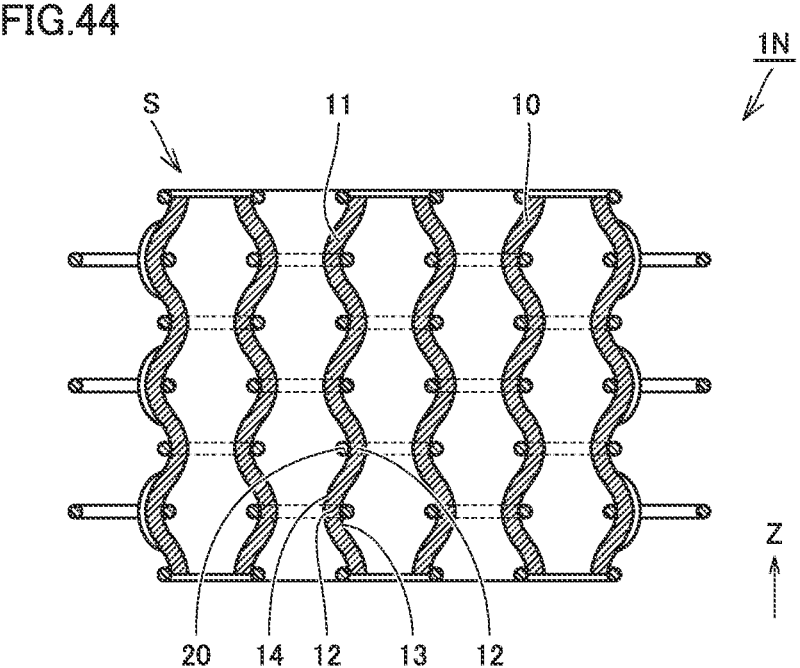
FIG. 44 is a cross section of the shock absorber shown in FIG. 41.

FIG. 41 is a partially cutaway perspective view of a shock absorber according to a fourteenth embodiment. FIG. 42 is a front view of the shock absorber as seen in a direction indicated by an arrow XLII shown in FIG. 41. FIG. 43 is a plan view of the shock absorber as seen in a direction indicated by an arrow XLIII shown in FIG. 41. FIG. 44 is a cross section of the shock absorber taken along a line XLIV-XLIV shown in FIG. 43. Hereinafter, a shock absorber 1N according to the present embodiment will be described with reference to FIGS. 41 to 44.

As shown in FIGS. 41 to 44, shock absorber 1N includes three-dimensional structure S having a plurality of unit structures U (see FIG. 41, in particular). The plurality of unit structures U each have a three-dimensional shape formed by wall 10 having an external shape defined by a pair of parallel curved surfaces.

Herein, in FIG. 41, in order to facilitate understanding, reference character U does not denote the unit structure in a strict sense; rather, it denotes a cuboidal unit space occupied by the unit structure.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIGS. 41 to 44 extract and show only three unit structures U adjacent to one another in each of the widthwise, depthwise and heightwise directions, with their exploded surfaces hatched.

While in the present embodiment, shock absorber 1N composed of a large number of unit structures U provided in each of the widthwise, depthwise and heightwise directions will be indicated as an example for the sake of illustration, how many unit structures U are repeated in the widthwise, depthwise and heightwise directions is not particularly limited, and two or more unit structures arranged in at least one of the three directions suffice.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1N has a structure in which a thickness is added to a geometrical surface structure. In shock absorber 1N according to the present embodiment, the surface structure is a Schwarz' P structure, which is a type of mathematically defined triply periodic minimal surface. Note that a minimal surface is defined as a curved surface of those having a given closed curve as a boundary that is minimal in area.

As shown in FIG. 44, three-dimensional structure S in which a thickness is added to a Schwarz' P structure has a meandering portion 11 which is a portion presenting a cross-sectional shape extending in a meandering manner when three-dimensional structure S is cut along a specific plane. In the present embodiment, the specific plane is a plane orthogonal to the plane of the sheet of FIG. 43 and parallel to the line XLIV-XLIV.

While there will be three types of meandering portions 11 in total in terms of the structure of three-dimensional structure S: one extending in the widthwise direction; one extending in the depthwise direction; and one extending in the heightwise direction, herein, meandering portion 11 which appears in the cross section shown in FIG. 44, that is, extends in the heightwise direction (i.e., the Z direction), is noted.

Meandering portion 11 extending in the heightwise direction has a plurality of turning points 12 located in the heightwise direction, and turning point 12 is provided with internal corner portion 13 and external corner portion 14. Of these portions, internal corner portion 13 is a portion which appears in the above cross-sectional shape to have a concave shape on a surface of wall 10, and external corner portion 14 is a portion which appears in the above cross-sectional shape to have a convex shape on a surface of wall 10.

Herein, a distance between meandering portion 11 extending in the heightwise direction and meandering portion 11 adjacent thereto varies depending on the location in the heightwise direction, and the distance periodically increases and decreases in the heightwise direction.

A portion of wall 10 having the distance with a minimal value is provided with a ring-shaped reinforcement portion 20 to sandwich turning points 12 of adjacent meandering portions 11. A plurality of ring-shaped reinforcement portions 20 provided in this manner are an additional member configured as a member discrete from wall 10, and each positioned to traverse internal corner portion 13 of turning point 12 described above.

In FIGS. 41 to 44, in order to facilitate understanding of the specific shape and arrangement position of the plurality of ring-shaped reinforcement portions 20, the plurality of reinforcement portions 20 are shown such that a portion thereof located outside a portion of three-dimensional structure S extracted to be shown in the figures (that is, only three unit structures U adjacent in the widthwise, depthwise and heightwise directions that are extracted and shown) is also shown in the figures without being exploded.

Herein, while shock absorber 1N may be manufactured in any method, it can be additively manufactured using a three dimensional additive manufacturing apparatus for example. When shock absorber 1N is additively manufactured using a three dimensional additive manufacturing apparatus, wall 10 and ring-shaped reinforcement portion 20 will be identical in material. Note, however, that when a three dimensional additive manufacturing apparatus of a fused deposition modelling (FDM) system is used, it is also possible to form wall 10 of a material and form ring-shaped reinforcement portion 20 of a different material.

While shock absorber 1N (that is, wall 10 and ring-shaped reinforcement portion 20) may basically be formed of any material having a large elastic force, it is preferably formed of a resin material or a rubber material. More specifically, when shock absorber 1N is formed of resin, shock absorber 1N can be formed for example of thermoplastic resin such as ethylene-vinyl acetate copolymer (EVA) or can be formed for example of thermosetting resin such as polyurethane (PU). When shock absorber 1N is formed of rubber, it can be formed for example of butadiene rubber.

Shock absorber 1N can be composed of a polymer composition. In that case, an example of a polymer to be contained in the polymer composition includes olefinic polymers such as olefinic elastomers and olefinic resins. Examples of the olefinic polymers include polyolefins such as polyethylene (e.g., linear low density polyethylene (LL-DPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), propylene-vinyl acetate copolymer, and the like.

The polymer may be an amide-based polymer such as an amide-based elastomer and an amide-based resin. Examples of the amide-based polymer include polyamide 6, polyamide 11, polyamide 12, polyamide 66, and polyamide 610. The polymer may be an ester-based polymer such as an ester-based elastomer and an ester-based resin. Examples of the ester-based polymer include polyethylene terephthalate and polybutylene terephthalate.

The polymer may be a urethane-based polymer such as a urethane-based elastomer and a urethane-based resin. Examples of the urethane-based polymer include polyester-based polyurethane and polyether-based polyurethane.

The polymer may be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), and acrylonitrile butadiene styrene resin (ABS).

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, polyvinyl chloride-based resins, silicone-based elastomers, butadiene rubber (BR), isoprene rubber (IR), chloroprene (CR), natural rubber (NR), styrene-butadiene rubber (SBR), acrylonitrile-butadiene rubber (NBR), butyl rubber (IIR), and the like.

Shock absorber 1N according to the present embodiment described above is configured to exhibit a shock absorbing function in the heightwise direction (that is, in a direction parallel to the axial direction of the plurality of ring-shaped reinforcement portions 20), and when an external force is applied in that direction, shock absorber 1N exhibits an excellent shock absorbing function and also presents excellent durability. This is significantly attributed to a structural feature (a feature in shape) of shock absorber 1N. Hereinafter, this point will be described in detail based on a result of a second verification test conducted by the present inventor.

Figure 45:
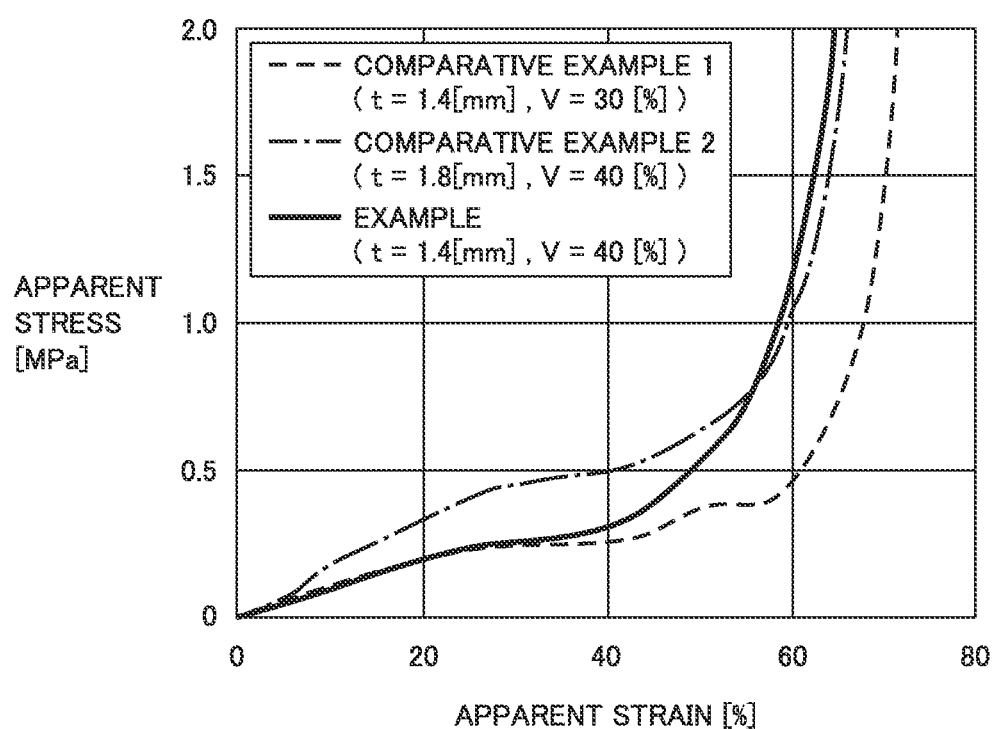
FIG. 45 is a graph showing a result of simulating the shock absorbing functions of the shock absorbers according to comparative examples 1 and 2 and an example.
Figure 47A:
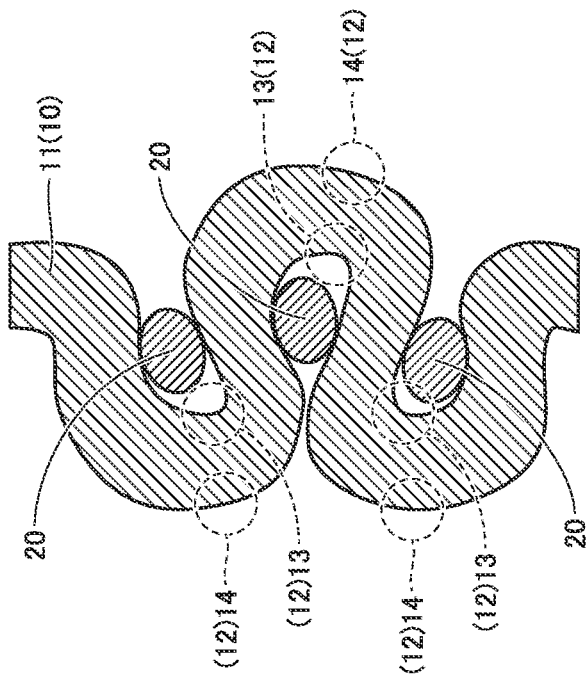
FIGS. 47A and 47B are enlarged views of FIGS. 46A4 and 46B4, respectively.
Figure 47B:
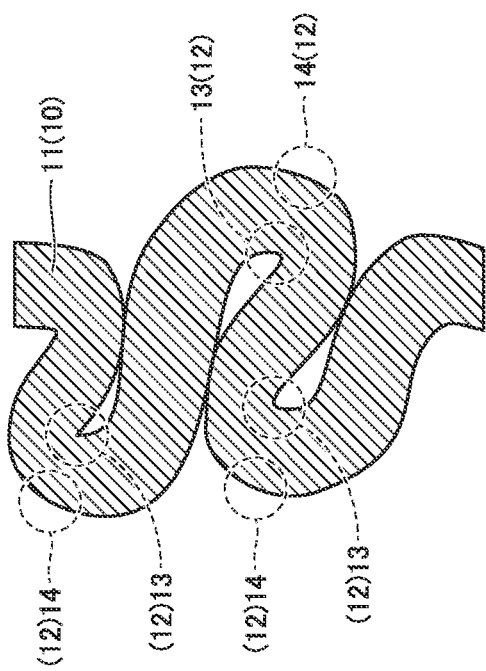

FIG. 45 is a graph showing a result of simulating the shock absorbing functions of the shock absorbers according to Comparative Examples 1 and 2 and an Example. FIG. 46A1 to FIG. 46A4 and FIG. 46B1 to FIG. 46B4 are schematic cross sections showing a difference between how the shock absorbers according to Comparative Examples 1 and 2 deform and how the shock absorber according to the Example deforms, as based on the result of the simulation. Herein, FIGS. 46A1 to 46A4 show how the shock absorbers according to Comparative Examples 1 and 2 deform when an external force applied thereto is gradually increased, and FIGS. 46B1 to 46B4 show how the shock absorber according to the Example deforms when an external force applied thereto is gradually increased. FIGS. 47A and 47B are enlarged views of FIGS. 46A4 and 46B4, respectively.

In the second verification test, models for the shock absorbers according to Comparative Examples 1 and 2 and the Example were specifically designed and a case in which these models received an external force in a prescribed direction was assumed, and how the models would behave in that case was simulated and their behaviors were individually analyzed. More specifically, for each model, a so-called stress-strain curve was obtained, and how each shock absorber varied in shape when it received the external force was verified.

Herein, the shock absorber according to the Example is exactly shock absorber 1N according to the present embodiment, and is composed of wall 10 and a plurality of ring-shaped reinforcement portions 20. In contrast, the shock absorbers according to Comparative Examples 1 and 2 are each shock absorber 1N according to the present embodiment minus the plurality of ring-shaped reinforcement portions 20 in structure, and composed of wall 10 alone.

Of these examples, the shock absorber according to the comparative example 1 includes unit structure U having widthwise, depthwise and heightwise dimensions each of 10 mm with wall 10 having a thickness t of 1.4 mm. This case provides a volume ratio V of about 30%.

The shock absorber according to the comparative example 2 includes unit structure U having widthwise, depthwise and heightwise dimensions each of 10 mm with wall 10 having a thickness t of 1.8 mm. This case provides a volume ratio V of about 40%.

In contrast, the shock absorber according to the Example includes unit structure U having widthwise, depthwise and heightwise dimensions each of 10 mm with wall 10 having a thickness t of 1.4 mm. This case provides a volume ratio V larger by an amount corresponding to the plurality of ring-shaped reinforcement portions 20 than Comparative Example 1, and it is equivalent to Comparative Example 2, i.e., about 40%.

The shock absorbers according to Comparative Examples 1 and 2 and the Example received external force in the heightwise direction (that is, for the shock absorber according to the Example, it is a direction parallel to the axial direction of the plurality of ring-shaped reinforcement portions 20). It was assumed that the shock absorbers according to Comparative Examples 1 and 2 and the Example were all formed of a urethane-based acrylic polymer.

Referring to FIG. 45, as can be seen from comparing the shock absorber according to Comparative Example 1 and the shock absorber according to Comparative Example 2, the shock absorber composed wall 10 alone can be changed in compressive stiffness by changing thickness t of wall 10. Specifically, the larger wall 10 is in thickness t, the larger the shock absorber is in compressive stiffness, and the smaller wall 10 is in thickness t, the smaller the shock absorber is in compressive stiffness.

However, when wall 10 is changed in thickness t, volume ratio V will also increase accordingly, so that the larger wall 10 is in thickness t, the larger volume ratio V is, resulting in the shock absorber being heavier, and the smaller wall 10 is in thickness t, the smaller volume ratio V is, resulting in the shock absorber being lighter. That is, there is a so-called trade-off relationship between ensuring compressive stiffness and reducing weight.

Herein, as shown in FIGS. 46A1 to 46A4, as shock absorbers 1X according to Comparative Examples 1 and 2 receive larger external force in the heightwise direction (that is, the Z direction) increases, they have a particularly large deformation at turning point 12 of meandering portion 11 originally having a curved cross-sectional shape. The deformation at turning point 12 becomes significant as the external force increases, and finally, meandering portion 11 collapses in the heightwise direction and walls 10 come into contact with each other.

When walls 10 come into contact with each other, as shown in FIG. 47A, turning point 12 at internal corner portion 13 will experience a large compressive stress in a vicinity of a surface of wall 10, and turning point 12 at external corner portion 14 will experience a large tensile stress in a vicinity of a surface of wall 10. In other words, a stress concentration will be locally generated in a vicinity of turning point 12, in particular. This local stress concentration will lead to breakage of shock absorber 1X at that portion, and as a result, it will be difficult to expect high durability in shock absorber 1X.

As shown in FIGS. 46B1 to 46B4, as shock absorber 1N according to the Example receives larger external force in the heightwise direction (that is, the Z direction), it also has a large deformation particularly at turning point 12 of meandering portion 11 originally having a curved cross-sectional shape. The deformation at turning point 12 increases as the external force increases. Once the deformation has progressed to some extent, however, further deformation is suppressed.

That is, as shown in FIG. 47B, once turning point 12 has been deformed to some extent, internal corner portion 13 will have a surface brought into contact with ring-shaped reinforcement portion 20 disposed along internal corner portion 13 of turning point 12. That is, ring-shaped reinforcement portion 20 is sandwiched by wall 10 generally in the heightwise direction.

This physically prevents further deformation of turning point 12, and accordingly disperses stress to a portion of meandering portion 11 other than turning point 12. Accordingly, meandering portion 11 will be disposed so as to threading through the plurality of ring-shaped reinforcement portions 20, which can alleviate a stress concentration caused at internal corner portion 13 and external corner portion 14 of turning point 12.

According to the result of the second verification test described above, it can be seen that shock absorber 1N according to the Example can exhibit a high shock absorbing function and also exhibit high durability when shock absorber 1N receives an external force in the heightwise direction (that is, a direction parallel to the axial direction of the plurality of ring-shaped reinforcement portions 20).

Shock absorber 1N according to the present embodiment described above can thus be a shock absorber which has an excellent shock absorbing function and is also excellent in durability, and can be used for various applications.

(Eleventh and Twelfth Variations)

Figure 48A:
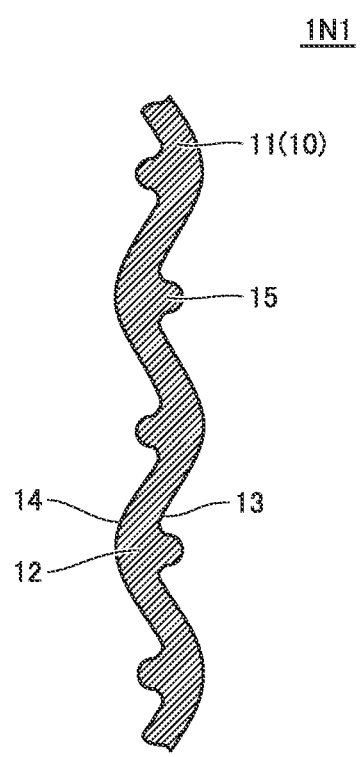
FIGS. 48A and 48B are schematic cross sections showing the shapes of main portions of shock absorbers according to eleventh and twelfth variations, respectively.
Figure 48B:
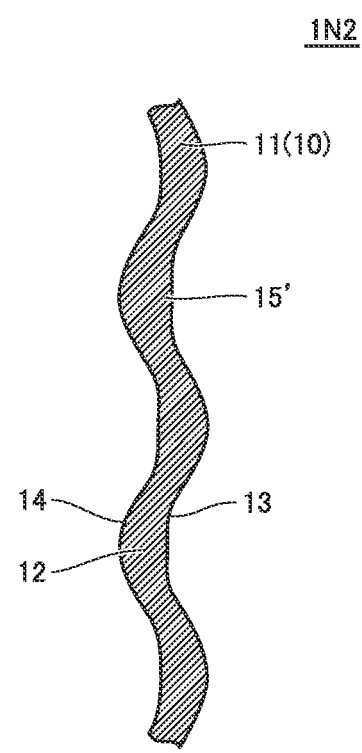

FIGS. 48A and 48B are schematic cross sections showing the shapes of main portions of shock absorbers according to eleventh and twelfth variations, respectively. Hereinafter, shock absorbers 1N1 and 1N2 according to the eleventh and twelfth variations based on the fourteenth embodiment will be described with reference to FIGS. 48A and 48B.

As shown in FIG. 48A, shock absorber 1N1 according to the eleventh variation does not have the plurality of ring-shaped reinforcement portions 20 that shock absorber 1N according to the fourteenth embodiment has, and instead has a plurality of additional thickness portions 15 at prescribed positions on wall 10. The plurality of additional thickness portions 15 are each provided in the form of a protrusion at internal corner portion 13 of turning point 12 of meandering portion 11. The plurality of additional thickness portions 15 also each extend across internal corner portion 13.

Additional thickness portion 15 is provided to allow turning point 12 to be larger in thickness than another portion, and constitutes a reinforcement portion in place of ring-shaped reinforcement portion 20 in the fourteenth embodiment. When additional thickness portion 15 is provided, and an external force is applied and once turning point 12 has been deformed thereby to some extent, additional thickness portion 15 will physically prevent further deformation of turning point 12, and can thus suppress stress concentration caused at turning point 12.

As shown in FIG. 48B, shock absorber 1N2 according to the twelfth variation does not have the plurality of ring-shaped reinforcement portions 20 that shock absorber 1N according to the fourteenth embodiment has, and instead has a plurality of additional thickness portions 15' at prescribed positions on wall 10. The plurality of additional thickness portions 15' are different from additional thickness portion 15 that shock absorber 1N1 has, as described above, that is, each not in the form of a protrusion, and instead provided to fill internal corner portion 13 of turning point 12 of meandering portion 11. The plurality of additional thickness portions 15' also each extend across internal corner portion 13.

Additional thickness portion 15' is provided to allow turning point 12 to be larger in thickness than another portion, and constitutes a reinforcement portion in place of ring-shaped reinforcement portion 20 in the fourteenth embodiment. When additional thickness portion 15' is provided, and an external force is applied and once turning point 12 has been deformed thereby to some extent, additional thickness portion 15' will physically prevent further deformation of turning point 12, and can thus suppress stress concentration caused at turning point 12.

Thus shock absorbers 1N1 and 1N2 according to the eleventh and twelfth variations can each also be a shock absorber which has an excellent shock absorbing function and is also excellent in durability, and can be used for various applications, as well as shock absorber 1N according to the fourteenth embodiment.

Fifteenth Embodiment

Figure 49:
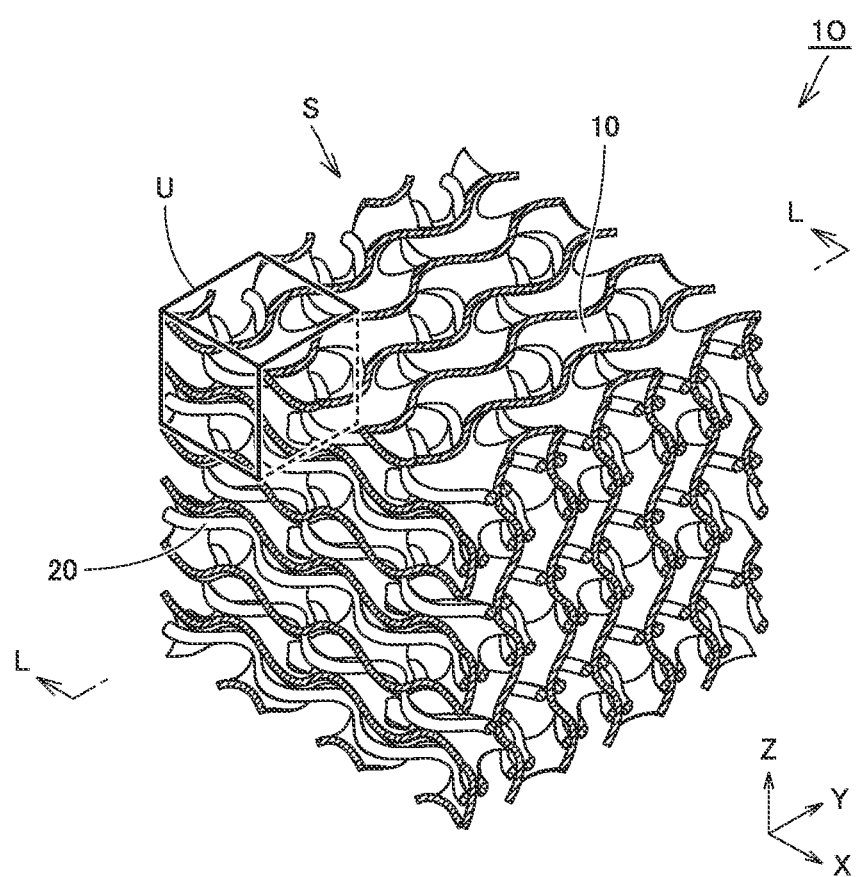
FIG. 49 is a partially cutaway perspective view of a shock absorber according to a fifteenth embodiment.
Figure 50:
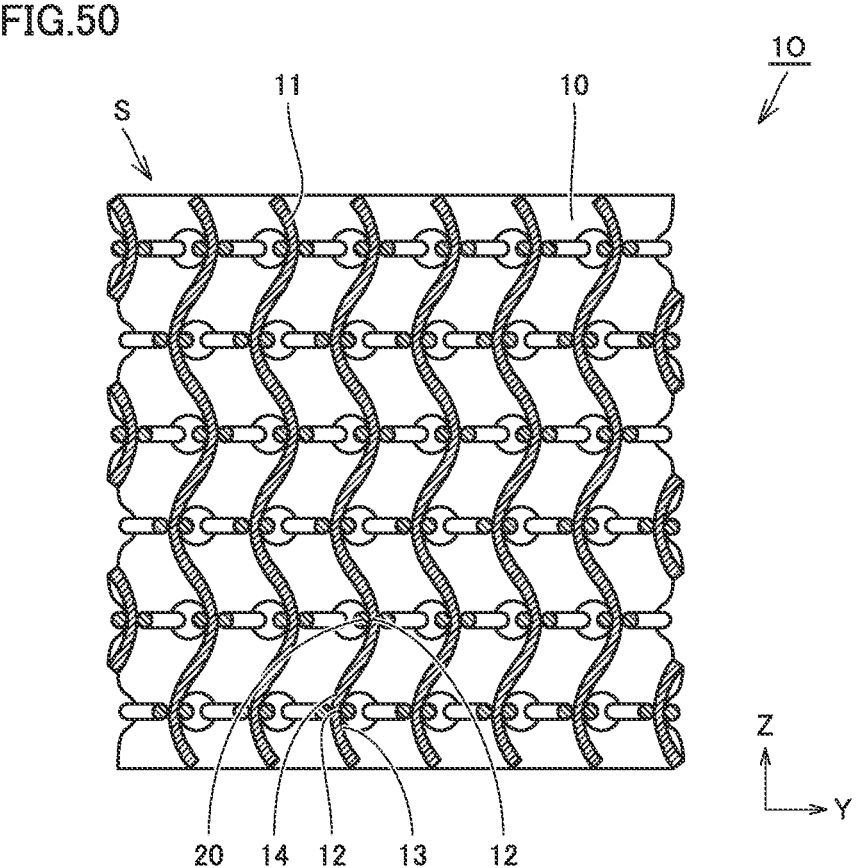
FIG. 50 is a cross section of the shock absorber shown in FIG. 49.

FIG. 49 is a partially cutaway perspective view of a shock absorber according to a fifteenth embodiment. FIG. 50 is a cross section of the shock absorber taken along a line L-L shown in FIG. 49. A shock absorber 1O according to the present embodiment will be described below with reference to FIGS. 49 and 50.

As shown in FIGS. 49 to 50, shock absorber 1O includes three-dimensional structure S having a plurality of unit structures U (see FIG. 49, in particular). The plurality of unit structures U each have a three-dimensional shape formed by wall 10 having an external shape defined by a pair of parallel curved surfaces.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIGS. 49 to 50 extract and show only three unit structures U adjacent to one another in each of the widthwise, depthwise and heightwise directions, with their exploded surfaces hatched.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1O has a structure in which a thickness is added to a geometrical surface structure. In shock absorber 1O according to the present embodiment, the surface structure is a gyroid structure, which is a type of mathematically defined triply periodic minimal surface.

As shown in FIG. 50, three-dimensional structure S that is a gyroid structure with a thickness added thereto has meandering portion 11 which is a portion presenting a cross-sectional shape extending in a meandering manner when three-dimensional structure S is cut along a specific plane. In the present embodiment, the specific plane is the YZ plane.

While there will be three types of meandering portions 11 in total in terms of the structure of three-dimensional structure S: one extending in the widthwise direction; one extending in the depthwise direction; and one extending in the heightwise direction, herein, meandering portion 11 which appears in the cross section shown in FIG. 50, that is, extends in the heightwise direction (i.e., the Z direction), is noted.

Meandering portion 11 extending in the heightwise direction has a plurality of turning points 12 located in the heightwise direction, and turning point 12 is provided with internal corner portion 13 and external corner portion 14. Of these portions, internal corner portion 13 is a portion which appears in the above cross-sectional shape to have a concave shape on a surface of wall 10, and external corner portion 14 is a portion which appears in the above cross-sectional shape to have a convex shape on a surface of wall 10. Herein, meandering portion 11 extending in the heightwise direction is located to have a fixed distance to an adjacent meandering portion.

Reinforcement portion 20 is provided at a position corresponding to internal corner portion 13 of meandering portion 11. Reinforcement portion 20 is disposed in a meandering manner along a meandering portion extending in the widthwise direction (that is, the X direction) that is a meandering portion different from meandering portion 11 extending in the heightwise direction, and meandering reinforcement portion 20 extends to traverse a plurality of internal corner portions 13 located in the widthwise direction.

Shock absorber 1O according to the present embodiment configured as described above is also structured to have meandering reinforcement portion 20 disposed to traverse internal corner portion 13 of turning point 12 of meandering portion 11 that is a portion at which a stress concentration occurs, as described above, and shock absorber JO can alleviate the stress concentration that may occur at turning point 12 by meandering reinforcement portion 20, and as a result can be a shock absorber having an excellent shock absorbing function and also having excellent durability.

Related Embodiment

Figure 51:
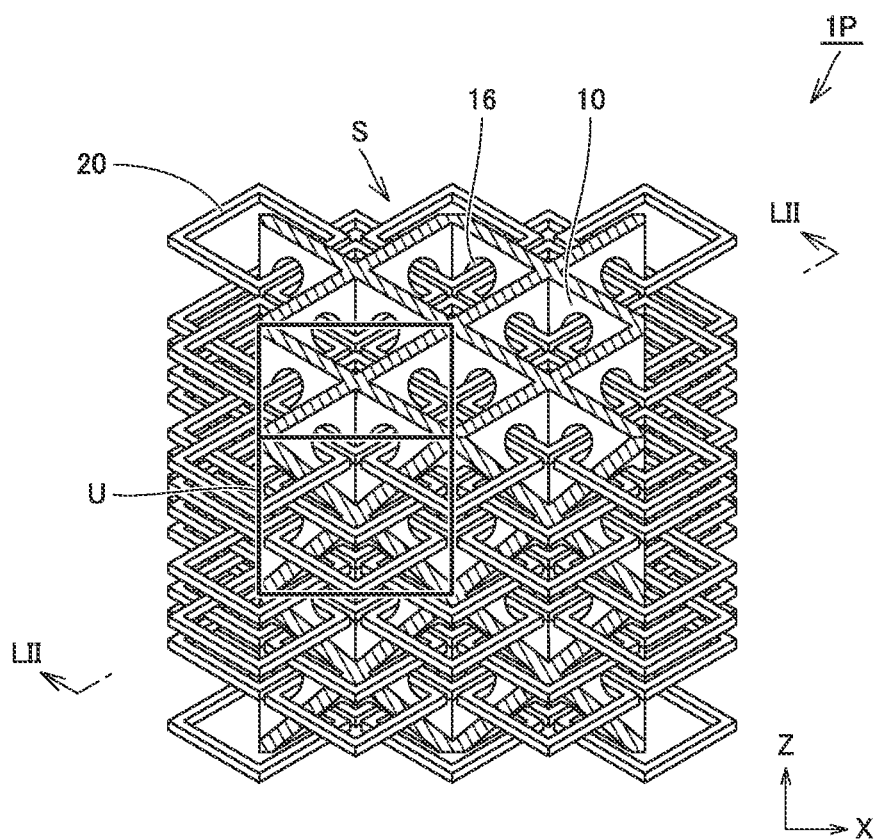
FIG. 51 is a partially cutaway perspective view of a shock absorber according to a related embodiment.
Figure 52:
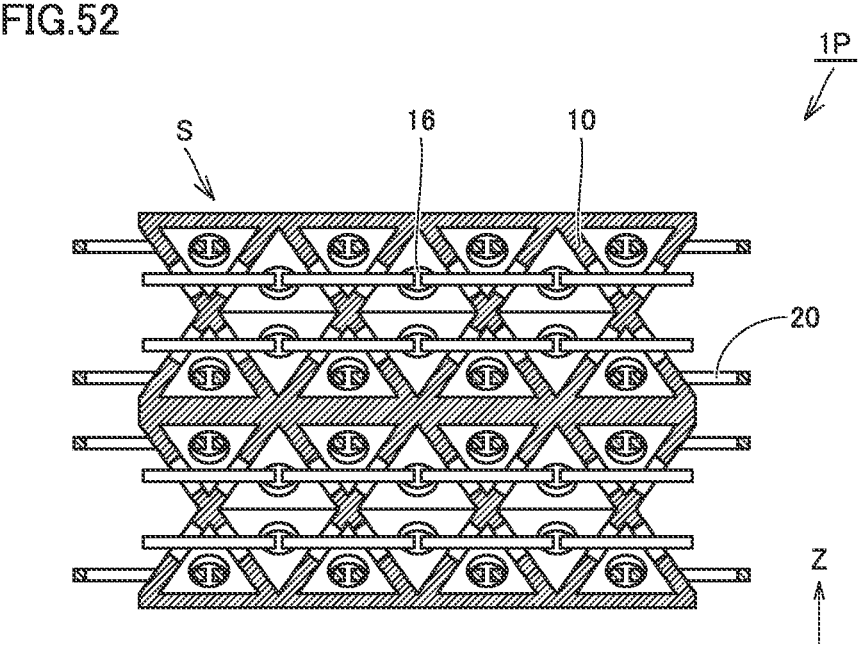
FIG. 52 is a cross section of the shock absorber shown in FIG. 51.

FIG. 51 is a partially cutaway perspective view of a shock absorber according to a related embodiment. FIG. 52 is a cross section of the shock absorber taken along a line LII-LII shown in FIG. 51. Hereinafter, a shock absorber 1P according to the related embodiment will be described with reference to FIGS. 51 and 52.

As shown in FIGS. 51 to 52, shock absorber 1P includes three-dimensional structure S having a plurality of unit structures U (see FIG. 51, in particular). The plurality of unit structures U each have a three-dimensional shape formed by wall 10 having an external shape defined by a pair of parallel planes.

The plurality of unit structures U are repeatedly, regularly and continuously arranged in each of the widthwise direction (the X direction indicated in the figure), the depthwise direction (a direction intersecting the plane of the sheet of the figure), and the heightwise direction (the Z direction indicated in the figure). FIGS. 51 and 52 extract and show only two unit structures U adjacent to each other in each of the widthwise, depthwise and heightwise directions, with their exploded surfaces hatched. Note that In FIG. 51, the Y direction, which is the depthwise direction, extends in a direction intersecting the plane of the sheet of the figure, as has been set forth above, and, for notation, would overlap a coordinate axis representing the Z direction, and accordingly, a coordinate axis representing it is not shown.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1P has a structure in which a thickness is added to a geometrical surface structure. In shock absorber 1P according to the present embodiment, the surface structure is an octet structure, which is a type of a polyhedron having a cavity therein.

Shock absorber 1P according to the present related embodiment is additively manufactured using a three-dimensional additive manufacturing apparatus. When shock absorber 1P is thus manufactured, shock absorber 1P cannot have its internal cavity completely closed by wall 10 for some manufacturing reason. Therefore, a through hole 16 will be formed at a prescribed position of each of a plurality of walls 10. Wall 10 in a vicinity of the portion provided with through hole 16 is more fragile than another portion of wall 10, and will hence be a portion significantly deformable and prone to stress concentration when external force is received.

Accordingly, shock absorber 1P according to the present related embodiment is provided with ring-shaped reinforcement portion 20 to pass through adjacent through holes 16 to thereby suppress stress concentration. That is, when ring-shaped reinforcement portion 20 is inserted through through hole 16, and an external force is applied in the heightwise direction, and once wall 10 in a vicinity of the portion provided with through hole 16 has been deformed thereby to some extent, ring-shaped reinforcement portion 20 will come into contact with wall 10 at a portion defining through hole 16 and physically prevent further deformation of wall 10. Stress concentration in wall 10 in the vicinity of the portion provided with through hole 16 can thus be suppressed.

Thus shock absorber 1P according to the present related embodiment will also be able to suppress by reinforcement portion 20 stress concentration caused at a specific portion of wall 10, and as a result, can be a shock absorber having an excellent shock absorbing function and also having excellent durability.

In FIGS. 51 to 52, in order to facilitate understanding of the specific shape and arrangement position of the plurality of ring-shaped reinforcement portions 20, the plurality of reinforcement portions 20 are shown such that a portion thereof located outside a portion of three-dimensional structure S extracted to be shown in the FIGS. (that is, only two unit structures U adjacent in the widthwise, depthwise and heightwise directions that are extracted and shown) is also shown in the figures without being exploded.

Sixteenth Embodiment

Figure 53:
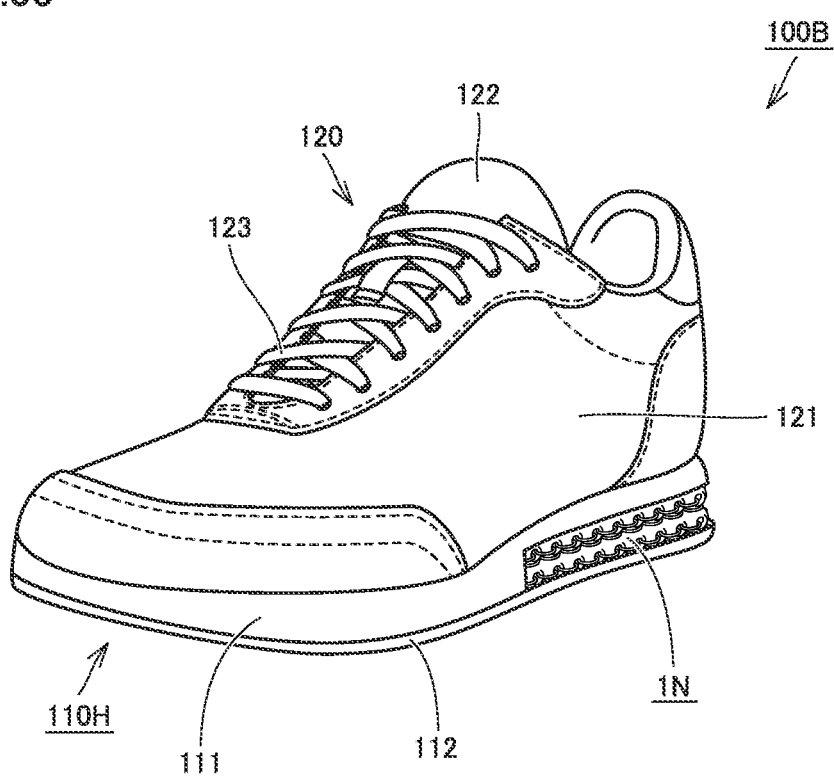
FIG. 53 is a perspective view of a shoe sole according to a sixteenth embodiment and a shoe comprising the shoe sole.
Figure 54:
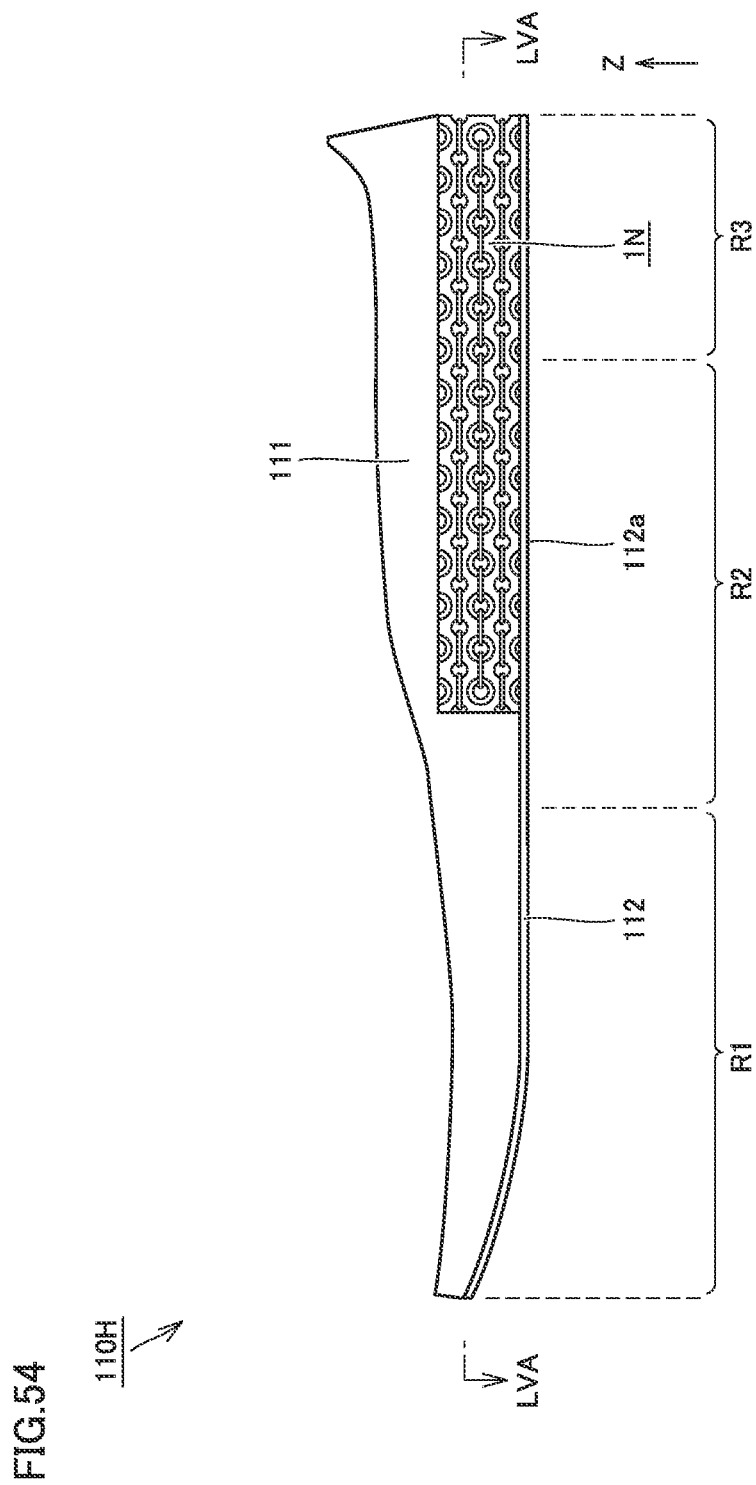
FIG. 54 is a side view of the shoe sole shown in FIG. 53.
Figure 55A:
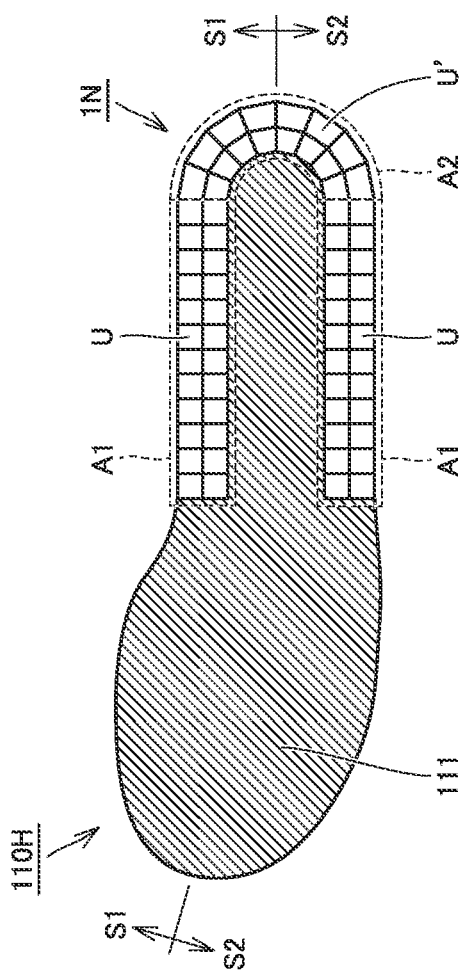
FIGS. 55A to 55E schematically show an example of how the shock absorber is arranged in the shoe sole shown in FIG. 53.

FIG. 53 is a perspective view of a shoe sole and a shoe comprised by the shoe sole according to a sixteenth embodiment, and FIG. 54 is a side view of the shoe sole shown in FIG. 53. FIGS. 55A to 55E schematically show an example of how a shock absorber is arranged in the shoe sole shown in FIG. 53. Herein, FIG. 55A is a schematic cross section of the shoe sole taken along a line LVA-LVA shown in FIG. 54. Hereinafter, a shoe sole 110H and a shoe 100B including shoe sole 110H according to the present embodiment will be described with reference to FIGS. 53, 54, and 55A to 55E. Shoe sole 110H according to the present embodiment includes shock absorber 1N according to the fourteenth embodiment.

As shown in FIG. 53, shoe 100B includes shoe sole 110H and upper 120. Shoe sole 110H is a member that covers the sole of a foot and has a generally flat shape. Upper 120 has a shape that at least covers the entirety of a portion on the side of the bridge of a foot inserted in the shoe, and is located above shoe sole 110H.

Upper 120 includes upper body 121, tongue 122, and shoelace 123. Of these, tongue 122 and shoelace 123 are both fixed to or attached to upper body 121.

Upper body 121 has an upper portion provided with an upper opening for exposing an upper portion of an ankle and a portion of the bridge of a foot. Upper body 121 has a lower portion provided with a lower opening covered with shoe sole 110H as an example and has a lower end French-seamed or the like to form a bottom portion as another example.

Tongue 122 is fixed to upper body 121 by sewing, welding, bonding, or a combination thereof so as to cover a portion of the upper opening provided in upper body 121 that exposes a portion of the bridge of a foot. For upper body 121 and tongue 122, woven fabric, knitted fabric, nonwoven fabric, synthetic leather, resin, or the like is used for example, and for a shoe required to be air permeable and lightweight, in particular, a double raschel warp knitted fabric with a polyester yarn knitted therein is used.

Shoelace 123 is composed of a member in the form of a string for drawing portions of a peripheral edge of the upper opening provided to upper body 121 and exposing a portion of the bridge of a foot together in the direction of the width of the foot, and shoelace 123 is passed through a plurality of hole provided through the peripheral edge of the upper opening. When a foot is inserted in upper body 121 and shoelace 123 is tightened, upper body 121 can be brought into close contact with the foot.

As shown in FIGS. 53 to 55, shoe sole 110H includes midsole 111, outsole 112, and shock absorber 1N. Midsole 111 is located on top of shoe sole 110H and joined to upper 120. Outsole 112 has a lower surface with tread 112a (see FIG. 54), and is located at a lower portion of shoe sole 110H. Shock absorber 1N is interposed at a prescribed position between midsole 111 and outsole 112.

Midsole 111 preferably has an appropriate strength and also excellently absorbs shock, and from this viewpoint, midsole 111 can for example be a foam material made of resin or rubber, and particularly suitably a foam material made of a thermoplastic resin such as ethylene-vinyl acetate copolymer (EVA), a thermosetting resin such as polyurethane (PU), butadiene rubber, or the like.

Outsole 112 preferably provides excellent wear resistance and excellent grip, and from this viewpoint, outsole 112 can be made of rubber, for example. A tread pattern may be provided on the lower surface of outsole 112, or tread 112a, from the viewpoint of providing enhanced grip.

As shown in FIG. 54, in a fore-aft direction representing a longitudinal direction in a plan view (a lateral direction in the figure), shoe sole 110H is divided into front foot portion R1 supporting the toes and ball of a foot, middle foot portion R2 supporting the arch of the foot, and rear foot portion R3 supporting the heel of the foot. Further, as shown in FIG. 55A, in the direction of the width of the foot, which is a direction intersecting with the longitudinal direction in the plan view, shoe sole 110H is divided into a portion on a medial foot side representing a medial side of the foot in anatomical position (that is, a side closer to the median) (i.e., a portion on side S1 in the figure) and a portion on a lateral foot side representing a lateral side of the foot in anatomical position (that is, a side farther from the median) (i.e., a portion on side S2 in the figure).

Herein, shoe 100B according to the present embodiment has midsole 111 with a notch having a prescribed shape, and shock absorber 1N is accommodated in the notch and thus sandwiched and thus fixed between midsole 111 and outsole 112 in the direction of the thickness of shoe sole 110H.

More specifically, as shown in FIGS. 54 and 55A, midsole 111 is provided with a notch generally in the form of the letter U in a plan view across middle foot portion R2 and rear foot portion R3 along a peripheral edge of shoe sole 110H, and shock absorber 1N formed generally in the form of the letter U in a plan view is disposed to fill the notch. More specifically, shock absorber 1N is disposed along an edge of middle foot portion R2 on the medial foot side, an edge of rear foot portion R3 on the medial foot side, a rear edge of rear foot portion R3, an edge of rear foot portion R3 on the lateral foot side, and an edge of middle foot portion R2 on the lateral foot side.

While shock absorber 1N is not particularly limited to any particular material, as has been described in the fourteenth embodiment, it can be formed for example of a resin material or a rubber material, and particularly suitably composed of a thermoplastic resin such as ethylene-vinyl acetate copolymer (EVA), a thermosetting resin such as polyurethane (PU), butadiene rubber or the like. It can also be a polymer composition such as an olefin-based polymer, an amide-based polymer, an ester-based polymer, a urethane-based polymer, a styrene-based polymer, an acrylic polymer or the like.

Herein, as shown in FIG. 54, shock absorber 1N is disposed such that its heightwise direction (that is, a direction parallel to the axial direction of the plurality of ring-shaped reinforcement portions 20, in other words, the Z direction in the figure, in which meandering portion 11 extends (see FIGS. 41 to 44 for example)) is orthogonal to tread 112a of shoe sole 110H. With this configuration, a load exerted to shoe sole 110H from the sole of a foot and the ground when landing will be absorbed as shock absorber 1N deforms with large deformability, and a load exerted from shoe sole 110H to the sole of the foot is reduced and a high shock absorbing function can thus be obtained.

Although not specifically described herein, shock absorber 1N suppresses stress concentration as the shock absorber has the plurality of ring-shaped reinforcement portions 20 as described above, and the shock absorber thus suppresses breakage caused by such stress concentration, and thus ensures more durability than conventional.

Shoe sole 110H and shoe 100B comprising shoe sole 110H according to the present embodiment can thus have an excellent shock absorbing function and also have excellent durability.

While shock absorber 1N may have a plurality of mutually independent members combined together and mutually bonded together or the like to be generally formed generally in the form of the letter U in a plan view as has been described above, more preferably, it has its entirety configured as a one-piece member to be formed generally in the form of the letter U in a plan view as has been described above. When the latter configuration is adopted, in particular, it is important how shock absorber 1N including a plurality of cuboidal unit structures U is laid out for a non-cuboidal notch while eliminating an unnecessary imbalance of a shock absorbing function in each portion.

Hereinafter, with reference to FIGS. 55A to 55E, a specific designing method will be described which allows a shock absorber comprising a plurality of unit structures U each occupying a cubic unit space to be laid out in a non-cubic region while eliminating an unnecessary imbalance of a shock absorbing function in each portion simply by changing some or all of the plurality of unit structures U slightly, rather than significantly, in shape.

Initially, as shown in FIG. 55A, a region in which the shock absorber is disposed is divided into area A1 in which unit structures U can be disposed as they are as they are increased/decreased in number in at least one of the widthwise, depthwise and heightwise directions while they are adjusted in size, and area A2 in which it is difficult to do so. Specifically, in the present embodiment, of a region in which shock absorber 1N is disposed, an area extending linearly along a peripheral edge of shoe sole 110H on the medial and lateral foot sides corresponds to area A1, and an area extending in a curve along a peripheral edge of shoe sole 110H on the side of the rear end corresponds to area A2.

Figure 55B:
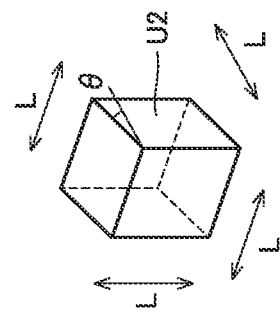

Herein, in area A1, as shown in FIG. 55B, a plurality of unit structures U each occupying a unit space in the form of a cube having one side adjusted to have a length L are disposed to be adjacent to one another, for the sake of illustration. Thus, area A1 has a plurality of unit structures U adjusted in size laid therein without a gap therebetween.

Figure 55C:
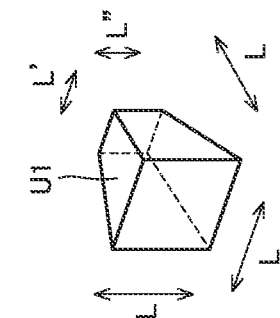

In area A2, a plurality of unit structures U' are disposed to be adjacent to one another, each unit structure U' being configured to occupy a unit space changed in shape to have three pairs of opposite surfaces with a specific one pair having its surfaces non-parallel to each other, as shown in FIG. 55C, for the sake of illustration. Herein, unit structure U' is for example what has been changed in shape to occupy a unit space adjusted so that those four sides of the unit space which extend in the widthwise direction have a pair of adjacent sides with a length L' slightly shorter than length L of the other sides. Such a slight change in shape does not significantly change the unit structure's shock absorbing function.

Unit structures U' thus shaped can be individually adjusted in size and orientation and disposed side by side to be laid substantially without a gap along area A2 that extends in a curve as described above. Thus simply by such a slight change in shape, area A2 also comes to exhibit a shock absorbing function equivalent to that of area A1 described above.

Thus such a designing method can be adopted to allow a shock absorber comprising a plurality of unit structures U each occupying a cubic unit space to be laid out in a non-cubic region while eliminating an unnecessary imbalance of a shock absorbing function in each portion simply by changing some or all of the plurality of unit structures U slightly, rather than significantly, in shape.

Therefore, when this designing method is employed to design a shock absorber, and based thereon, three dimensional additive manufacturing apparatus is employed to manufacture the shock absorber, the shock absorber can be easily obtained as a one-piece member with a variable external shape.

Figure 55D:
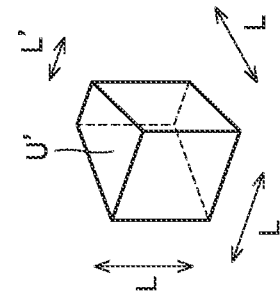

In the designing method described above, when a shock absorber is laid in a more complicated curved area, a plurality of unit structures U1 may be disposed to be adjacent to one another, unit structure U1 being configured to occupy a unit space changed in shape to have three pairs of opposite surfaces with specific two pairs thereof each having its surfaces non-parallel to each other, as shown in FIG. 55D.

Herein, unit structure U1 is for example what has been changed in shape to occupy a unit space adjusted for example so that those four sides of the unit space which extend in the widthwise direction have a pair of adjacent sides with length L' slightly shorter than length L of the other sides and, together therewith, furthermore, for example so that those four sides of the unit space which extend in the heightwise direction have a pair of adjacent sides with a length L" slightly shorter than length L of the other sides. Such a slight change in shape does not significantly change the unit structure's shock absorbing function.

Unit structures U1 thus shaped can be individually adjusted in size and orientation and disposed side by side to be laid substantially without a gap along the above described, complicated curved area. Thus simply by such a slight change in shape, the area also comes to exhibit a shock absorbing function equivalent to that of area A1 described above.

Figure 55E:
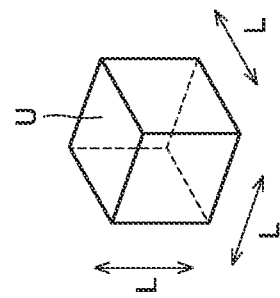

Further, in the designing method described above, when a shock absorber is laid in a linearly extending area, then, in place of unit structure U as shown in FIG. 55B, a plurality of unit structures U2 each as shown in FIG. 55E may be disposed to be adjacent to one another. Herein, unit structure U2 is for example what has been changed in shape to occupy a unit space adjusted to have three pairs of opposite surfaces parallel to each other, with a specific one pair having its surfaces each in the form of a parallelogram.

Note that unit structure U2 as shown for example has a pair of surfaces that is located in the heightwise direction inclined in the widthwise direction by an angle θ to be in the form of a parallelogram. Such a slight change in shape does not significantly change the unit structure's shock absorbing function. Thus, unit structures U2 can also be laid to allow a shock absorber to be laid out without a gap while eliminating an unnecessary imbalance of the shock absorbing function for each portion.

Summary of Disclosure in Embodiments

The fourteenth to sixteenth embodiments and their variations disclose characteristic configurations, as summarized below:

A shock absorber according to an aspect of the present disclosure includes a three-dimensional structure composed of a unit structure repeatedly, regularly and continuously arranged in at least one direction, the unit structure being a three-dimensional shape formed by a wall having an external shape defined by a pair of curved surfaces. The three-dimensional structure is composed of a triply periodic minimal surface with a thickness added thereto, and has a meandering portion which is a portion presenting a cross-sectional shape extending in a meandering manner when the three-dimensional structure is cut along at least a specific plane. The shock absorber according to an aspect of the present disclosure includes a reinforcement portion to reinforce a turning point of the meandering portion.

In the shock absorber according to an aspect of the present disclosure, the reinforcement portion may be composed of an additional member disposed to traverse an internal corner portion of the turning point.

In the shock absorber according to an aspect of the present disclosure, the reinforcement portion may be configured by an additional thickness portion provided at the internal corner portion of the turning point to make the turning point larger in thickness than another portion.

In the shock absorber according to an aspect of the present disclosure, the three-dimensional structure may have a Schwarz' P structure or a gyroid structure.

The shock absorber according to an aspect of the present disclosure may be formed of either a resin material or a rubber material.

The shock absorber according to an aspect of the present disclosure may be composed of a polymer composition containing at least one selected from the group consisting of an olefin-based polymer, an amide-based polymer, an ester-based polymer, a urethane-based polymer, a styrene-based polymer, an acrylic polymer, and a methacrylic polymer.

A shoe sole according to an aspect of the present disclosure comprises the shock absorber according to an aspect of the present disclosure as described above.

In the shoe sole according to an aspect of the present disclosure, the shock absorber may be disposed such that the meandering portion extends in a direction orthogonal to a tread.

A shoe according to an aspect of the present disclosure comprises the shoe sole according to an aspect of the present disclosure described above, and an upper provided above the shoe sole.

The configuration as above can provide a shock absorber which has an excellent shock absorbing function and is also excellent in durability, and can be used in various applications, a shoe sole comprising the shock absorber, and a shoe comprising the shoe sole.

Other Embodiments

While in the fourteenth embodiment a shock absorber includes a three-dimensional structure having a surface structure that is a Schwarz' P structure that is a type of triply periodic minimal surface by way of example, the surface structure may be a Schwarz' D structure.

Furthermore, while in the fourteenth embodiment a shock absorber configured with a reinforcement portion composed of an additional member composed of a member discrete from a meandering portion has been described by way of example and in the eleventh and twelfth variations a shock absorber formed such that a meandering portion has an internal corner portion provided with an additional thickness portion to intentionally provide a reinforcement portion integrated with the meandering portion has been described by way of example, the shock absorber may not necessarily be one of these. That is, in manufacturing the shock absorber, these may be integrated together at a portion or throughout the entirety unintentionally or may be configured as a discrete member at a portion or throughout the entirety unintentionally.

Further, while in the sixteenth embodiment the shock absorber according to the fourteenth embodiment is applied to a shoe sole and a shoe comprising the shoe sole by way of example, alternatively, the shock absorber according to the fifteenth embodiment or the shock absorber according to the related embodiment or alternatively the shock absorbers according to the eleventh and twelfth variations based on the fourteenth embodiment may be applied to a shoe sole and a shoe comprising the shoe sole.

Furthermore, while in the sixteenth embodiment a shock absorber is disposed along a peripheral edge of a shoe sole at a middle foot portion and a rear side portion by way of example, where the shock absorber is provided is not limited thereto and is variable as appropriate. For example, the shock absorber may be provided on the entire surface of the shoe sole, or a plurality of shock absorbers independent of one another may be provided separately at prescribed positions in the shoe sole. Furthermore, depending on the type the competition in which the shoe is used, how it is used, and the like, the shock absorber may be applied to a portion of the shoe sole on either one of the medial or lateral side. Furthermore, the shock absorber may be provided between the midsole and the upper. When the shock absorber is provided on the entire surface of the shoe sole, then, in place of the midsole, its entirety may be replaced with the shock absorber.

In addition, the shock absorber may have a wall varied in thickness depending on where the shock absorber is disposed with respect to the shoe sole, or may have a surface structure varied depending on where the shock absorber is disposed with respect to the shoe sole. For example, a shock absorber having a surface structure of a Schwarz' P structure may be disposed at a portion of the shoe sole, and a shock absorber having a surface structure of a gyroid structure may be disposed at another portion of the shoe sole.

Further, while in the sixteenth embodiment, a shock absorber according to the present invention is applied to a shoe sole of a shoe by way of example, the shock absorber according to the present invention is applicable to other shock absorbing applications. For example, the shock absorber according to the present invention can be used in various applications such as packaging materials, floor materials for buildings (for example, houses), surface materials for paving paths, surface materials for sofas and chairs, tires, and the like.

In addition, the characteristic configurations disclosed in the first to thirteenth embodiments and their variations and the characteristic configurations disclosed in the fourteenth to sixteenth embodiments and their variations can be combined together without departing from the gist of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A shoe sole having a shock absorber comprising a three-dimensional structure composed of a plurality of unit structures repeatedly, regularly and continuously arranged in at least one direction, each unit structure of the plurality of unit structures being a three-dimensional shape formed by a wall having an external shape defined by a pair of curved surfaces, wherein a differently shaped portion, which does not correspond to the wall defining each unit structure, is locally provided in a shock absorbing region which is a region in which the three-dimensional structure has the plurality of unit structures disposed;

wherein the differently shaped portion is in a form of a plate having a thickness in a direction intersecting with an axial direction in which the shock absorber exhibits a shock absorbing function as the shock absorber receives a load;

wherein each unit structure has one or more openings at an end of the unit structure in the direction intersecting with the axial direction;

wherein the differently shaped portion only covers one of the openings located at an end of the shock absorbing region in the direction intersecting with the axial direction of exactly one of the unit structures;

wherein the differently shaped portion is disposed only at the end of the shock absorbing region in the direction intersecting with the axial direction;

wherein the three-dimensional structure is a triply periodic minimal surface with a thickness added thereto; and wherein the differently shaped portion has a compressive stiffness different from that of the unit structure.

2. The shoe sole according to claim 1, wherein the three-dimensional structure has a Schwarz' P structure, a gyroid structure, or a Schwarz' D structure.

3. The shoe sole according to claim 1, formed of either a resin material or a rubber material.

4. The shoe sole according to claim 1, wherein the shock absorber is disposed such that an axial direction in which the shock absorber exhibits a shock absorbing function as the shock absorber receives a load is orthogonal to a tread.

5. The shoe sole according to claim 1, wherein the shock absorber comprises a plurality of the differently shaped portions, each only covering one of the openings located at the end of the shock absorbing region in the direction intersecting with the axial direction of exactly one of the unit structures; and wherein the differently shaped portions are disposed only at the end of the shock absorbing region in the direction intersecting with the axial direction.

6. A shoe comprising:
a shoe sole according to claim 1; and
an upper provided above the shoe sole.

\* \* \* \* \*